United States Patent [19]
Sekiguchi et al.

[11] Patent Number: 6,108,449
[45] Date of Patent: Aug. 22, 2000

[54] MOTION PICTURE ENCODING SYSTEM AND MOTION PICTURE DECODING SYSTEM

[75] Inventors: Shunichi Sekiguchi; Yoshimi Isu; Kohtaro Asai, all of Tokyo, Japan

[73] Assignee: Mitsubishi Denki Kabushiki Kaisha, Tokyo, Japan

[21] Appl. No.: 09/112,449

[22] Filed: Jul. 9, 1998

[30] Foreign Application Priority Data

Aug. 25, 1997 [JP] Japan .................................. 9-228535

[51] Int. Cl.$^7$ ........................................................ G06K 9/36
[52] U.S. Cl. ................................................................ 382/236
[58] Field of Search ................................... 382/232, 236, 382/238, 240, 248, 250; 348/384, 394, 395, 400–404, 407–416, 420, 421, 430, 431, 699

[56] References Cited

U.S. PATENT DOCUMENTS

| | | | |
|---|---|---|---|
| 4,858,005 | 8/1989 | Lodge | 348/415 |
| 5,911,008 | 6/1999 | Niikura et al. | 382/236 |
| 5,991,447 | 11/1999 | Eifrig et al. | 382/236 |
| 6,005,980 | 12/1999 | Eifrig et al. | 382/236 |
| 6,026,195 | 2/2000 | Eifrig et al. | 382/236 |

OTHER PUBLICATIONS

ISO/IEC JTC1/SC29/WG11 N1642, "MPEG Video Verification Model 7.0" pp. 16–32.

*Primary Examiner*—Jose L. Couso

[57] ABSTRACT

A motion picture encoding system comprising a frame-based shape motion detecting unit (24) and a frame-based shape motion compensation unit (26) which make motion compensated prediction for the shape data (2) of each alpha block included in an interlaced frame comprised of a pair of top and bottom fields so as to generate a frame-based prediction data for shape. In addition, a field-based shape motion detecting unit (28) and a field-based shape motion compensation unit (30) make motion compensated prediction for the shape data (2) of each alpha block included in each of the two fields of the frame independently so as to generate a field-based prediction data for shape. An arithmetic encoding unit (32) can inter-code the shape data using the frame-based prediction data for shape, and inter-code the shape data using the field-based prediction data for shape. The arithmetic encoding unit (32) then selects one of the coded results having the shortest code length.

18 Claims, 26 Drawing Sheets

FRAME-BASED PREDICTION FOR SHAPE

FIELD-BASED PREDICTION FOR SHAPE

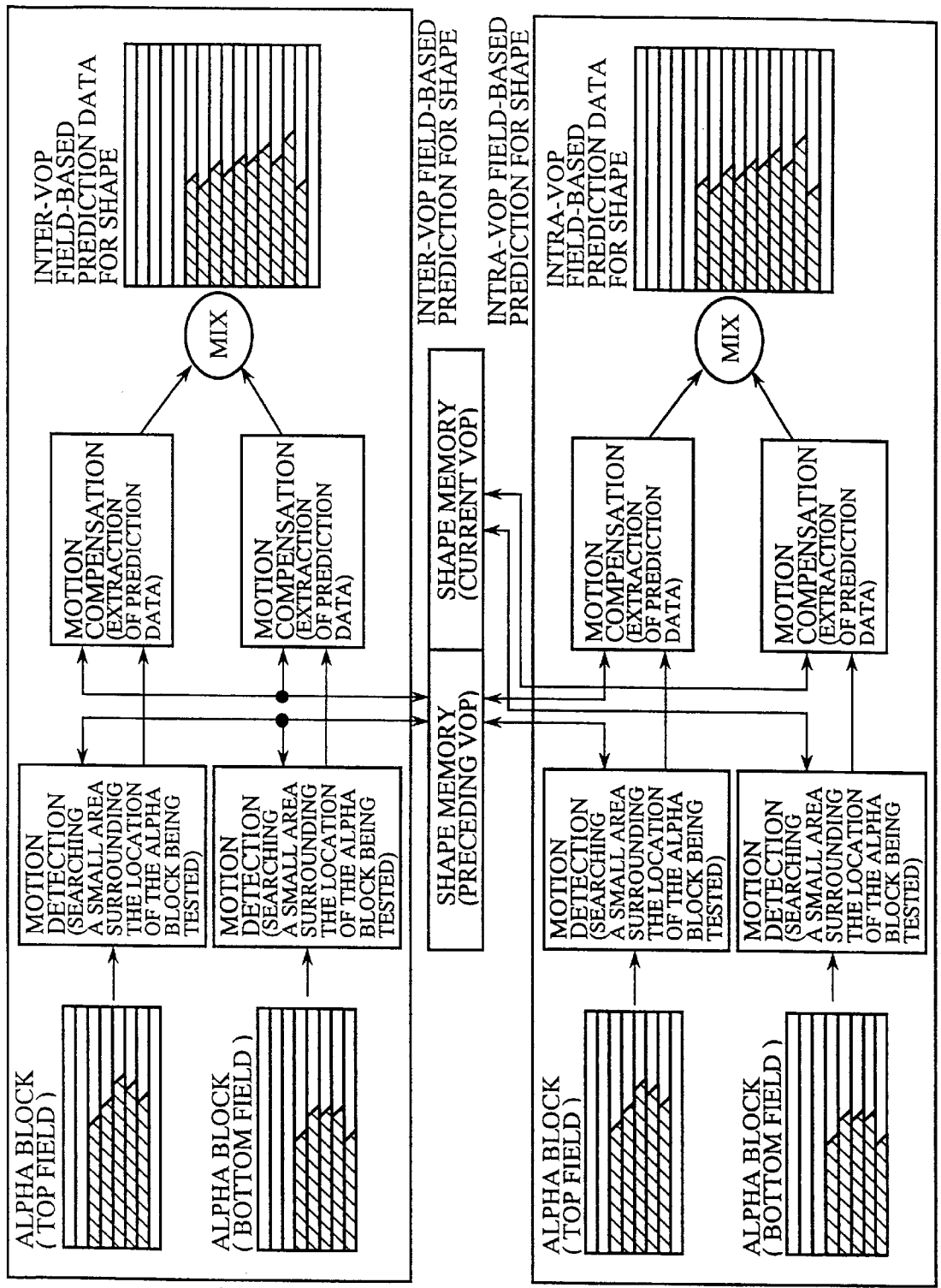

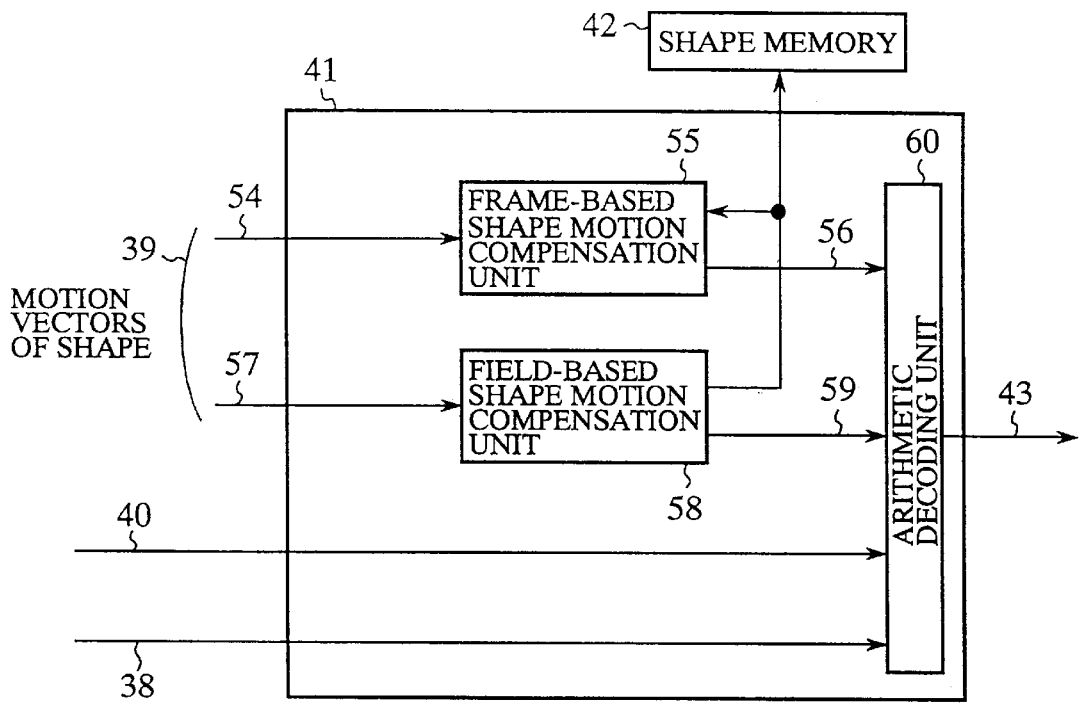
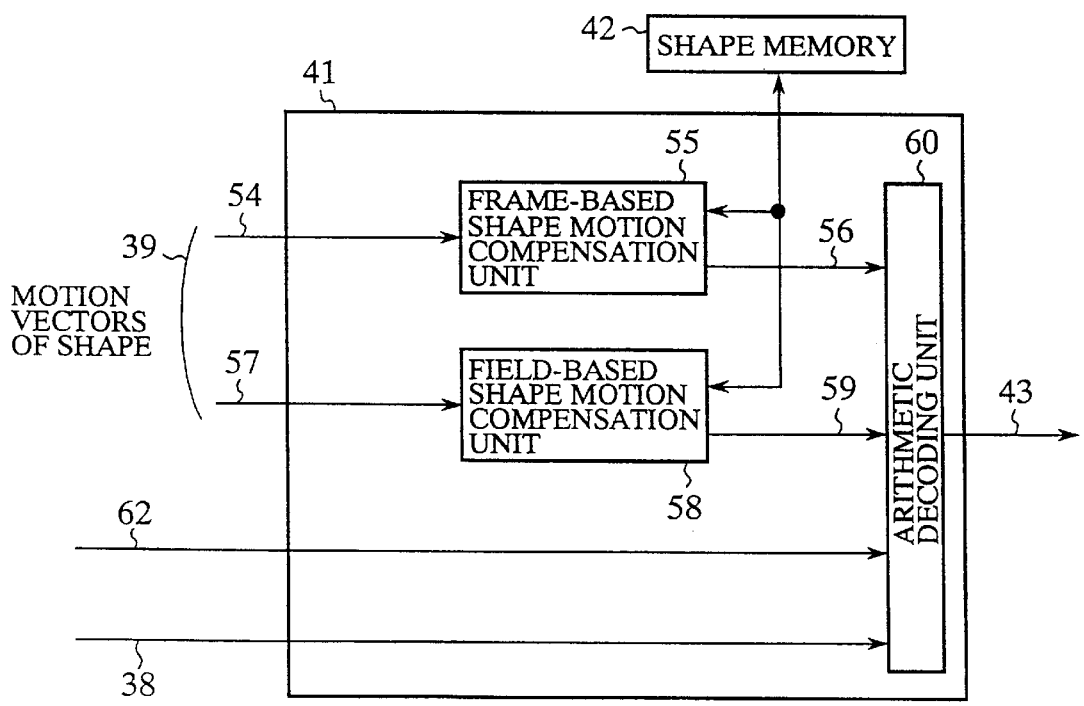

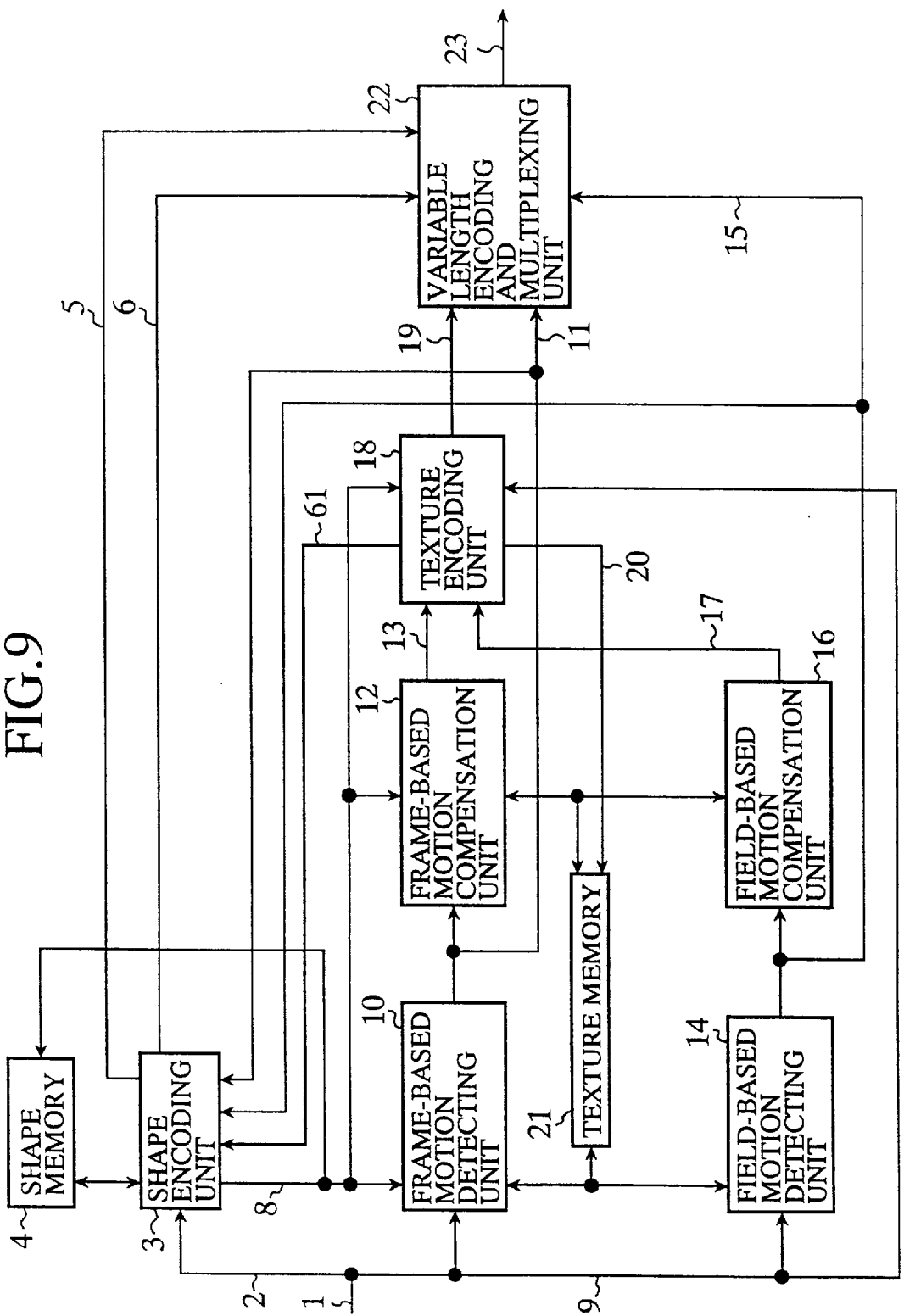

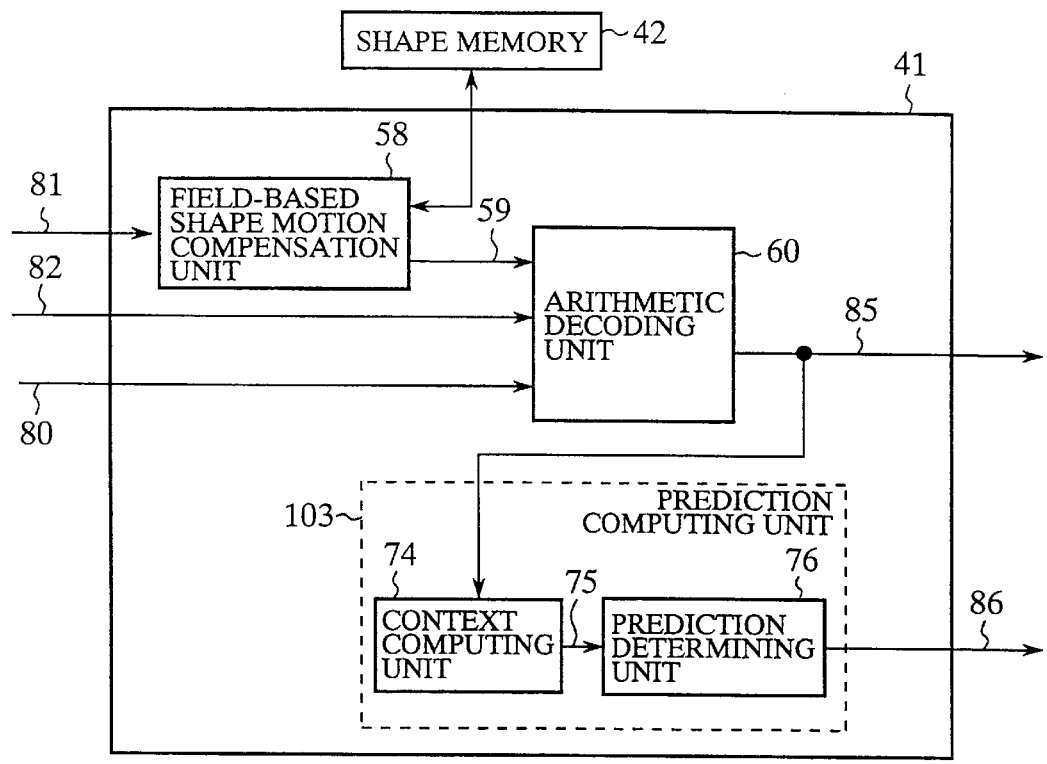
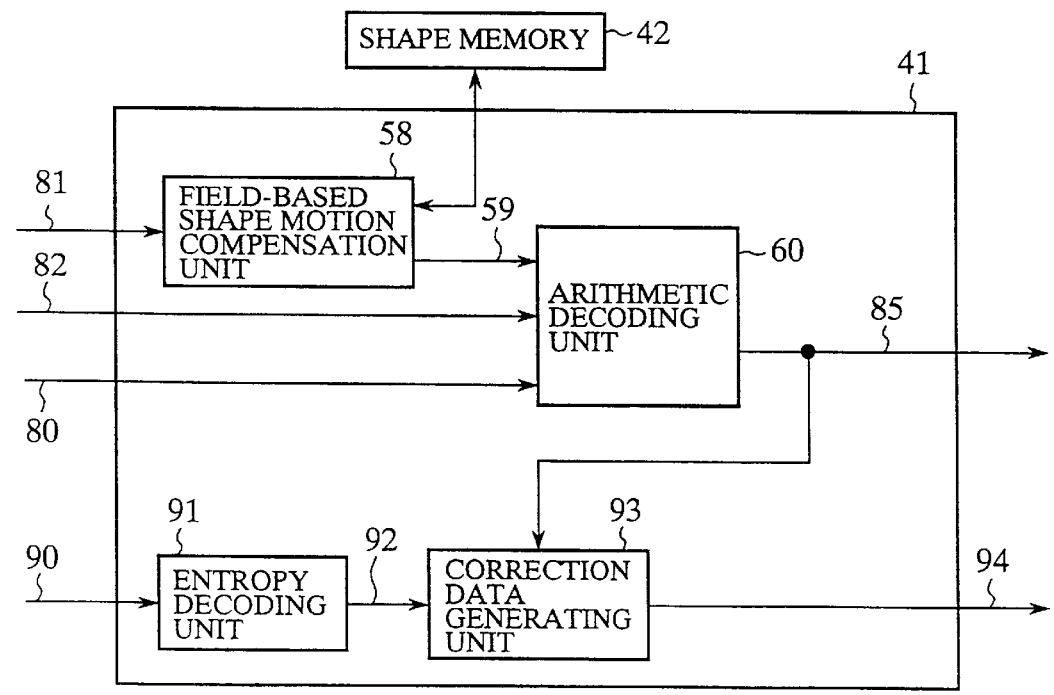

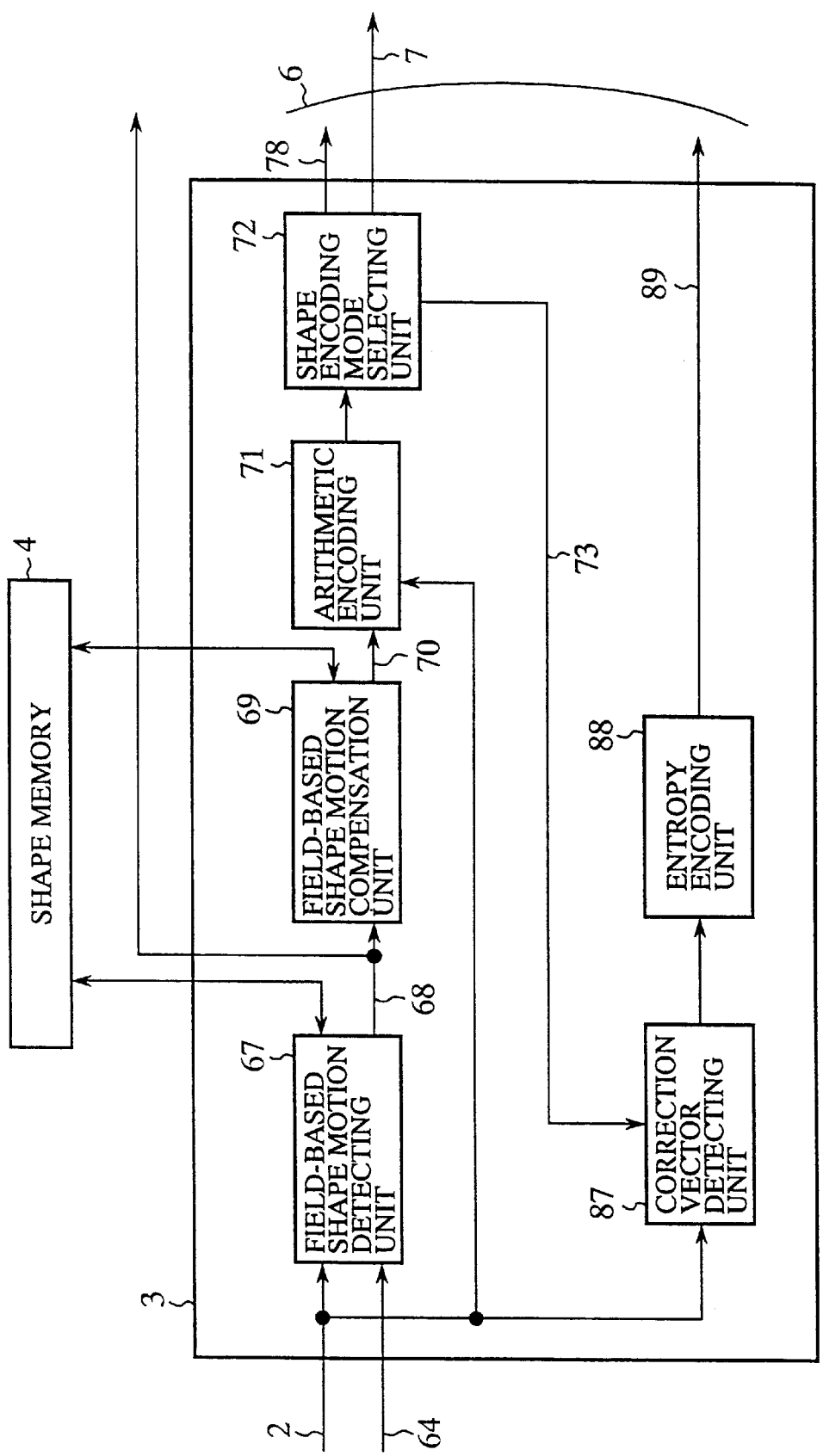

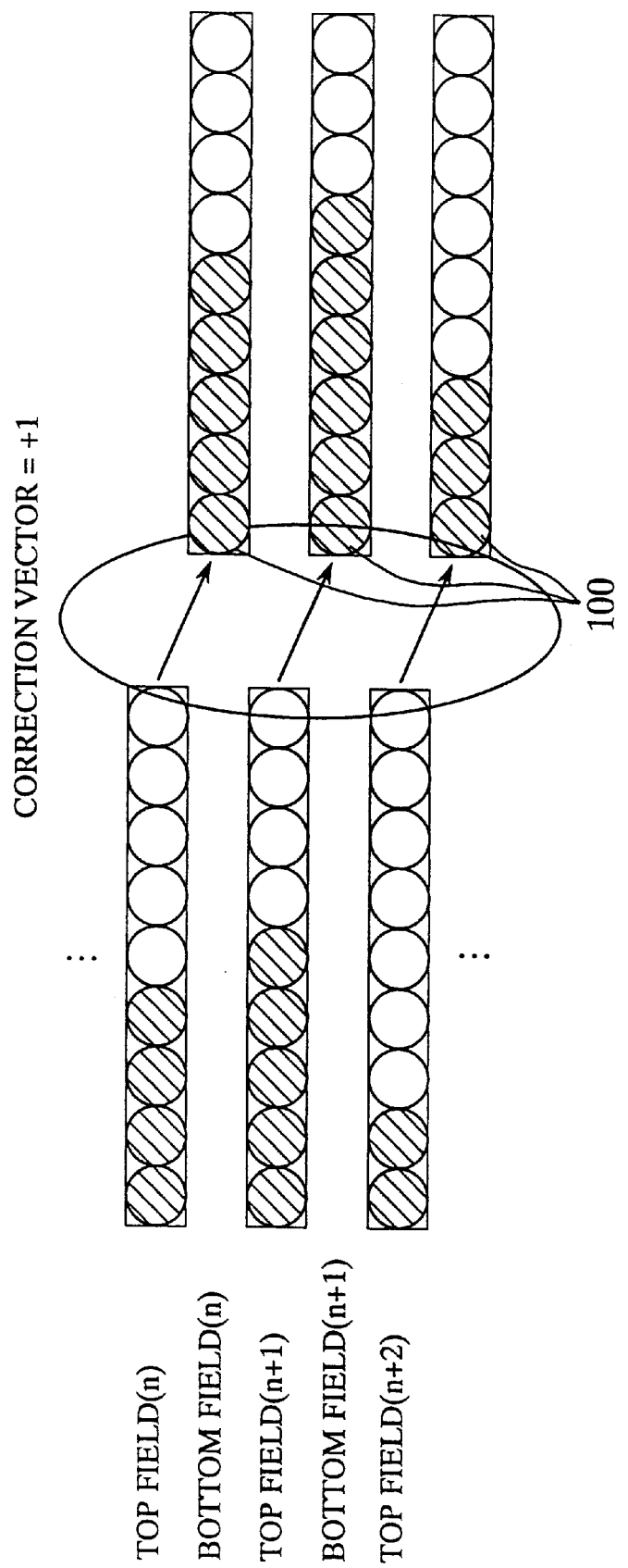

FIG.29a
| | C9 | C8 | C7 | |
|---|---|---|---|---|
| C6 | C5 | C4 | C3 | C2 |
| C1 | C0 | ? | | |
FIG.29b
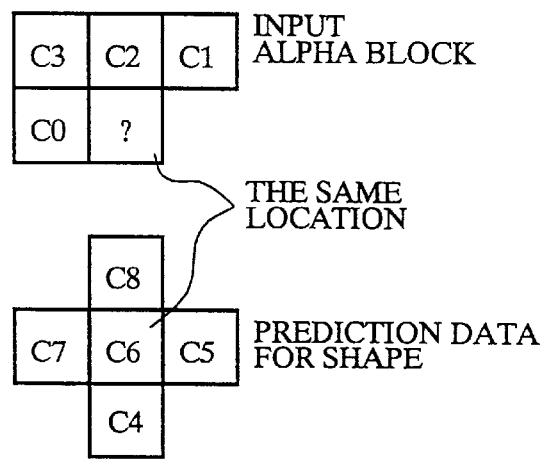
FIG.31
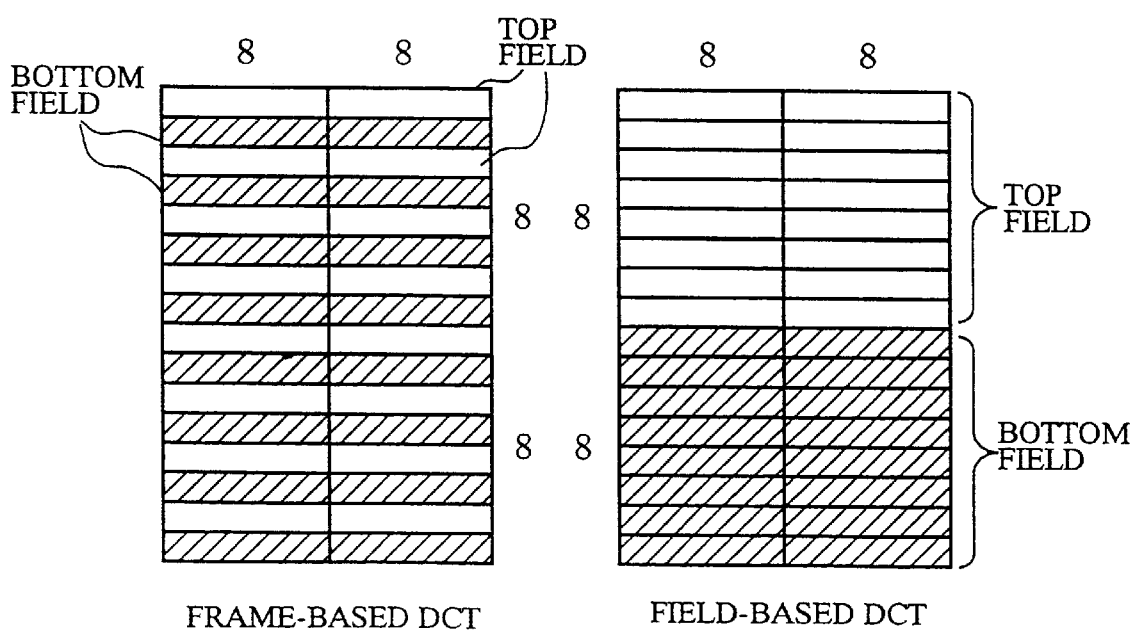
FRAME-BASED DCT            FIELD-BASED DCT

MOTION PICTURE ENCODING SYSTEM AND MOTION PICTURE DECODING SYSTEM

BACKGROUND OF THE INVENTION

1. Field of the Invention

The present invention relates to a motion picture encoding system which can encode a series of interlaced motion picture objects with a high encoding efficiency, and to a motion picture decoding system which can decode a series of coded interlaced motion picture objects.

2. Description of the Prior Art

Video encoding verification model or VM of Motion Picture Expert Group Phase-4 (MPEG-4) which is being standardized by JTC11/SC29/WG11 of the ISO/IEC has been known as an example of a method of encoding shape information for use in a prior art motion picture encoding system. The contents of the video encoding VM are varying with ongoing standardization efforts by MPEG-4. Hereinafter, a description of the video encoding VM will be made assuming that the video encoding VM is the one of version 7.0, which will be referred to as the VM.

In the VM, a sequence of motion pictures is defined as a collection of motion picture objects each having an arbitrary shape with respect to time and space, and encoding process is carried out for each motion picture object. Referring now to FIG. 25, there is illustrated a diagram showing the structure of video data in the VM. In the VM, one specific scene of a motion picture is called video session or VS. Furthermore, one motion picture object which can vary with time is called video object or VO which is a component of a VS. Accordingly, a VS is defined as a collection of one or more VO's.

One video object layer or VOL is a component of a VO and is comprised of a plurality of video object planes or VOP's. A VOL is provided with the aim of displaying motion pictures in a hierarchical form. An important factor in providing a plurality of layers for each VO with respect to time is the frame rate. An important factor in providing a plurality of layers for each VO with respect to space is the display roughness. Each VO corresponds to each of a plurality of objects in one scene such as each of conferees that joins a TV meeting or the background that can be seen behind the conferees. Each VOP is an image data representing the state of a corresponding VO at each time, which corresponds to one frame and which is a unit on which an encoding process is performed.

Referring next to FIG. 26, there is illustrated a view showing an example of VOP's in one scene. Two VOP's, i.e., VOP1 representing a person and VOP2 representing a painting hung on the wall behind the person are shown in FIG. 26. Each VOP is constructed from a texture data showing the color light and dark level of each VOP and a shape data showing the shape of each VOP. The texture data of each pixel is comprised of an 8-bit luminance signal and a chrominance signal having one half the size of the luminance signal in both horizontal and vertical dimensions. The shape data of each pixel is a matrix of binary values in which each element is set to 1 when each element is in the interior of a VOP; otherwise, each element is set to 0. Each shape data has the same size as a corresponding luminance signal. In representation of a motion picture using VOP's, a conventional frame image can be formed by arranging a plurality of VOP's within one frame, as shown in FIG. 26. When only one VO exists in a motion picture sequence, each VOP is synonymous with each frame. In this case, each VOP has no shape data, and therefore only the texture data of each VOP is encoded.

Referring next to FIG. 27, there is illustrated a block diagram showing the structure of a prior art VOP encoding device for use in a VM encoding system disclosed in ISO/IEC JTC11/SC29/WG11, MPEG97/N1642, MPEG-4 Verification Mode Version 7.0. In the figure, reference character P1 denotes an input VOP data, P2 denotes a shape data which is extracted from the input VOP data, P3 denotes a shape encoding unit which can encode the shape data P2, P4 denotes a shape memory which can store a local decoded shape data P7 furnished by the shape encoding unit P3, P5 denotes a motion vector of shape furnished by the shape encoding unit P3, and P6 denotes a coded shape data furnished by the shape encoding unit P3.

Furthermore, reference character P8 denotes a texture data which is extracted from the input VOP data P1, P9 denotes a texture motion detecting unit which receives the texture data P8 and then detects a motion vector of texture P10, P11 denotes which receives the motion vector of texture P10 and delivers a prediction data for texture P12, P13 denotes a texture encoding unit which can encode the prediction data for texture P12, P14 denotes a coded texture data furnished by the texture encoding unit 13, P16 denotes a texture memory which can store the local decoded texture data P15 furnished by the texture encoding unit P13, and P17 denotes a variable length encoding and multiplexing unit which can receive the motion vector of shape P5, the coded shape data P6, the motion vector of texture P10, and the coded texture data P14, and then furnishes a coded bitstream.

In operation, the input VOP data P1 is divided into the shape data P2 and the texture data P8 first. The shape data P2 is delivered to the shape encoding unit P3, and the texture data P8 is delivered to the texture motion detecting unit P9. Then each of the shape data and the texture data is divided or partitioned into multiples of 16×16 pixels blocks and the encoding process is done per 16×16 pixels block. As shown in FIG. 26, each of the plurality of blocks of the shape data per which the shape encoding process is done is hereafter referred to as an alpha block, and each of the plurality of blocks of the texture data per which the texture encoding process is done is hereafter referred to as a macroblock.

First, the description will be directed to the encoding process for the shape data. Referring next to FIG. 28, there is illustrated a block diagram showing the structure of the shape encoding unit P3. In the figure, reference character P19 denotes a shape motion detecting unit which can receive the shape data P2 and then detect a motion vector of shape P5, P20 denotes a shape motion compensation unit which can receive the motion vector of shape P5 and then furnish a prediction data for shape P21, P22 denotes an arithmetic encoding unit which can receive the prediction data for shape P21 and then furnish a coded shape data P23, and P24 denotes a shape encoding mode selecting unit which can receive the coded shape data P23 and then furnish a coded shape data P6.

First, a description will be made as to the motion detection which is carried out for the input shape data P2. When the shape motion detection unit P19 receives the shape data P2 of each of a plurality of alpha blocks into which the shape data of the VOP has been partitioned, it detects a motion vector of shape P5 for each alpha block from motion vectors of shape of other alpha blocks around the current alpha block, which have been stored in the shape motion detecting unit P19, and the motion vectors of texture of macroblocks around the corresponding macroblock at the same location, which have been furnished by the texture motion detecting unit P9. A block matching method which has been used for detecting the motion vector of texture for each macroblock can be used as a method of detecting the motion vector of shape for each alpha block. Using the method, a motion vector of shape can be detected for each alpha block by searching a small area in the vicinity of the motion vectors of shape of other alpha blocks referred around the current alpha block and the motion vectors of texture of macroblocks around the corresponding macroblock at the same location as the alpha block being tested. The motion vector of shape P5 of each alpha block to be encoded is delivered to the variable length encoding and multiplexing unit P17 and is then multiplexed into a coded bitstream P18 as needed.

Next, a description will be made as to the motion compensation and the arithmetic encoding for the shape data of each alpha block to be encoded. The shape motion compensation unit P20 generates and furnishes a prediction data for shape P21 used for the encoding process from a reference shape data stored in the shape memory P4 according to the motion vector of shape P5 determined in the above-mentioned process. The prediction data for shape P21, together with the shape data P2 of each alpha block to be encoded, is applied to the arithmetic encoding unit P22. The arithmetic encoding process is then done for each alpha block to be encoded. The arithmetic encoding method is the encoding method that can adapt dynamically to the frequency of occurrence of a series of symbols. Therefore, it is necessary to obtain the probability that the value of each pixel in the alpha block currently being encoded is 0 or 1.

In the VM, the arithmetic encoding process is done in the following manner.

(1) A pixel distribution pattern or context around the target pixel to be arithmetic encoded is examined.

The context construction used in intra or intra-coding mode, that is, when encoding the shape data of the alpha block being decoded by using only the shape data within the VOP currently being encoded is shown in FIG. 29a. The context construction used in inter or inter-coding mode, that is, when encoding the shape data of the alpha block being encoded by using the prediction data for shape which has been extracted in the motion compensation process as well is shown in FIG. 29b. In the figures, the target pixel to be encoded is marked with '?'. In either pattern, a context number is computed according to the following equation.

$$\sum_k C_k * 2^k \quad (1)$$

where Ck shows the value of a pixel in the vicinity of the pixel to be encoded as shown in FIGS. 29a and 29b.

(2) The probability that the value of the target pixel to be encoded is 0 or 1 is obtained by indexing a probability table using the context number.

(3) The arithmetic encoding is carried out according to the indexed probability of the value of the target pixel to be encoded.

The procedures mentioned above are carried out in both the intra mode and the inter mode. The shape encoding mode selecting unit P24 selects either the coded result obtained in the intra shape encoding mode or the coded result obtained in the inter shape encoding mode. The shape encoding mode selecting unit P24 selects the one having a shorter code length. The final coded shape data P6 thus obtained, including information indicating the selected shape encoding mode, is delivered to the variable length encoding and multiplexing unit P17 in which the shape coded data as well as the corresponding texture data is multiplexed into the coded bitstream P18 according to a given syntax (or grammatical rules which coded data must obey). The local decoded shape data P7 of the alpha block is stored in the shape memory P4 and is also furnished to the texture motion detecting unit P9, the texture motion compensation unit P11, and the texture encoding unit P13.

Next, a description will be made as to the texture encoding. After the texture data of the VOP to be encoded is partitioned into a plurality of macroblocks, the texture data P8 of a macroblock to be encoded is applied to the texture motion detecting unit P9. The texture motion detecting unit P9 then detects a motion vector of texture P10 from the texture data P8. In the case where the texture data P8 of the macroblock to be encoded is an interlaced signal, the texture motion detecting unit P9 can perform a frame-based motion detecting operation on each macroblock composed of lines from the two fields alternately, one of which contains lines each spatially located above the corresponding line of the other field is called top field and the other one of which is called bottom field, and perform a field-based motion detecting operation on each macroblock composed of lines from only one of the two fields, independently, as shown in FIG. 30. By using this motion detecting process, a reduction in the encoding efficiency due to the difference in the position of a moving object between the pair of two fields of an interlaced frame can be prevented, and therefore the efficiency of the frame-based prediction can be improved.

The texture motion compensation unit P11 generates and furnishes a prediction data for texture P12 from a reference texture data stored in the texture memory P16 according to the motion vector of texture P10 of the macroblock to be encoded from the texture motion detecting unit P9. The prediction data for texture P12 is then delivered to the texture encoding unit P13 as well as the texture data P8. From the texture data P8 (or intra texture data) and the difference (or inter texture data) between the texture data P8 and the prediction data for texture P12, the texture encoding unit P13 selects the one which offers a higher degree of encoding efficiency, and then compresses and encodes the selected data using DCT and scalar quantization. When the texture data P8 is an interlaced signal, the texture motion detecting unit P9 estimates a frame-based motion vector of texture for each macroblock and field-based motion vectors of texture for each macroblock, and then selects the one which offers a higher degree of encoding efficiency from all selectable texture encoding modes.

In addition, the texture encoding unit P13 can select either frame-based DCT coding or field-based DCT coding in the case where the texture data P8 is an interlaced signal. As shown in FIG. 31, in the case of the frame-based DCT encoding, each block is composed of lines from the pair of two fields, i.e., top and bottom fields, alternately, and the frame-based DCT encoding process is done per each 8×8 block. In the case of the field-based DCT encoding, each block is composed of lines from only one of the two fields, i.e., top and bottom fields, and the field-based DCT encoding process is done per each 8×8 block for each of the first and second fields. Accordingly, the generation of high-frequency coefficients in the vertical direction due to the difference in the position of a moving object between the two fields of an interlaced frame can be prevented and hence the power concentration effect can be improved.

After the quantized DCT coefficients undergo reverse quantization, reverse DCT, and an addition to the reference texture data, they are written into the texture memory P16 as the local decoded texture data P15. The local decoded texture data P15 is used for predictions of the later VOP which will be formed later. The texture encoding mode information indicating the selected texture encoding mode: the intra mode, the inter mode with frame-based prediction, or the inter mode with field-based prediction and the DCT encoding mode information indicating the selected DCT encoding mode: the frame-based DCT encoding mode or the field-based DCT encoding mode included in the coded texture data P14 are delivered to the variable length encoding and multiplexing unit P17 and then are multiplexed into the coded bitstream P18 according to the given syntax.

When the VOP to be encoded is an interlaced image, there is a difference in the position of a moving object between the pair of two fields of the interlaced image which has been caused by a difference in time between the two fields of the interlaced image, as previously mentioned. Therefore, in the prior art encoding system mentioned above, the texture encoding process is done by performing a switching operation between the frame-based encoding and the field-based encoding so as to make a correction to the displacement between the pair of two field pictures of the interlaced frame. On the other hand, predictions and encoding are carried out for each frame picture composed of a pair of two fields in the shape encoding process without any correction to the difference in the position of a moving object between the pair of two fields of the interlaced frame. Accordingly, a problem with the prior art encoding system is that the prediction and encoding efficiencies are relatively low due to the difference in the position of a moving object between the pair of two fields of the interlaced frame.

SUMMARY OF THE INVENTION

The present invention is made to overcome the above problem. It is therefore an object of the present invention to provide a motion picture encoding system capable of encoding interlaced VOP's without reducing prediction and encoding efficiencies.

It is another object of the present invention to provide a motion picture decoding system capable of decoding a coded bitstream including a sequence of interlaced frames while carrying out motion prediction while making a correction to the difference in the position of a moving object between the two fields of each interlaced frame.

In accordance with a preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) shape encoding mode information indicating whether the coded shape data is a data encoded with frame-based motion compensated prediction or field-based motion compensated prediction, and (3) a frame-based motion vector of shape or field-based motion vectors of shape; a frame-based motion compensation unit for making a motion compensated prediction for shape of each of the plurality of small regions to be reconstructed according to the frame-based motion vector of shape so as to generate a frame-based prediction data for shape; a field-based motion compensation unit for making a motion compensated prediction for shape of each of first and second fields of each of the plurality of small regions to be reconstructed according to the field-based motion vectors of shape so as to generate a field-based prediction data for shape; and a decoding unit for decoding the coded shape data of each of the plurality of small regions to be reconstructed by using either the frame-based prediction data or the field-based prediction data, according to the shape encoding mode information.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) texture encoding mode information indicating whether the coded texture data is a data encoded with frame-based motion compensated prediction or field-based motion compensated prediction, and (3) a frame-based motion vector of shape or field-based motion vectors of shape; a frame-based motion compensation unit for making a motion compensated prediction for shape of each of the plurality of small regions to be reconstructed according to the frame-based motion vector of shape so as to generate a frame-based prediction data for shape; a field-based motion compensation unit for making a motion compensated prediction for shape of each of first and second fields of each of the plurality of small regions to be reconstructed according to the field-based motion vectors of shape so as to generate a field-based prediction data for shape; and a decoding unit for decoding the coded shape data of each of the plurality of small regions to be reconstructed by using either the frame-based prediction data or the field-based prediction data as needed, according to the texture encoding mode information.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of the first field, and (4) coded data of a prediction error for shape of a second field; a field-based motion compensation unit for making a motion compensated prediction for shape of the first field of each of the plurality of small regions to be reconstructed according to the field-based motion vector of shape of the first field so as to generate a field-based prediction data for shape of the first field; a first decoding unit for decoding the coded shape data of the first field of each of the plurality of small regions to be reconstructed by using the field-based prediction data for shape of the first field as needed, according to the shape encoding mode information; a prediction computing unit for computing a prediction value for the shape data of the second field of each of the plurality of small regions to be reconstructed by using the decoded shape data of the first field from the first decoding unit; and a second decoding unit for decoding the coded shape data of the second field of each of the plurality of small regions to be reconstructed by using the prediction error and the prediction value from the prediction computing unit.

Preferably, the prediction computing unit includes a unit for computing a context number for each pixel of the shape data of the second field of each of the plurality of small regions to be reconstructed by using the decoded shape data of the first field, and a unit for computing a prediction value of each pixel of the shape data of the second field of each of the plurality of small regions to be reconstructed from the context number.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of the first field, and (4) coded data of a prediction error for shape of a second field; a field-based motion compensation unit for making a motion compensated prediction for shape of the first field of each of the plurality of small regions to be reconstructed according to the field-based motion vector of shape of the first field so as to generate a field-based prediction data for shape of the first field; a decoding unit for decoding the coded shape data of the first field of each of the plurality of small regions to be reconstructed by using the field-based prediction data for shape of the first field as needed, according to the shape encoding mode information; and a prediction computing unit for computing a prediction value of a decoded shape data of a second field of each of the plurality of small regions to be reconstructed by using the decoded shape data of the first field so as to generate a decoded shape data of the second field by using the computed prediction value.

Preferably, the prediction computing unit includes a unit for computing a context number for each pixel of the shape data of the second field of each of the plurality of small regions to be reconstructed by using the decoded shape data of the first field, and a unit for computing a prediction value of each pixel of the shape data of the second field of each of the plurality of small regions to be reconstructed from the context number.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) first shape encoding mode information indicating if the coded shape data of a first field is a data encoded with field-based motion compensated prediction, (3) a field-based motion vector of shape of the first field, (4) second shape encoding mode information indicating whether the shape data of a second field is to be decoded or not, and (5) coded data of a prediction error for shape of the second field if the second shape encoding mode information indicates that the shape data of the second field is to be decoded; a field-based motion compensation unit for making a motion compensated prediction for shape of the first field of each of the plurality of small regions to be reconstructed according to the field-based motion vector of shape so as to generate a field-based prediction data for shape of the first field; a first decoding unit for decoding the coded shape data of the first field of each of the plurality of small regions to be reconstructed by using the field-based prediction data of the first field as needed, according to the shape first encoding mode information; a prediction computing unit for computing a prediction value for the shape data of the second field to be reconstructed by using the decoded shape data of the first field from the first decoding unit; a second decoding unit for decoding the coded shape data of the second field of each of the plurality of small regions to be reconstructed; and a unit for generating a decoded shape data of the second field of each of the plurality of small regions to be reconstructed from the prediction value of the second field furnished by the prediction computing unit, or by adding the prediction value of the second field to the shape data of the second field decoded by the second decoding unit, according to the second field encoding mode information.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of a first field, and (4) coded data of a delta vector used for adjusting a decoded shape data of the first field; a field-based motion compensation unit for making a motion compensated prediction for shape of the first field of each of the plurality of small regions to be reconstructed according to the field-based motion vector of shape of the first field so as to generate a field-based prediction data for shape of the first field; a first decoding unit for decoding the coded shape data of the first field of each of the plurality of small regions to be reconstructed by using the field-based prediction data for shape of the first field from the field-based motion compensation unit as needed, according to the shape encoding mode information; a second decoding unit for decoding the coded data of the delta vector so as to generate a delta vector; and a unit for generating a decoded data of the second field of each of the plurality of small regions to be reconstructed by using the decoded shape data of the first field from the first decoding unit and the delta vector from the second decoding unit.

In accordance with another preferred embodiment of the present invention, there is provided a motion picture decoding system which can decode a coded bitstream obtained by encoding a motion picture comprised of a sequence of interlaced images each having its texture data and shape data, comprising: a bitstream analyzer for extracting the following data from the coded bitstream for each of a plurality of small regions included in an interlaced image to be reconstructed: (1) the coded shape data, (2) shape encoding mode information indicating whether the coded shape data is a data encoded with frame-based motion compensated prediction or field-based motion compensated prediction, (3) a frame-based motion vector of shape or a field-based motion vector of shape of a first field, and (4) a differential motion vector showing a difference between the field-based motion vector of shape of the first field and the field-based motion vector of shape of a corresponding second field; a frame-based motion compensation unit for making a motion compensated prediction for shape of each of the plurality of small regions to be reconstructed according to the frame-based motion vector of shape so as to generate a frame-based prediction data for shape; a field-based motion compensation unit for making a motion compensated prediction for shape of the first field of each of the plurality of small regions to be reconstructed according to the field-based motion vector of shape of the first field so as to generate a field-based prediction data for shape of the first field, and for computing a field-based motion vector of shape of the second field by adding the differential vector to the field-based motion vector of shape of the first field, and then making a motion compensated prediction for shape of the second field of each of the plurality of small regions to be reconstructed according to the field-based motion vector of shape of the second field, so as to generate a field-based prediction data for shape of the second field; and a decoding unit for decoding the coded shape data of each of the plurality of small regions to be reconstructed by using either the frame-based prediction data or the field-based prediction data of the first and second fields as needed, according to the shape encoding mode information.

In accordance with another preferred embodiment of the present invention, there is provided a motion picture encoding system which can encode a motion picture comprised of a sequence of interlaced images each having its texture data and shape data, comprising: a frame-based motion detecting unit for detecting a frame-based motion vector of shape for each of a plurality of small regions into which the shape data of a current interlaced image to be encoded having a pair of first and second fields is partitioned; a frame-based motion compensation unit for making a motion compensated prediction according to the frame-based motion vector of shape so as to generate a frame-based prediction data for shape; a field-based motion detecting unit for detecting field-based motion vectors of shape for both the first and second fields of each of the plurality of small regions to be encoded; a field-based motion compensation unit for making a motion compensated prediction according to the field-based motion vectors of shape of the first and second fields so as to generate a field-based prediction data for shape; an encoding unit for inter-coding the shape data of each of the plurality of small regions to be encoded by using the frame-based prediction data for shape, and inter-coding the shape data of each of the plurality of small regions to be encoded by using the field-based prediction data for shape, so as to furnish two types of coded shape data; a shape encoding mode selecting unit for selecting one of the two types of coded shape data from the encoding unit according to a predetermined selection criterion and then furnishing the selected coded shape data, and for furnishing shape encoding mode information indicating the type of the selected coded shape data, i.e., a shape encoding mode according to which the selected coded shape data has been generated; and a multiplexing unit for multiplexing the shape encoding mode information and the selected coded shape data into a coded bitstream, and further multiplexing either the frame-based motion vector of shape or the field-based motion vectors of shape which is selected according to the shape encoding mode information into the coded bitstream.

Preferably, the field-based shape motion detecting unit detects field-based motion vectors of shape, which are referred to as inter-image field-based motion vectors of shape, for both the first and second fields of each of the plurality of small regions to be encoded of the current image from the shape data of an immediately preceding image, and the field-based shape motion detecting unit further detects a field-based motion vector of shape, which is referred to as one of intra-image field-based motion vectors of shape, for the first field of each of the plurality of small regions to be encoded of the current image from the shape data of the immediately preceding image and, after that, detects another field-based motion vector of shape, which is referred to as another one of the intra-image field-based motion vectors of shape, for the second field of each of the plurality of small regions to be encoded of the current image from the coded shape data of the first field of the current image. Furthermore, the field-based shape motion compensation unit makes motion compensated prediction for shape of the first and second fields by using the intra-image field-based motion vectors of shape so as to generate an intra-image field-based prediction data for shape, and further makes motion compensated prediction for shape of the first and second fields of by using the inter-image field-based motion vectors of shape so as to generate an inter-image field-based prediction data for shape.

In accordance with another preferred embodiment of the present invention, there is provided a motion picture encoding system which can encode a motion picture comprised of a sequence of interlaced images each having its texture data and shape data by using motion compensated prediction, comprising: a frame-based motion detecting unit for detecting a frame-based motion vector of shape for each of a plurality of small regions into which the shape data of an interlaced image to be encoded having a pair of first and second fields is partitioned; a frame-based motion compensation unit for making a motion compensated prediction according to the frame-based motion vector of shape to generate a frame-based prediction data for shape; a field-based motion detecting unit for detecting field-based motion vectors of shape for both the first and second fields of each of the plurality of small regions to be encoded; a field-based motion compensation unit for making a motion compensated prediction according to the field-based motion vectors of shape of both the first and second fields so as to generate a field-based prediction data for shape; an encoding unit for intra-coding the shape data of each of the plurality of small regions to be encoded, inter-coding the shape data of each of the plurality of small regions to be encoded by using the frame-based prediction data for shape, or inter-coding the shape data of each of the plurality of small regions to be encoded by using the field-based prediction data for shape according to information indicating a texture encoding mode according to which the corresponding texture data of each of the plurality of small regions to be encoded is encoded, so as to generate a coded shape data of each of the plurality of small regions; and a multiplexing unit for multiplexing the texture encoding mode information and the coded shape data into a coded bitstream, and further multiplexing either the frame-based motion vector of shape or the field-based motion vectors of shape which is selected according to the shape encoding mode information into the coded bitstream.

In accordance with another preferred embodiment of the present invention, there is provided a motion picture encoding system which can encode a motion picture comprised of a sequence of interlaced images each having its texture data and shape data, comprising: a field-based motion detecting unit for detecting a field-based motion vector of shape for a first field of each of a plurality of small regions into which the shape data of an interlaced image to be encoded having a pair of the first field and a corresponding second field is partitioned; a field-based motion compensation unit for making a motion compensated prediction for shape of the first field of each of the plurality of small regions to be encoded according to the field-based motion vector of shape of the first field from the field-based motion detecting unit so as to generate a field-based prediction data for shape of the first field; a first encoding unit for intra-coding the shape data of the first field of each of the plurality of small regions to be encoded, and inter-coding the shape data of the first field of each of the plurality of small regions to be encoded by using the field-based prediction data for shape of the first field, so as to generate two types of coded shape data of the first field of each of the plurality of small regions and a local decoded data of the first field of each of the plurality of small regions to be encoded; a shape encoding mode selecting unit for selecting one of the two types of coded shape data of the first field from the first encoding unit according to a predetermined selection criterion and then furnishing the selected coded shape data of the first field, and for furnishing shape encoding mode information indicating the type of the selected coded shape data of the first field, i.e., a shape encoding mode according to which the selected coded shape data of the first field has been generated; a prediction computing unit for computing a prediction value of each pixel of the shape data of the second field of each of the plurality of small regions to be encoded by using the local decoded data of the first field furnished by the first encoding unit and the shape data of the second field of each of the plurality of small regions to be encoded; a second encoding unit for encoding a difference between the prediction value computed by the prediction computing unit and the actual value of each pixel of the shape data of the second field of each of the plurality of small regions to be encoded, and for furnishing the coded difference as a coded shape data of the second field; and a multiplexing unit for multiplexing the field-based motion vector of shape of the first field, the selected coded shape data of the first field, the shape encoding mode information, and the coded shape data of the second field obtained by the second encoding unit into a coded bitstream.

Preferably, the motion picture encoding system further comprises a unit for enabling the prediction computing unit and the second encoding unit when receiving information for instructing the encoding of the difference between the prediction computed by the prediction computing unit and the actual value of each pixel of the shape data of the second field, and for disabling the prediction computing unit and the second encoding unit otherwise. The multiplexing unit also multiplexes the information for instructing the encoding of the difference into the coded bitstream.

Preferably, the prediction computing unit includes a unit for computing a context number for each pixel of the shape data of the second field of each of the plurality of small regions to be encoded by using the local decoded shape data of the first field furnished by the first encoding unit and the shape data of the second field, and a unit for determining a prediction value of each pixel of the shape data of the second field of each of the plurality of small regions to be encoded from the computed context number.

In accordance with another preferred embodiment of the present invention, there is provided a motion picture encoding system which can encode a motion picture comprised of a sequence of interlaced images each having its texture data and shape data, comprising: a field-based motion detecting unit for detecting a field-based motion vector of shape for a first field of each of a plurality of small regions into which the shape data of an interlaced image to be encoded having a pair of the first field and a corresponding second field is partitioned; a field-based motion compensation unit for making a motion compensated prediction for shape of the first field of each of the plurality of small regions to be encoded according to the field-based motion vector of shape of the first field from the field-based motion detecting unit to generate a field-based prediction data for shape of the first field; a first encoding unit for intra-coding the shape data of the first field of each of the plurality of small regions to be encoded, and inter-coding the shape data of the first field of each of the plurality of small regions to be encoded by using the field-based prediction data for shape, so as to generate two types of coded shape data and a local decoded shape data of the first field of each of the plurality of small regions to be encoded; a shape encoding mode selecting unit for selecting one of the two types of coded shape data of the first field from the first encoding unit according to a predetermined selection criterion and then furnishing the selected coded shape data of the first field, and for furnishing shape encoding mode information indicating the type of the selected coded shape data, i.e., a shape encoding mode according to which the selected coded shape data of the first field has been generated; a delta vector detecting unit for, by using the local decoded data of the first field furnished by the first encoding unit and the shape data of a second field of each of the plurality of small regions, detecting a delta vector used for adjusting the local decoded shape data of the first field to generate an approximation of the shape data of the second field of each of the plurality of small regions; a second encoding unit for encoding the delta vector so as to generate a coded shape data of the second field of each of the plurality of small regions; and a multiplexing unit for multiplexing the field-based motion vector of shape of the first field, the selected coded shape data of the first field, the shape encoding mode information, and the coded shape data of the second field obtained by the second encoding unit into a coded bitstream.

In accordance with another preferred embodiment of the present invention, there is provided a motion picture encoding system which can encode a motion picture comprised of a sequence of interlaced images each having its texture data and shape data, comprising: a frame-based motion detecting unit for detecting a frame-based motion vector of shape for each of a plurality of small regions into which the shape data of an interlaced image having a pair of first and second fields is partitioned; a frame-based motion compensation unit for making a motion compensated prediction according to the frame-based motion vector of shape so as to generate a frame-based prediction data for shape; a field-based motion detecting unit for detecting a field-based motion vector of shape for the first field of each of the plurality of small regions to be encoded; a differential vector detecting unit for detecting a differential vector showing a difference between the field-based motion vector of shape of the first field and a field-based motion vector of shape of a corresponding second field of each of the plurality of small regions to be encoded by searching a small area in the vicinity of the field-based motion vector of shape of the first field, by using the shape data of the second field; a field-based motion compensation unit for making a motion compensated prediction for shape of the first field of each of the plurality of small regions to be encoded according to the field-based motion vector of shape of the first field from the field-based motion detecting unit, and for making a motion compensated prediction for shape of the second field of each of the plurality of small regions to be encoded according to a field-based motion vector of shape of the second field obtained by adding the differential vector to the field-based motion vector of shape of the first field, so as to generate a field-based prediction data for shape; an encoding unit for intra-coding the shape data of each of the plurality of small regions to be encoded, inter-coding the shape data of each of the plurality of small regions to be encoded by using the frame-based prediction data for shape, and inter-coding the shape data of each of the plurality of small regions to be encoded by using the field-based prediction data for shape, so as to furnish three types of coded shape data of each of the plurality of small regions; a shape encoding mode selecting unit for selecting one of the three types of coded shape data from the encoding unit according to a predetermined selection criterion and then furnishing the selected coded shape data, and for furnishing shape encoding mode information indicating the type of the selected coded shape data, i.e., a shape encoding mode according to which the selected coded shape data has been generated; and a multiplexing unit for multiplexing the frame-based motion vector of shape, the field-based motion vector of shape of the first field, the differential vector, the selected coded shape data, and the shape encoding mode information into a coded bitstream.

In accordance with another aspect of the present invention, there is provided a method of decoding a coded bitstream obtained by encoding a motion picture comprised of a sequence of interlaced images each having its texture data and shape data, comprising the steps of: extracting the following data from the coded bitstream for each of a plurality of small regions included in an interlaced image to be reconstructed; (1) the coded shape data, (2) shape encoding mode information indicating whether the coded shape data is a data intra-coded or inter-coded, and, in the latter case, further indicating whether the coded shape data is a data inter-coded with frame-based motion compensated prediction or with field-based motion compensated prediction, and (2) a frame-based motion vector of shape if the shape encoding mode information indicates that the coded shape data is a data inter-coded with field-based motion compensated prediction, or field-based motion vectors of shape if the shape encoding mode information indicates that the coded shape data is a data inter-coded with frame-based motion compensated prediction; if the shape encoding mode information indicates that the coded shape data of each of the plurality of small regions is a data intracoded, decoding the intra-coded shape data; if the shape encoding mode information indicates that the coded shape data of each of the plurality of small regions is a data interceded with frame-based motion compensated prediction, making a motion compensated prediction for shape of each of the plurality of small regions to be reconstructed according to the frame-based motion vector of shape so as to generate a frame-based prediction data for shape, and then decoding the inter-coded shape data by using the frame-based prediction data for shape; and, if the shape encoding mode information indicates that the shape data of each of the plurality of small regions is a data interceded with field-based motion compensated prediction, making a motion compensated prediction for shape of each of the plurality of small regions to be reconstructed according to the field-based motion vectors of shape so as to generate a field-based prediction data for shape, and then decoding the inter-coded shape data by using the field-based prediction data for shape.

Further objects and advantages of the present invention will be apparent from the following description of the preferred embodiments of the invention as illustrated in the accompanying drawings.

BRIEF DESCRIPTION OF THE DRAWINGS

FIG. 5a is a diagram for explaining inter-VOP field-based prediction for shape according to the present invention;

FIG. 5b is a diagram for explaining intra-VOP field-based prediction for shape according to the present invention;

FIG. 7 is a block diagram showing the structure of a shape encoding unit of the motion picture decoding system according to the second embodiment shown in FIG. 6;

FIG. 9 is a block diagram showing the structure of a motion picture encoding system according to a third embodiment of the present invention;

FIG. 12 is a block diagram showing the structure of a shape encoding unit of the motion picture decoding system according to the fourth embodiment shown in FIG. 11;

FIG. 18 is a block diagram showing the structure of a shape encoding unit according to a variant of the sixth embodiment of the present invention;

FIG. 20 is a block diagram showing the structure of a shape encoding unit of a motion picture encoding system according to an eighth embodiment of the present invention;

FIG. 21 is a block diagram showing the structure of a shape encoding unit of a motion picture encoding system according to a ninth embodiment of the present invention;

FIG. 22 is a diagram for explaining a method of generating a correction data from a delta vector which is used in the motion picture encoding system of the ninth embodiment;

FIG. 29a is a diagram showing the context construction in intra mode in shape encoding process which complies with video encoding verification model of MPEG-4;

FIG. 29b is a diagram showing the context construction in inter mode in shape encoding process which complies with video encoding verification model of MPEG-4;

FIG. 31 is a diagram for explaining frame-based DCT and field-based DCT for texture data.

DETAILED DESCRIPTION OF THE PREFERRED EMBODIMENTS

First Embodiment

Figure 1:
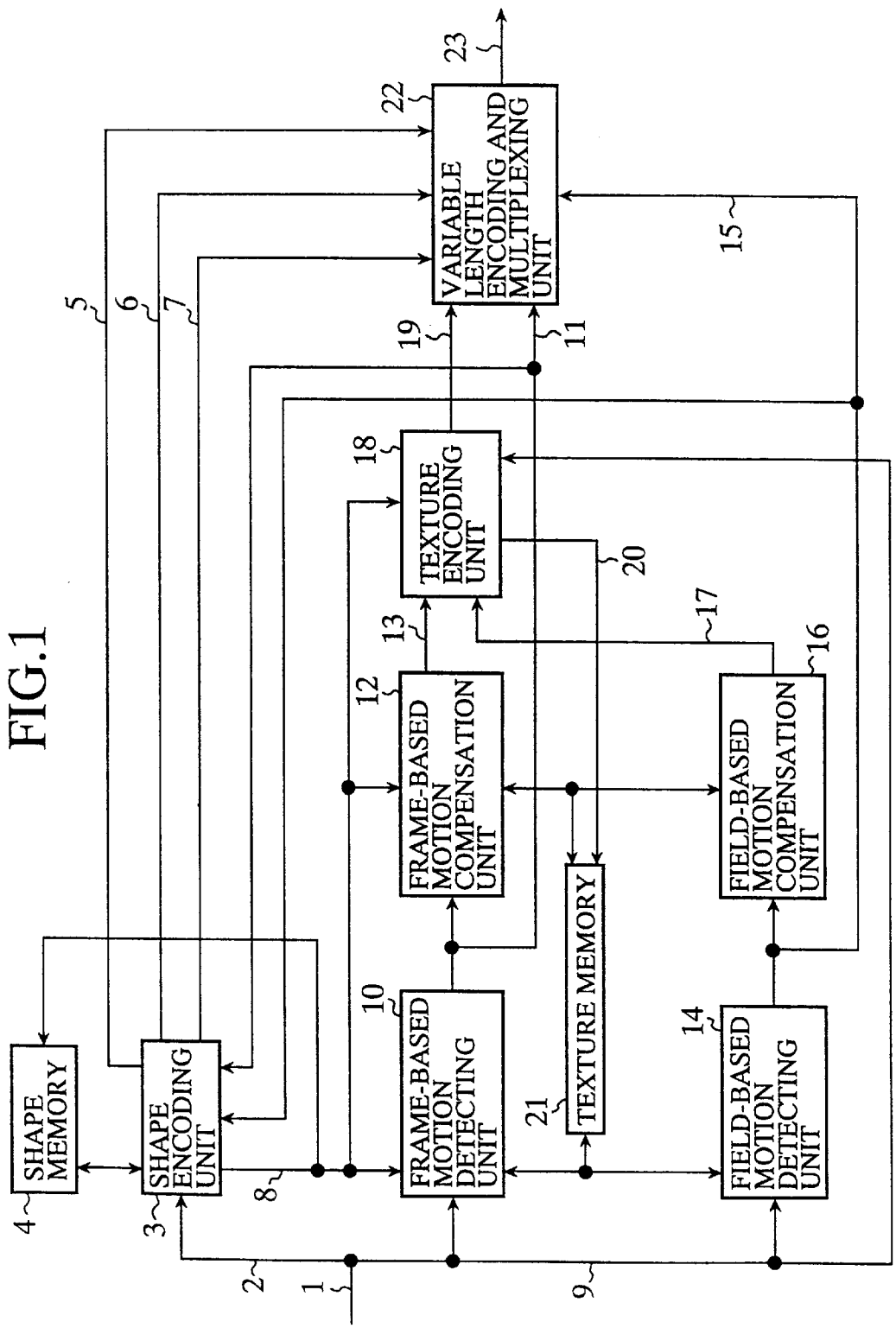
FIG. 1 is a block diagram showing the structure of a motion picture encoding system according to a first embodiment of the present invention.

Referring next to FIG. 1, there is illustrated a block diagram showing the structure of a motion picture encoding system according to a first embodiment of the present invention. In the figure, reference numeral 1 denotes an input VOP data, 2 denotes a shape data which is extracted from the input VOP data 1, 3 denotes a shape encoding unit which encodes the shape data 2, 4 denotes a shape memory which stores a local decoded shape data 8 or reference shape data furnished by the shape encoding unit 3, 5 denotes a motion vector of shape furnished by the shape encoding unit 3, 6 denotes a coded shape data furnished by the shape encoding unit 3, and 7 denotes shape prediction mode information indicating a shape prediction mode, which is furnished by the shape encoding unit 3.

Furthermore, reference numeral 9 denotes a texture data which is extracted from the input VOP data 1, 10 denotes a frame-based motion detecting unit which can receive the texture data 9 and then detect a frame-based motion vector 11, 12 denotes a frame-based motion compensation unit which can receive the frame-based motion vector 11 and then furnish a frame-based prediction data for texture 13, 14 denotes a field-based motion detecting unit which can receive the texture data 9 and then furnish a field-based motion vector 15, and 16 denotes a field-based motion compensation unit which receives the field-based motion vector 15 and then furnishes a field-based prediction data for texture 17.

Furthermore, reference numeral 18 denotes a texture encoding unit which can receive the frame-based and field- based prediction data for texture 13 and 17 and then furnish a coded texture data 19, 21 denotes a texture memory which can store a local decoded texture data 20 or reference texture data furnished by the texture encoding unit 18, and 22 denotes a variable length encoding and multiplexing unit which can receive the motion vector of shape 5, the coded shape data 6, the shape prediction mode information 7, the frame-based and field-based motion vectors 11 and 15, and the coded texture data 19, and then furnish a coded bitstream 23.

The motion picture encoding system according to the present embodiment can be so constructed as to encode video object planes or VOP's, like the prior art encoding system mentioned above. The description will be directed to an improvement in the encoding process by the motion picture encoding system when VOP's are interlaced images, which is the primary object of the present invention.

First, a description will be made as to the texture data encoding. The texture encoding process is done using frame-based and field-based motion compensated prediction in which two inter texture data are generated per macroblock using a frame-based motion vector and field-based motion vectors, like the prior art encoding system. In order to explain the frame-based and field-based motion compensated prediction clearly, the motion detecting unit of the first embodiment is divided into the frame-based motion detecting unit 10 and the field-based motion detecting unit 14, and the motion compensation unit of the first embodiment is divided into the frame-based motion compensation unit 12 and the field-based motion compensation unit 16, as illustrated in FIG. 1. The frame-based motion detecting unit 10 and the frame-based motion compensation unit 12 make a frame-based prediction as shown in FIG. 30.

The frame-based motion detecting unit 10 estimates or detects a frame-based motion vector 11 per each macroblock composed of lines from the two fields of a frame currently being encoded using a reference texture data stored in the texture memory 21. The frame-based motion vector 11 is furnished to the frame-based motion compensation unit 12 and a frame-based prediction data for texture 13 is read out of a corresponding part of the reference texture data stored in the texture memory 21.

Figure 30:
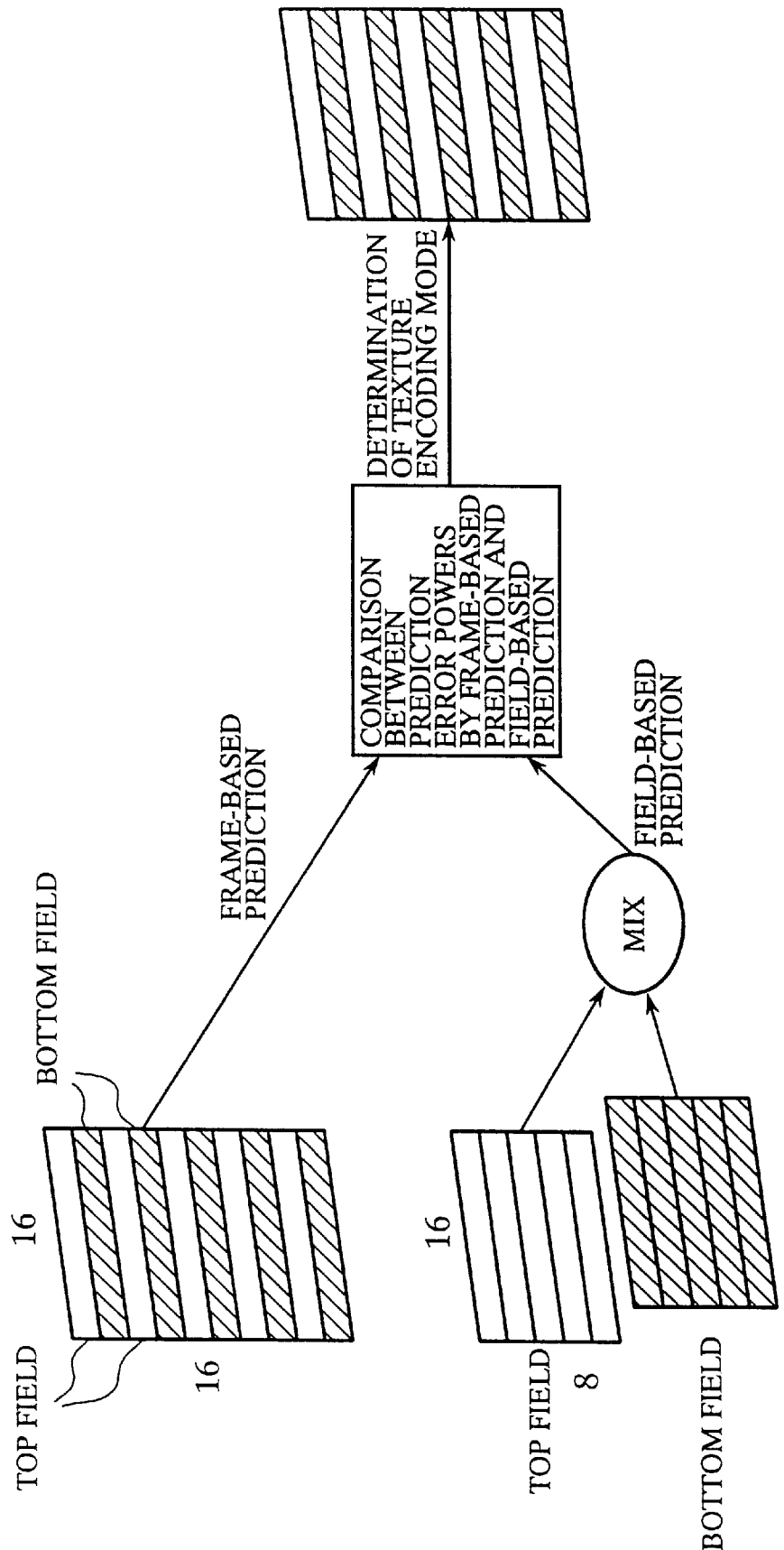
FIG. 30 is a diagram for explaining frame-based and field-based predictions for texture data.

Similarly, the field-based motion detecting unit 14 and the field-based motion compensation unit 16 make a field-based prediction as shown in FIG. 30. The field-based motion detecting unit 14 estimates a field-based motion vector 15 per each block composed of lines from only one of the two fields of the frame currently being encoded by using the reference texture data stored in the texture memory 21, first. As a result, two field-based motion vectors are determined for each macroblock comprised of a block composed of lines from the top field of the frame and another block composed of lines from the bottom field of the frame. When the field-based motion compensation unit 16 receives the two field-based motion vectors 15 from the field-based motion detecting unit 14, it reads a pair of field-based prediction data for texture from a corresponding part of the reference texture data stored in the texture memory 21. The pair of field-based prediction data for texture for the two fields of the frame is mixed to generate a prediction data in the form of a frame, which is a final result furnished as a prediction data for texture 17 in the field-based prediction.

As a consequence of the frame-based and field-based predictions, the frame-based prediction data for texture 13 and the field-based prediction data for texture 17 are generated. When the texture encoding unit 18 receives the frame-based and field-based prediction data for texture 13 and 17 and the texture data 9 of a macroblock to be encoded, it determines whether it selects either the frame-based prediction or the field-based prediction, and further determines whether it selects either intra or intra-coding mode or inter or inter-coding mode, which is the frame-based prediction mode or the field-based prediction mode which has been selected. Finally, the texture encoding unit 18 selects the one mode that offers the highest degree of encoding efficiency. Either the original or intra signal (i.e., the texture data 9) or the prediction error or inter signal (i.e., the difference between the frame-based prediction data for texture 13 or the field-based prediction data for texture 17 and the texture data 9) is encoded using an appropriate compression method such as a combination of DCT and scalar quantization.

Texture encoding mode information indicating the selected texture encoding mode: the intra-coding mode, the inter-coding mode with frame-based prediction, or the inter-coding mode with field-based prediction, and the coded texture data are combined into a coded texture data 19 and then the coded texture data 19 is delivered to the variable length encoding and multiplexing unit 22. The variable length encoding and multiplexing unit 22 then multiplexes the coded texture data 19 into a coded bitstream 23 according to a predetermined syntax.

Figure 2:
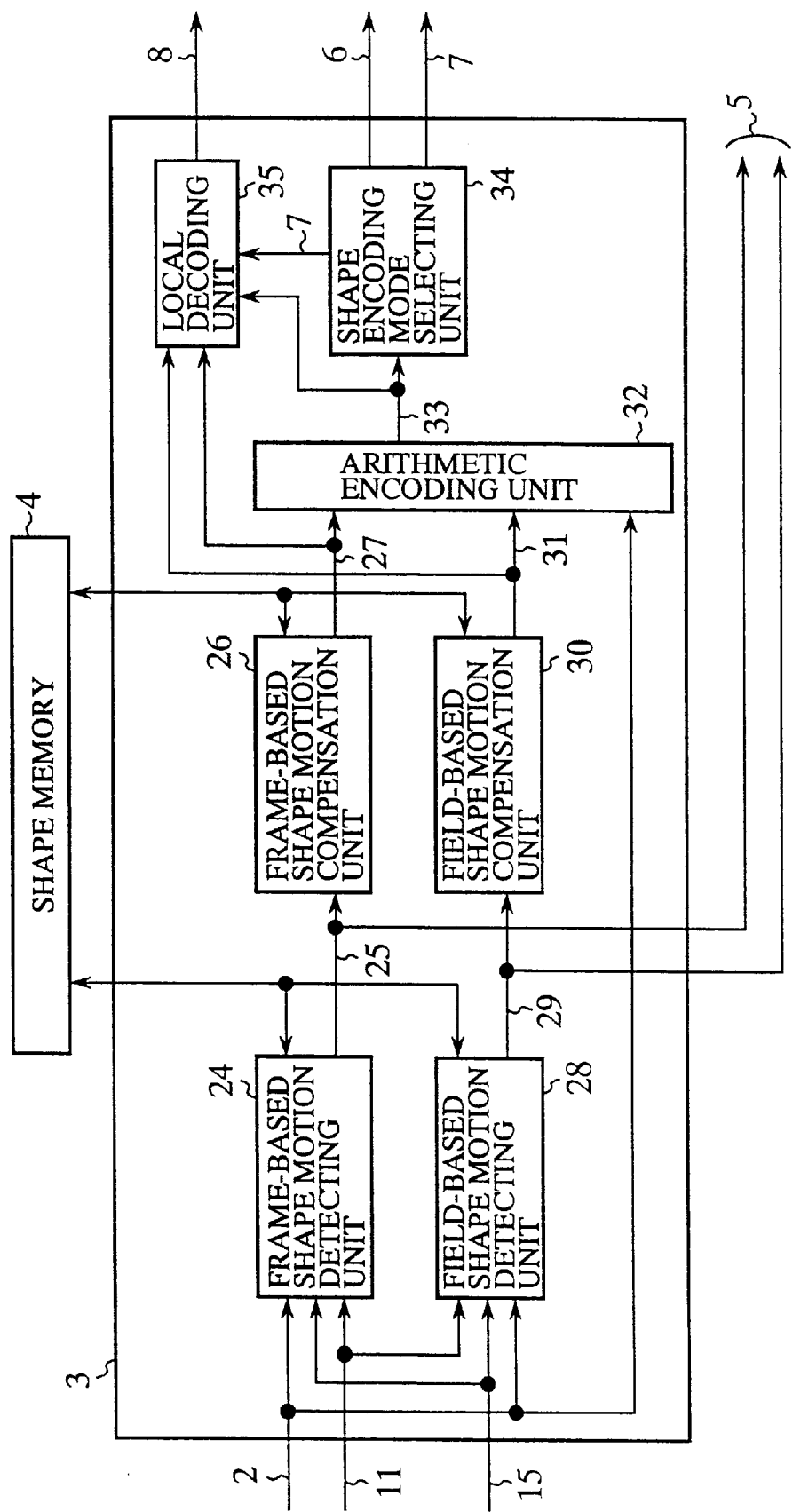
FIG. 2 is a block diagram showing the structure of a shape encoding unit of the motion picture encoding system according to the first embodiment shown in FIG. 1.

Next, a description will be made as to a process for encoding an interlaced shape data, which is the primary object of the present invention. Referring next to FIG. 2, there is illustrated a block diagram showing the structure of the shape encoding unit 3. In the figure, reference numeral 24 denotes a frame-based shape motion detecting unit which can receive the shape data 2 of each of a plurality of alpha blocks to be encoded, into which the input VOP shape data 1 of a current VOP included in the interlaced frame currently being encoded is partitioned, and then detect a frame-based motion vector of shape 25 for each alpha block to be encoded, 26 denotes a frame-based shape motion compensation unit which can receive the frame-based motion vector of shape 25 and then furnish a frame-based prediction data for shape 27, 28 denotes a field-based shape motion detecting unit which can receive the shape data 2 of each alpha block to be encoded and then detect field-based motion vectors of shape 29 for each alpha block to be encoded, 30 denotes a field-based shape motion compensation unit which can receive the field-based motion vector of shape 29 and then furnish a field-based prediction data for shape 31.

Furthermore, reference numeral 32 denotes an arithmetic encoding unit which can receive the frame-based and field-based prediction data for shape 27 and 31 and then furnish a plurality of arithmetic coded shape data 33, 34 denotes a shape encoding mode selecting unit which can receive the plurality of arithmetic-coded shape data 33 and then furnish a coded shape data 6 and shape prediction mode information 7 indicating a shape encoding mode selected, and 35 denotes a local decoding unit which can receive the plurality of arithmetic encoded shape data 33, and the frame-based and field-based prediction data for shape 27 and 31, decode one of the plurality of arithmetic encoded shape data 33 according to the shape prediction mode information 7 from the shape encoding mode selecting unit 34, and furnish the decoded shape data as a local decoded shape data 8. The motion vector of shape 5 in FIGS. 1 and 2 represents a frame-based motion vector of shape 25 or a pair of two field-based motion vectors of shape 29 of each alpha block to be encoded.

Figure 3A:
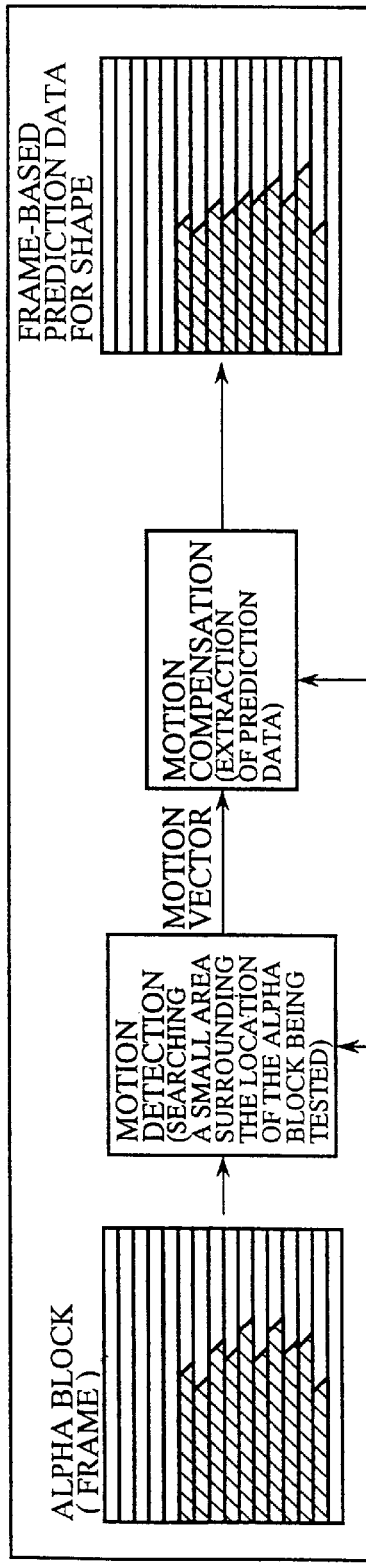
FIG. 3a is a diagram showing frame-based prediction for shape made in the motion picture encoding system according to the first embodiment.
Figure 3B:
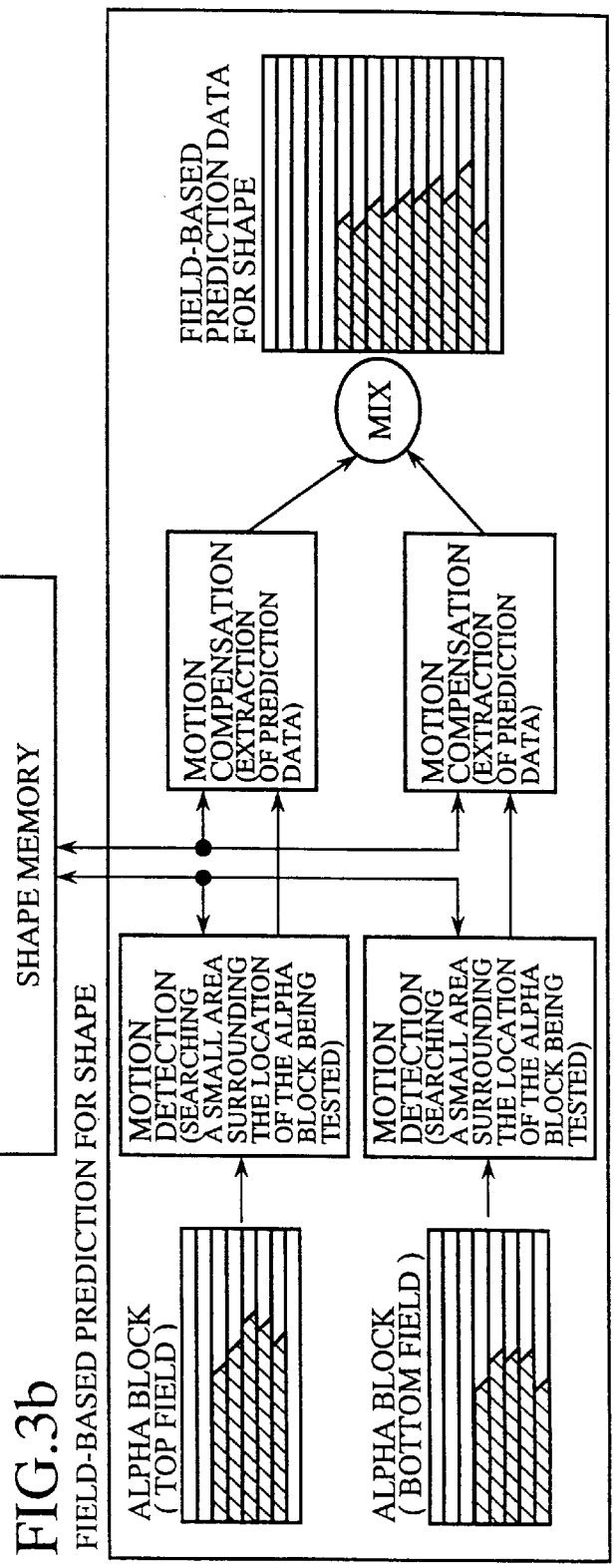
FIG. 3b is a diagram for explaining field-based prediction according to the present invention.

Next, a description will be made as to motion predictions in the shape data encoding process. In the shape data encoding process, a frame-based and field-based motion compensated prediction is formed in order to carry out motion prediction while making a correction to the difference in the position of a moving object between the two fields of an interlaced frame, like the texture data encoding process. In the frame-based and field-based motion compensated prediction, both a frame-based prediction for shape and a field-based prediction for shape are made independently, as will be mentioned below. Referring next to FIGS. 3a and 3b, there are illustrated diagrams showing the frame-based and field-based motion compensated prediction. In the frame-based prediction for shape, a motion vector of shape can be detected for each of a plurality of input alpha blocks into which the frame currently being encoded is divided, and a prediction data for shape can be generated per each alpha block included in the frame by using the motion vector of shape, as shown in FIG. 3a. In the field-based prediction for shape, each of the plurality of input alpha blocks is divided into a first block composed of lines from the top field and a second block composed of lines from the bottom field. Then a motion vector of shape can be detected for each of the first and second blocks, and a pair of prediction data for shape can be generated for the first and second blocks or the two fields by using the pair of motion vectors of shape, as shown in FIG. 3b. In this case, the pair of prediction data for shape for the top and bottom fields of each alpha block to be encoded included in the frame currently being encoded is combined into a final field-based prediction data for shape in the form of a frame. In other words, the pair of prediction data for shape is mixed to generate the final field-based prediction data for shape.

The frame-based shape motion detecting unit 24 and the frame-based shape motion compensation unit 26 as shown in FIG. 2 make the frame-based prediction for shape. The frame-based shape motion detecting unit 24 estimates a frame-based motion vector of shape 25 for each alpha block to be encoded included in an interlaced frame by using a reference shape data stored in the shape memory 4. The process of detecting a motion vector of shape per alpha block can be done using the block matching method mentioned above which is applied to the shape data plane or alpha plane. Any procedure of searching an area surrounding the location of the alpha block being tested can be used.

In FIG. 2, it is assumed that the shape encoding unit detects a motion vector of shape for the alpha block being tested using a prior art method of referring to a motion vector of texture which was detected for a corresponding macroblock at the same location through the frame-based prediction for texture, and motion vectors of shape of alpha blocks in the vicinity of the alpha block being tested or to be encoded, and then searching a small area surrounding the location of the alpha block being tested. Alternatively, an area surrounding the alpha block currently being encoded can be simply searched by using only the reference shape data.

When the frame-based shape motion compensation unit 26 receives the frame-based motion vector of shape 25 of each alpha block to be encoded, it extracts a frame-based prediction data for shape 27 from a corresponding part of the reference shape data stored in the shape memory 4.

Similarly, the field-based shape motion detecting unit 28 and the field-based shape motion compensation unit 30 as shown in FIG. 2 make the field-based prediction for shape. By using the reference shape data stored in the shape memory 4, the field-based shape motion detecting unit 28 estimates or detects a field-based motion vector of shape 29 for the first block of each alpha block to be encoded, which is composed of lines from the top field, and also estimates or detects another field-based motion vector of shape 29 for the second block of each alpha block to be encoded, which is composed of lines from the bottom field, as shown in FIG. 3b. As a result, the pair of motion vectors of shape 29 is created for each alpha block to be encoded. The pair of field-based motion vectors of shape 29 for each alpha block to be encoded can be determined by referring to the motion vector of texture of a corresponding macroblock at the same location (i.e., the frame-based motion vector of texture 11 or the pair of field-based motion vectors of texture 15) which can be estimated with the frame-based or field-based prediction for texture, and motion vectors of shape of alpha blocks in the vicinity of the alpha block being tested or to be encoded, and then searching a small area surrounding the location of the alpha block being tested.

When the field-based shape motion compensation unit 30 receives the pair of field-based motion vectors of shape 29, it reads a pair of field-based prediction data for shape 27 associated with the two fields from a corresponding part of the reference shape data stored in the shape memory 4. The pair of field-based prediction data for shape of each alpha block which is associated with the top and bottom fields of the frame currently being encoded is then combined into a final field-based prediction data for shape 31 in the form of a frame.

Next, a description will be made as to the steps of arithmetic encoding and selecting one of different shape encoding modes in the shape data encoding process. The arithmetic encoding unit 32 determines a code word by computing the probability that the value of each pixel to be coded of the alpha block currently being coded is 0 or 1 by using the same method as mentioned in the prior art. The three types of data, i.e., the shape data 2 and the frame-based and field-based prediction data for shape 27 and 31 are applied to the arithmetic encoding unit 32. The arithmetic encoding unit 32 intra-codes the shape data 2, inter-codes the shape data 2 using the frame-based prediction data for shape 27, and inter-codes the shape data 2 using the field-based prediction data for shape 31. The arithmetic encoding unit 32 then furnishes three types of coded data which have been generated in the respective shape encoding modes.

In the present preferred embodiment, the probability that the value of the target pixel currently being coded is 0 or 1 is obtained by indexing a probability table prepared using an intra context or an inter context. An inter context can be computed for each of the frame-based and field-based prediction data for shape. Only one context can be prepared for both the frame-based and field-based prediction data for shape, and alternatively two different inter contexts can be prepared for the frame-based prediction data for shape and the field-based prediction data for shape, respectively. Furthermore, only one probability table can be prepared for inter mode. Alternatively, two different probability tables can be prepared for inter mode with frame-based prediction for shape and inter mode with field-based shape prediction for shape, respectively. In the present preferred embodiment, only one inter context is prepared, like the prior art encoding system. Furthermore, only a corresponding probability table is prepared for inter mode. Accordingly, in the arithmetic encoding process of the present embodiment, the process for computing probabilities for the field-based prediction data for shape 31 is added, as compared with the prior art encoding system.

When the shape encoding mode selecting unit 34 selects one from among the intra or inter-coding mode, the inter or inter-coding mode with frame-based prediction for shape, and the inter mode with field-based prediction for shape, the shape encoding mode selecting unit 34 selects the one that offers a coded data having the shortest code length. The shape encoding mode selecting unit 34 furnishes the coded data which has been encoded in the selected mode as the coded shape data 6, and the shape encoding mode information 7 indicating the selected shape encoding mode. The motion vector of shape 5, the coded shape data 6, and the shape encoding mode information 7 thus obtained are then transferred to the variable length encoding and multiplexing unit 22, as shown in FIG. 1. The variable length encoding and multiplexing unit 22 then multiplexes those data together with the coded texture data into a coded bitstream 23 according to a predetermined syntax.

When the local decoding unit 35 receives the plurality of arithmetic coded shape data 33 from the arithmetic encoding unit 32, and the frame-based and field-based prediction data for shape 27 and 31, it decodes one of the plurality of arithmetic coded shape data 33 according to the shape encoding mode information 7 and then furnishes the decoded shape data as a local decoded shape data 8. For example, when the shape encoding mode information 7 indicates the inter mode with frame-based prediction for shape, the local decoding unit 35 decodes the shape data 33 arithmetic encoded in the inter mode using the frame-based prediction data for shape 27. The local decoded shape data 8 is then stored in the shape memory 4, as shown in FIG. 1, and is also delivered to the frame-based motion detecting unit 10, the frame-based motion compensation unit 12, and the texture encoding unit 18 for the process for encoding the corresponding texture data.

As previously mentioned, according to the first embodiment of the present invention, even when encoding the shape data of each interlaced frame to be encoded, motion predictions can be formed independently for a pair of the top and bottom fields of each interlaced frame, and therefore the encoding efficiency in the inter mode can be improved as compared with the prior art.

Figure 4A:
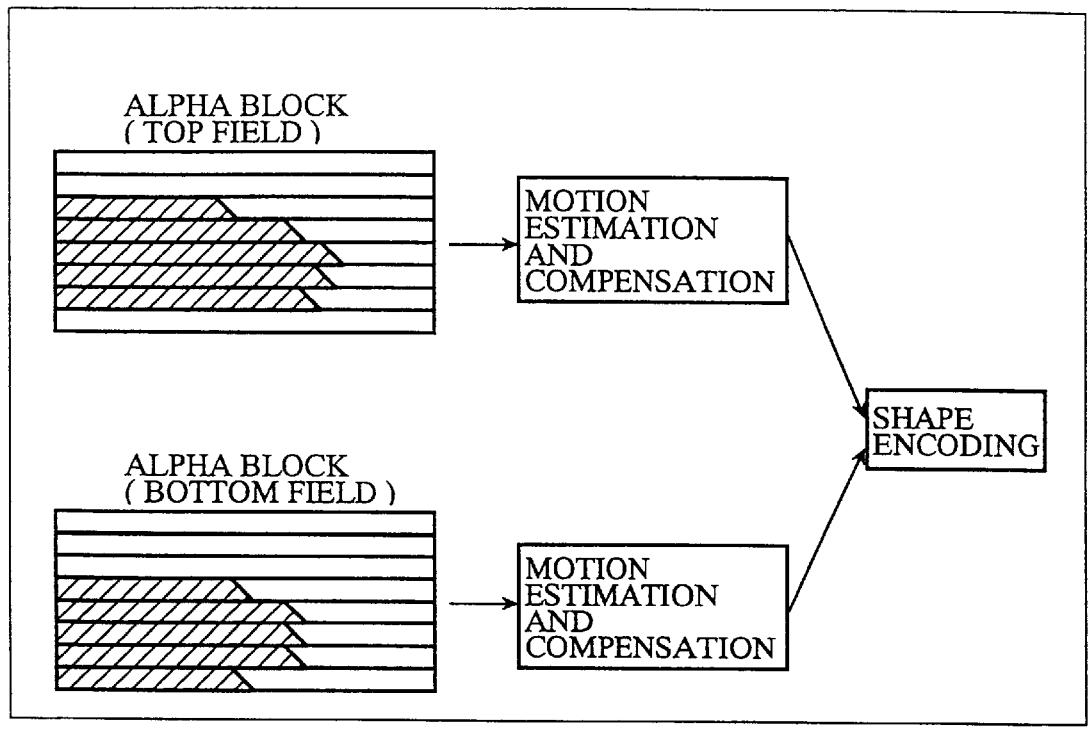
FIG. 4a is a diagram for explaining shape encoding according to the first embodiment.
Figure 4B:
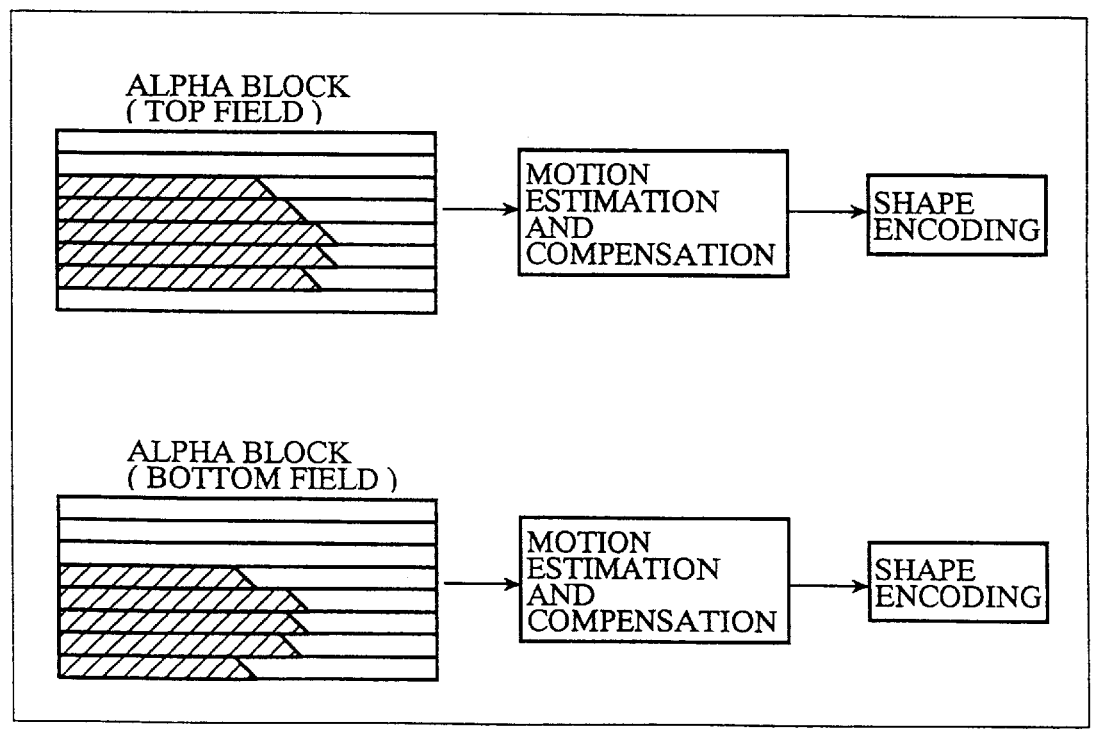
FIG. 4b is a diagram for explaining shape encoding according to a variant of the first embodiment.

Numerous variants may be made in the exemplary embodiment mentioned above. Instead of, when encoding each alpha block in the inter mode with field-based prediction for shape, encoding each alpha block by combining the pair of field-based shape prediction data for the top and bottom fields of each alpha block included in an interlaced frame currently being coded into a field-based prediction data for shape 31 in the form of a frame, as shown in FIG. 4a, the shape encoding unit 3 can arithmetically encode each alpha block per each of the top and bottom fields using each of the pair of field-based prediction data for shape, as shown in FIG. 4b. The variant can offer the same advantage as that offered by the first embodiment.

While a motion picture encoding system according to another variant of the aforementioned first embodiment has the same structure as shown in FIGS. 1 and 2, the field-based shape motion detecting unit 28 and the field-based shape motion compensation unit 30 operate differently from those of the first embodiment. The field-based shape motion detecting unit 28 and the field shape motion compensation unit 30 of this variant make an inter-VOP field-based prediction for shape, which corresponds to the field-based prediction for shape as previously explained in the first embodiment. In addition, they can make an intra-VOP field-based prediction for shape, which will be described below.

The difference between the inter-VOP field-based prediction for shape and the intra-VOP field-based prediction for shape will be explained with reference to FIGS. 5a and 5b.

In the inter-VOP field-based prediction for shape, a motion vector for each of the two fields can be estimated from the decoded shape data of the immediately preceding VOP stored in the shape memory 4. A shape prediction data for each of the two fields is extracted from the coded shape data of the immediately preceding VOP stored in the shape memory according to the detected motion vector of shape. Finally, the pair of extracted shape prediction data for both the top and bottom fields is mixed to generate an inter-VOP field-based shape prediction data in the form of frame, as shown in FIG. 5a.

In the intra-VOP field-based prediction for shape, a prediction for the top field is formed using the coded shape data of the immediately preceding VOP, for example. Then a prediction for the bottom field is formed using the shape data of the encoded part of the current VOP, e.g., the shape data of the top field of the current VOP. Finally, the pair of shape prediction data for both the top and bottom fields is mixed to generate an intra-VOP field-based shape prediction data in the form of frame, as shown in FIG. 5b.

Accordingly, the motion picture encoding system according to this variant of the first embodiment can offer the four different shape encoding modes: the intra mode, the inter mode with inter-VOP field-based prediction for shape, the inter mode with intra-VOP field-based prediction for shape, and the inter mode with frame-based prediction for shape. In either one of the four different shape encoding modes, the arithmetic encoding unit 32 can perform its encoding operation in the same manner as that mentioned in the exemplary embodiment mentioned above. The shape encoding mode selecting unit 34 then selects the one that can offer a coded shape data having the shortest code length from among the four different shape encoding modes. Both the coded shape data 6 and the shape encoding mode information 7 are delivered to the variable length encoding and multiplexing unit 22, and the variable length encoding and multiplexing unit 22 then multiplexes them into a coded bitstream 23 according to a predetermined syntax.

As previously mentioned, the motion picture encoding system of this variant employs the same encoding method as the prior art encoding system. It is apparent from the above description that even when encoding an interlaced shape data using another encoding method other than the arithmetic encoding method mentioned above, the variant shown can provide the high-efficiency encoding process by carrying out motion prediction while making a correction to the difference in the position of a moving object between the two fields of an interlaced frame.

As previously explained, this variant of the first embodiment of the present invention can offer an advantage of being able to improve the encoding efficiency in the inter mode by making a correction to the difference in the position of a moving object between the two fields of an interlaced frame even when encoding an interlaced shape data.

When intra-coding an interlaced VOP by using the variant of the first embodiment, the encoding process can be done efficiently as follows. The encoding process can be done for each of the two fields of the interlaced VOP. For example, the shape data of one part of the VOP in one of the two fields can be intracoded first. Then either intra-coding or inter-coding with intra-VOP field-based prediction for shape can be done selectively for the other part of the VOP in the other field. Using this encoding method, the shape data of the interlaced VOP can be encoded with a smaller amount of codes, as compared with the case, such as using the prior art method, in which the shape data of each of the two fields cannot but be intracoded.

In another variant of the first embodiment, instead of arithmetic encoding each alpha block by combining a pair of field-based shape prediction data for the top and bottom fields of each alpha block included in an interlaced frame currently being encoded into a field shape prediction data 31 in the form of a frame when the inter mode with inter-VOP field-based prediction for shape or intra-VOP field-based prediction for shape is selected, as shown in FIG. 4a, the shape encoding unit 3 can arithmetic encode each of the top and bottom fields of each alpha block using each of the pair of field-based shape prediction data for the top and bottom fields, as shown in FIG. 4b. The other variant can offer the same advantage as that offered by the variant mentioned above.

Second Embodiment

Figure 6:
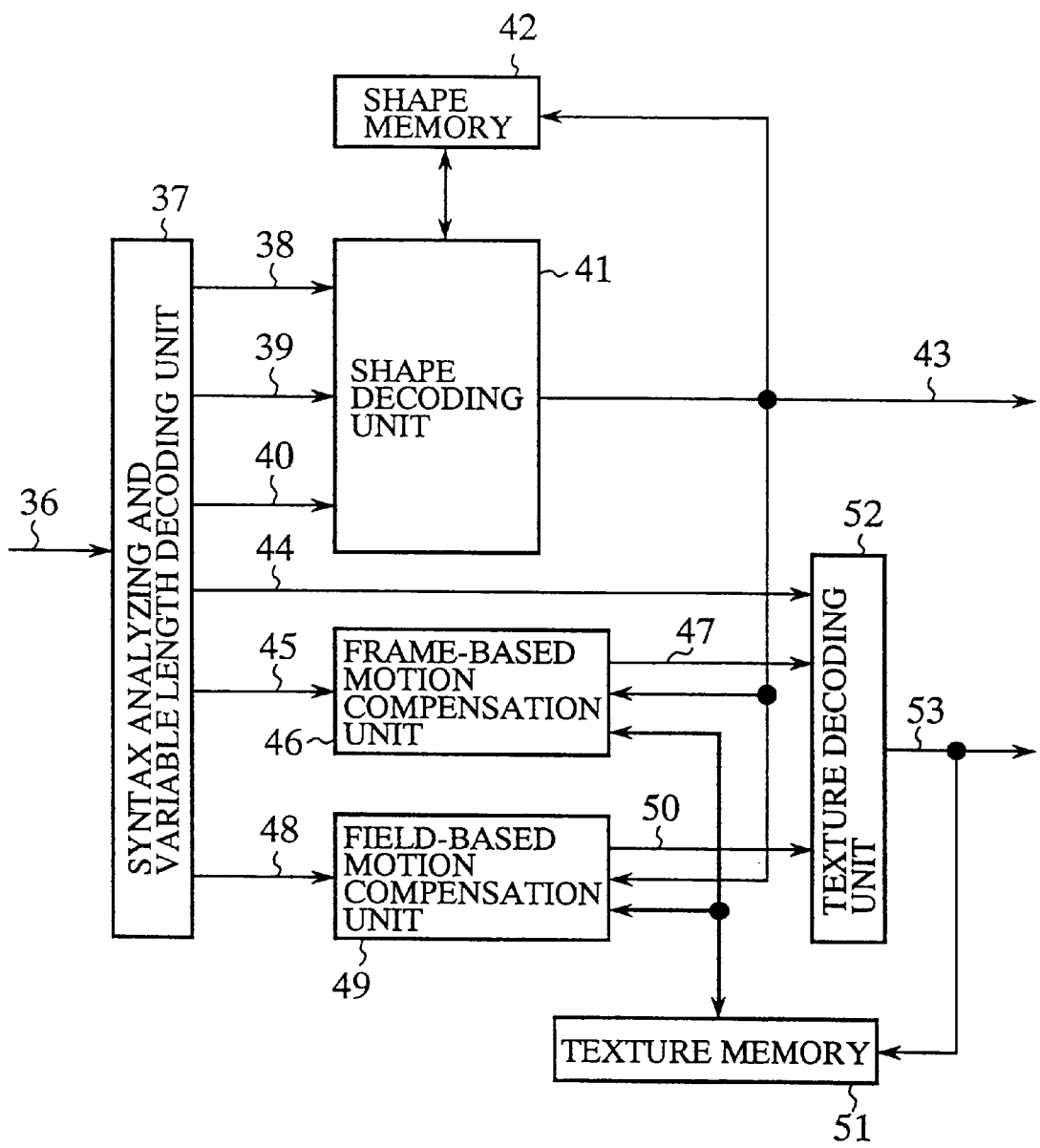
FIG. 6 is a block diagram showing the structure of a motion picture decoding system according to a second embodiment of the present invention.

Referring next to FIG. 6, there is illustrated a block diagram showing the structure of a motion picture decoding system according to a second embodiment of the present invention. In the figure, reference numeral 36 denotes a coded bitstream, 37 denotes a syntax analyzing and variable length decoding unit which can receive the coded bitstream 36 and then generate and furnish a coded shape data 38, a motion vector of shape 39, shape encoding mode information 40, a coded texture data 44, a frame-based motion vector 45, and field-based motion vectors 48, 41 denotes a shape decoding unit which can receive the coded shape data 38, the motion vector of shape 39, and the shape encoding mode information 40, and then generate and furnish a decoded shape data 43, and 42 denotes a shape memory for storing the decoded shape 43.

Furthermore, reference numeral 46 denotes a frame-based motion compensation unit which can receive the frame-based motion vector 45 and then generate and furnish a frame-based prediction data for shape 47, 49 denotes a field-based motion compensation unit which can receive the field-based motion vectors 48 and then generate and furnish a field-based prediction data for texture 50, 52 denotes a texture decoding unit which can receive the coded texture data 44, the frame-based prediction data for texture 47, and the field-based prediction data for texture 50, and then generate and furnish a decoded texture data 53, and 51 denotes a texture memory for storing the decoded texture data 53.

The motion picture decoding system according to the second embodiment of the present invention can be so constructed as to decode coded video object planes or VOP's. The description will be directed to an improvement in the decoding process by the motion picture decoding system when VOP's are interlaced images, which is the primary object of the present invention.

First, a description will be made as to the syntax analyzing process and the variable length decoding process of this embodiment. When the syntax analyzing and variable length decoding unit 37 receives the coded bitstream 36, it isolates or extracts the coded shape data 38, the motion vector of shape 39, the shape encoding mode information 40, the coded texture data 44, the frame-based motion vector 45, and the field-based motion vectors 48 from the coded bitstream 36 applied thereto, for each of alpha blocks into which the coded shape data of a current VOP to be decoded included in an interlaced frame is partitioned. The coded shape data 38, the motion vector of shape 39, the shape encoding mode information 40 are then delivered to the shape decoding unit 41, the coded texture data 44 is delivered to the texture decoding unit 52, the frame-based motion vector 45 is delivered to the frame-based motion compensation unit 46, and the field-based motion vectors 48 are delivered to the field-based motion compensation unit 49. The coded texture data 44 is decoded per macroblock. The coded shape data 38 is decoded per alpha block.

Next, the description will be directed to motion compensation in the texture decoding process. The syntax analyzing and variable length decoding unit 37 decodes the coded information indicating the texture encoding mode which was selected upon the process for encoding the texture data and then examines the decoded mode information. When the texture encoding mode information indicates that the inter mode with frame-based prediction was selected, the syntax analyzing and variable length decoding unit 37 isolates a frame-based motion vector 45 for each macroblock from the coded bitstream 36 and then furnishes it to the frame-based motion compensation unit 46. The frame-based motion compensation unit 46 then extracts a frame-based prediction data for texture 47 from the texture memory 51 according to the frame-based motion vector 45 applied thereto, as shown in FIG. 30. On the other hand, when the texture encoding mode information indicates that the inter mode with frame-based prediction was selected, the syntax analyzing and variable length decoding unit 37 isolates two field-based motion vectors 45 for each macroblock from the coded bitstream 36 and then decodes and furnishes them to the field-based motion compensation unit 49. The field-based motion compensation unit 49 then extracts a pair of field-based prediction data for texture 47 for the pair of top and bottom field from the texture memory 51 according to the field-based motion vectors 48 applied thereto, and mixes the pair of field-based prediction data for texture 47 to generate a field-based prediction data for texture 50, as shown in FIG. 30. When the texture encoding mode information indicates that the intra mode was selected, no motion vector is extracted from the coded bitstream 36 and hence no motion compensation is carried out prior to the texture decoding process.

Next, the description will be directed to the texture decoding process. The syntax analyzing and variable length decoding unit 37 extracts a coded texture data 44 from the coded bitstream 36 applied thereto and then delivers it to the texture decoding unit 52. When the texture encoding mode information indicates that the intra mode was selected when encoding the texture data, the coded texture data 44 of the macroblock to be decoded is the data which was obtained by encoding the intra signal of the corresponding macroblock. When the texture encoding mode information indicates that the inter mode was selected when encoding the texture data, the coded texture data 44 is the data which was obtained by encoding the prediction error or difference between the intra signal of the corresponding macroblock and the prediction data for texture which has been obtained by the above-mentioned motion compensation process. The texture decoding unit 52 reconverts the coded texture data 44 into a decoded texture data 53 by reverse quantization, reverse DCT, and so on. In addition, the texture decoding unit 52 adds the frame-based or field-based prediction data for texture 47 or 50 from the frame-based or field-based motion compensation unit 46 or 49 to the decoded texture data 53 so as to generate the final decoded texture data 53 in the inter mode.

Next, the description will be directed to the shape decoding process. Referring next to FIG. 7, there is illustrated a block diagram showing the structure of the shape decoding unit 41. In the figure, reference numeral 54 denotes a frame-based motion vector of shape included in the motion vectors of shape 39, 55 denotes a frame-based shape motion compensation unit which can receive the frame-based motion vector of shape 54 and then generate and furnish a frame-based prediction data for shape 56, 57 denotes field-based motion vectors of shape included in the motion vectors of shape 39, 58 denotes a field-based shape motion compensation unit which can receive the field-based motion vectors of shape 57 and then generate and furnish a field-based prediction data for shape 59, and 60 denotes an arithmetic decoding unit which can receive the frame-based prediction data for shape 56, the field-based prediction data for shape 59, the coded shape data 38, and the shape encoding mode information 40, and then generate and furnish a decoded shape data 43.

By using the following procedures, the coded shape data will be decoded.

(1) The shape encoding mode information is decoded.

(2) One or more motion vectors of shape are decoded.

(3) Motion compensation is carried out for the shape decoding process.

(4) Arithmetic encoding including a context calculation is carried out.

The syntax analyzing and variable length decoding unit 37 performs the process (1) for encoding the shape encoding mode information. The syntax analyzing and variable length decoding unit 37 further performs the process (2) for encoding one or more motion vectors of shape 39 according to the decoded shape encoding mode information 40. When the shape encoding mode information 40 represents the intra mode, no motion vector is applied to the shape decoding unit. When the shape encoding mode information 40 represents the inter mode with frame-based prediction for shape, one frame-based motion vector of shape 54 is applied to the frame-based shape motion compensation unit of the shape decoding unit and it is then decoded for each alpha block. When the shape encoding mode information 40 represents the inter mode with intra-VOP field-based prediction for shape or inter-VOP field-based prediction for shape, two field-based motion vectors of shape 57 are applied to the field-based shape motion compensation unit of the shape decoding unit and they are then decoded for each alpha block.

The above-mentioned processes (3) and (4) will be described for each of the shape encoding modes hereinafter. When the shape encoding mode information 40 represents the intra mode, the motion compensation process (3) is not carried out. The coded shape data 38 extracted by the syntax analyzing and variable length decoding unit 37 is applied to the arithmetic decoding unit 60, and the arithmetic decoding unit 60 then computes a context for each pixel of the alpha block currently being decoded as shown in FIG. 29a from only the coded shape data 38 of the alpha block, and estimates the probability that the value of the target pixel is 0 or 1 by referring to the same probability table as that used when encoding the shape data. The coded shape data 38 of the alpha block is thus decoded into a sequence of 8-bit binary data each having a value of 0 or 255 in decimal.

When the shape encoding mode information 40 represents the inter mode with frame-based prediction for shape, the frame-based shape motion compensation unit 55 shown in FIG. 7 carries out motion compensation for the shape data. The frame-based shape motion compensation unit 55 extracts a frame-based prediction data for shape 56 as shown in FIG. 3 from the shape memory 42 according to the frame-based motion vector of shape applied thereto. The frame-based shape motion compensation unit 55 then delivers the frame-based prediction data for shape 56 to the arithmetic decoding unit 60. The arithmetic decoding unit 60 computes a context number for each pixel of the alpha block currently being decoded from the coded shape data 38 extracted by the syntax analyzing and variable length decoding unit 37 and the frame-based prediction data for shape 56 extracted by the frame-based shape motion compensation unit 55, as shown in FIG. 29b. The arithmetic decoding unit 60 then estimates the probability that the value of each pixel is 0 or 1 by referring to the same probability table as that used when encoding the shape data. The coded shape data 38 of the alpha block is thus decoded into a sequence of 8-bit binary data each having a value of 0 or 255 in decimal.

When the shape encoding mode information 40 represents the inter mode with inter-VOP field-based prediction for shape, the field-based shape motion compensation unit 58 shown in FIG. 7 carries out motion compensation for the shape data of the alpha block currently being decoded. The field-based shape motion compensation unit 58 extracts a field-based prediction data for shape 59 as shown in FIG. 3 from the shape memory 42 according to the two field-based motion vectors of shape 57 applied thereto. The field-based shape motion compensation unit 58 then delivers the field-based prediction data for shape 59 to the arithmetic decoding unit 60. The arithmetic decoding unit 60 then computes a context number for each pixel of the alpha block according to a context construction as shown in FIG. 29b, or according to another context construction used when encoding the shape data, from the coded shape data 38 extracted by the syntax analyzing and variable length decoding unit 37 and the field-based prediction data for shape 59 extracted by the field-based shape motion compensation unit 58. The arithmetic decoding unit 60 then estimates the probability that the value of each pixel of the alpha block is 0 or 1 by referring to the same probability table as that used when encoding the shape data. The coded shape data 38 is thus decoded into a sequence of 8-bit binary data each having a value of 0 or 255 in decimal.

When the shape encoding mode information 40 represents the inter mode with intra-VOP field-based prediction for shape, the field-based shape motion compensation unit 58 shown in FIG. 7 carries out motion compensation for the shape data. The field-based shape motion compensation unit 58 extracts intra-VOP field-based prediction data for shape 59 (for simplicity, the same reference numeral as the inter-VOP field-based prediction data for shape is assigned to the intra-VOP field-based prediction data for shape) as shown in FIG. 5 from the shape memory 42 according to the two field-based motion vectors of shape 57 applied thereto. The field-based shape motion compensation unit 58 then delivers the intra-VOP field-based prediction data for shape 59 to the arithmetic decoding unit 60. The arithmetic decoding unit 60 computes a context number for each pixel of the alpha block currently being decoded according to a context construction as shown in FIG. 29b, or according to another context construction used when encoding the shape data, from the coded shape data 38 extracted by the syntax analyzing and variable length decoding unit 37 and the field-based prediction data for shape 59 extracted by the field-based shape motion compensation unit 58. The arithmetic decoding unit 60 then estimates the probability that the value of each pixel of the alpha block is 0 or 1 by referring to the same probability table as that used when encoding the shape data. The coded shape data 38 is thus decoded into a sequence of 8-bit binary data each having a value of 0 or 255 in decimal.

The shape data 43 which has been reconstructed as a sequence of 8-bit binary data each having a value of 0 or 255 in decimal through any one of the above processes in the four different decoding modes is then delivered to both the frame-based and field-based motion compensation units 46 and 49 for texture decoding and is also stored in the shape memory 42 for later alpha block decoding.

As previously mentioned, the decoding system according to the second embodiment can decode an interlaced, coded shape data by carrying out motion compensation while making a correction to the difference in the position of a moving object between the two fields of an interlaced frame. Thus the present embodiment offers an advantage of being able to encode the shape data more smoothly as compared with the prior art decoding system.

Numerous variants may be made in the exemplary embodiment shown. It is apparent that instead of the same arithmetic decoding method as that used in the prior art decoding system, another decoding method other than the arithmetic decoding method, which corresponds to an encoding method used when encoding the shape data, can be used by replacing the arithmetic decoding unit with another unit which conforms to the other decoding method.

Figure 8A:
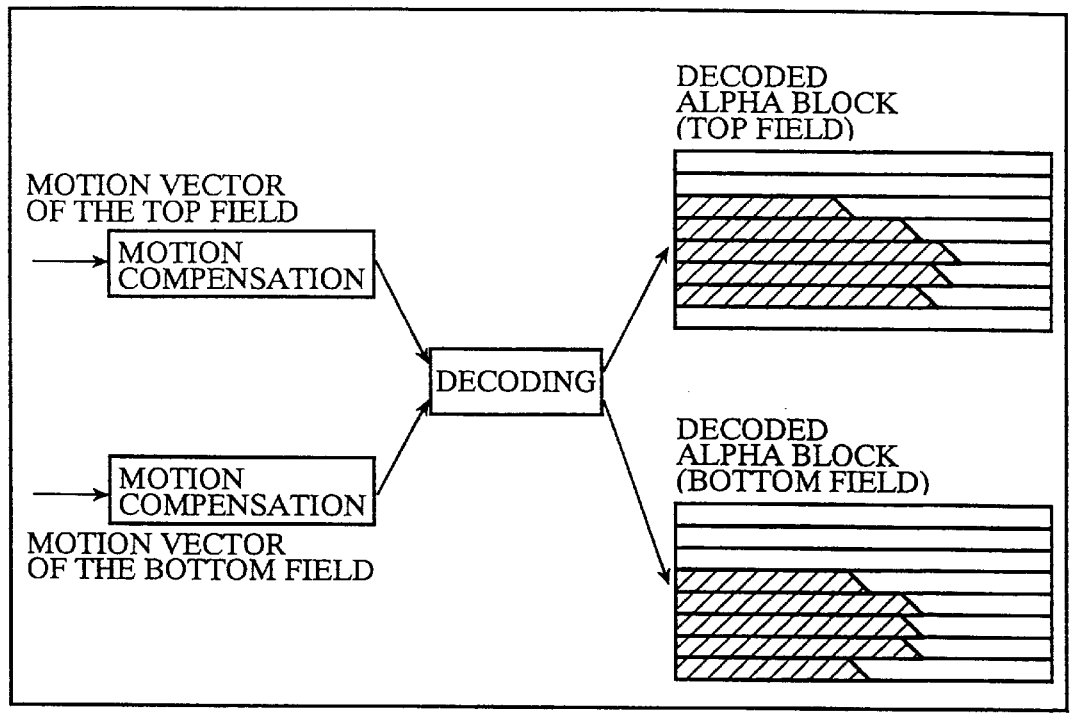
FIG. 8a is a diagram for explaining shape encoding according to the second embodiment of the present invention.
Figure 8B:
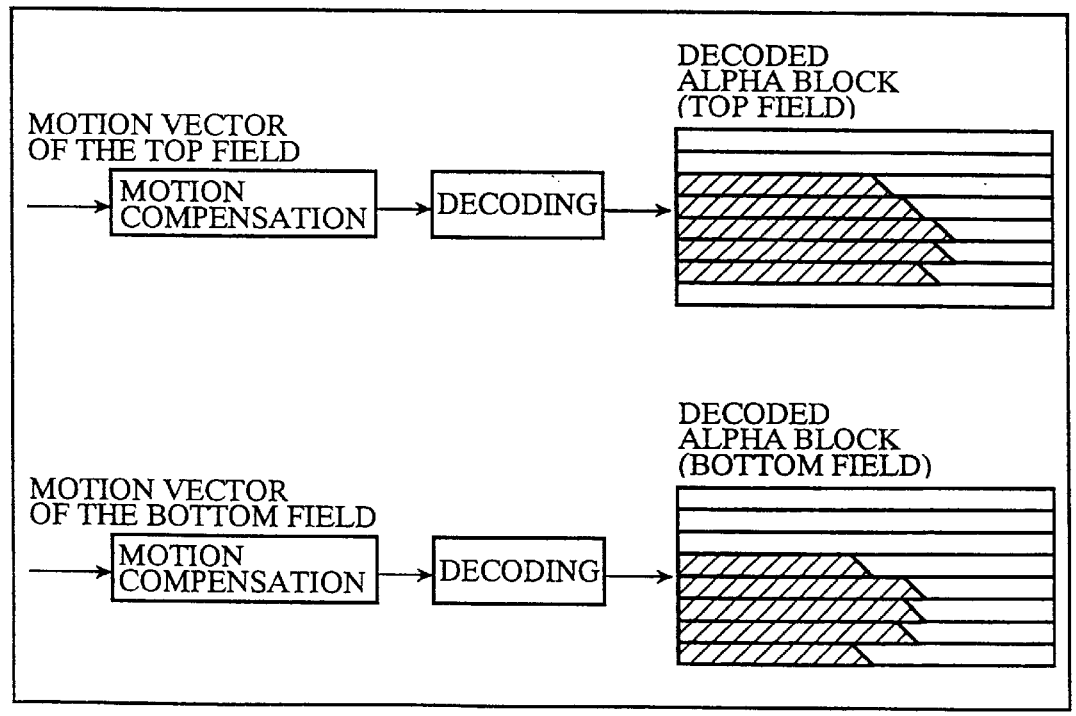
FIG. 8b is a diagram for explaining shape encoding according to a variant of the second embodiment of the present invention.

In anther variant, when the shape encoding mode information 40 represents the inter mode with inter-VOP field-based prediction for shape or intra-VOP field-based shape prediction for shape, instead of combining the pair of field-based prediction data for shape of the top and bottom fields of each alpha block to be decoded included in an interlaced frame into a field-based prediction data for shape 31 in the form of a frame, as shown in FIG. 8a, a shape prediction data can be provided independently for each of the top and bottom fields so as to decode the coded shape data of each alpha block to be decoded of the frame. This variant can offer the same advantage as that offered by the preferred embodiment mentioned above. The decoded results for the top and bottom fields are combined into a result in the form of frame. The reconstructed frame is then displayed.

Third Embodiment

Referring next to FIG. 9, there is illustrated a block diagram showing the structure of a motion picture encoding system according to a third embodiment of the present invention. In the figure, reference numeral 61 denotes texture prediction mode information indicating a texture encoding mode selected. The other components in the figure are the same as those of the first embodiment shown in FIG. 1.

The motion picture encoding system according to the third embodiment of the present invention can be so constructed as to encode video object planes or VOP's. The description will be directed to an improvement in the decoding process by the motion picture decoding system when VOP's are interlaced images, which is the primary object of the present invention.

In the first embodiment, the texture encoding mode and the shape encoding mode are determined independently. On the contrary, in the present embodiment, the texture and shape encoding process can be done while the texture encoding mode information and the shape encoding mode information are determined in relation to each other. In general, when encoding an interlaced signal, the selection of field-based prediction upon texture encoding points to the conclusion that there exist a noticeable difference in the position of a moving object between the two fields of an interlaced frame. Accordingly, in this case, it is appropriate to carry out field-based prediction for the shape data as well. On the contrary, the selection of frame-based prediction upon texture encoding points to the conclusion that there does not exist a noticeable difference in the position of a moving object between the two fields of an interlaced frame. Accordingly, in this case, it is appropriate to carry out frame-based prediction for the shape data as well. From this point of view, the shape encoding mode is varied according to the texture prediction mode in order to reduce the amount of computations required for determining the shape encoding mode and the amount of codes included in the coded shape encoding mode information.

To be more specific, the texture encoding unit 18 furnishes the texture encoding mode information 61 to the shape encoding unit 3, as shown in FIG. 9. The shape encoding unit 3 carries out a process for encoding the shape data 2 according to the texture encoding mode information 61.

Figure 10:
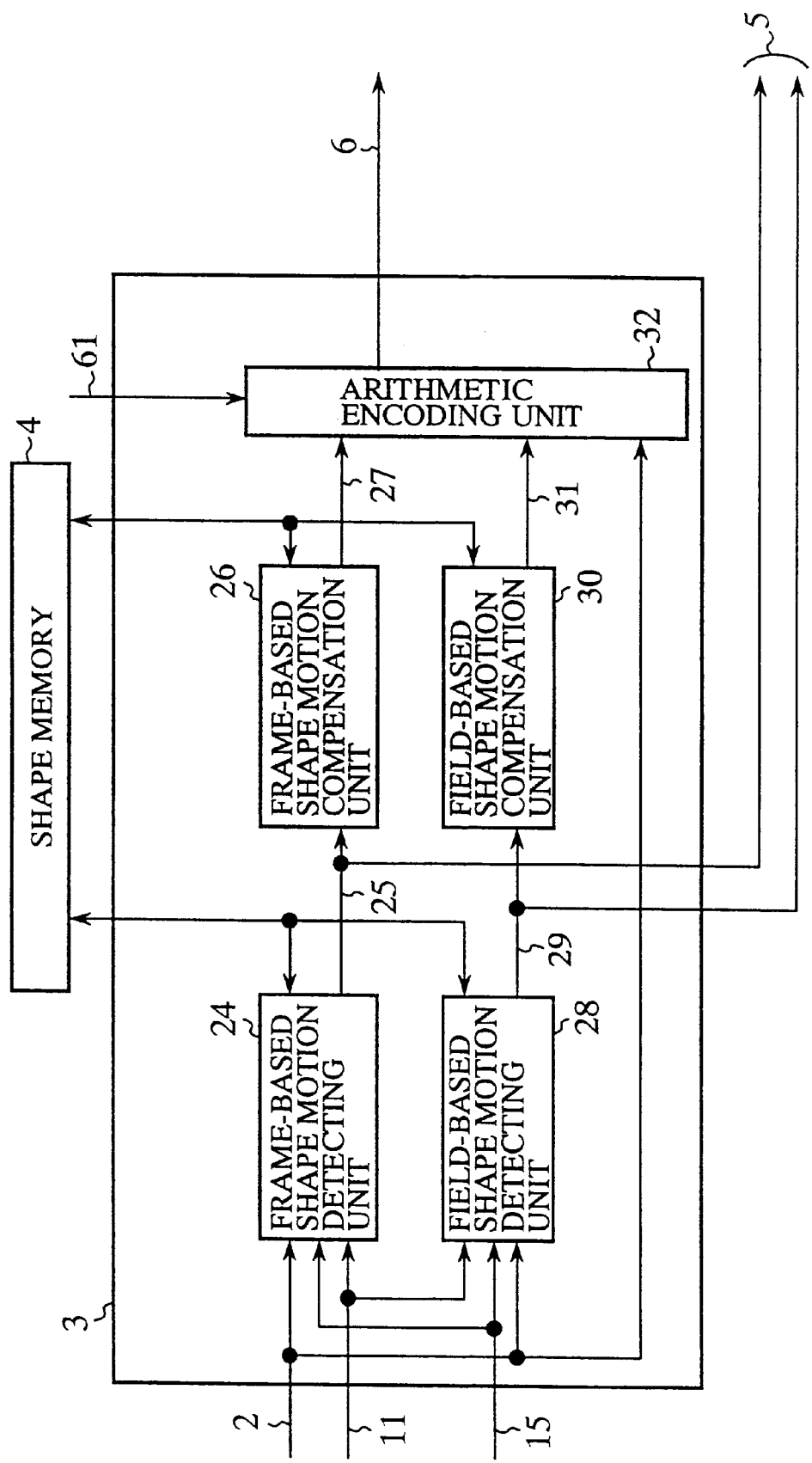
FIG. 10 is a block diagram showing the structure of a shape encoding unit of the motion picture encoding system according to the third embodiment shown in FIG. 9.

Referring next to FIG. 10, there is illustrated a block diagram showing the structure of the shape encoding unit 3. The arithmetic encoding unit 32 does not perform the encoding process in either one of all the shape encoding modes. That is, the arithmetic encoding unit 32 performs the encoding process in only one encoding mode selected according to the texture encoding mode information 61 furnished by the texture encoding unit 18, unlike the aforementioned first embodiment of the present invention.

For example, the texture encoding mode information 61 can have four varieties of values indicating the intra mode, the inter mode with frame-based prediction, the inter mode with inter-VOP field-based prediction, and the inter mode with intra-VOP field-based prediction. The arithmetic encoding unit 32 of the shape encoding unit 3 performs the encoding process in only one selected mode which is defined by the texture encoding mode information 61. The shape encoding unit 3 then furnishes a coded shape data 6 to the variable length encoding and multiplexing unit 22. In the encoding system of this embodiment, the texture encoding mode information 61 is multiplexed into a coded bitstream. Accordingly, this results in eliminating a process for encoding and multiplexing the shape encoding mode information into the bitstream.

As previously mentioned, the present embodiment offers an advantage of being able to reduce the amount of computations in the shape encoding process. Furthermore, since it is unnecessary to encode the shape encoding mode information, the amount of codes included in the coded bitstream can be reduced.

In a variant, when the inter mode with field-based prediction for shape is selected, the encoding process can be done independently for each of the top and bottom fields of each alpha block to be encoded of an interlaced frame, instead of encoding the alpha block by combining the pair of field-based prediction data for shape for the top and bottom fields of the alpha block of the interlaced frame into a field-based prediction data for shape in the form of a frame by means of the shape encoding unit 3. The variant can offer the same advantage as that offered by the third embodiment mentioned above.

Fourth Embodiment

Figure 11:
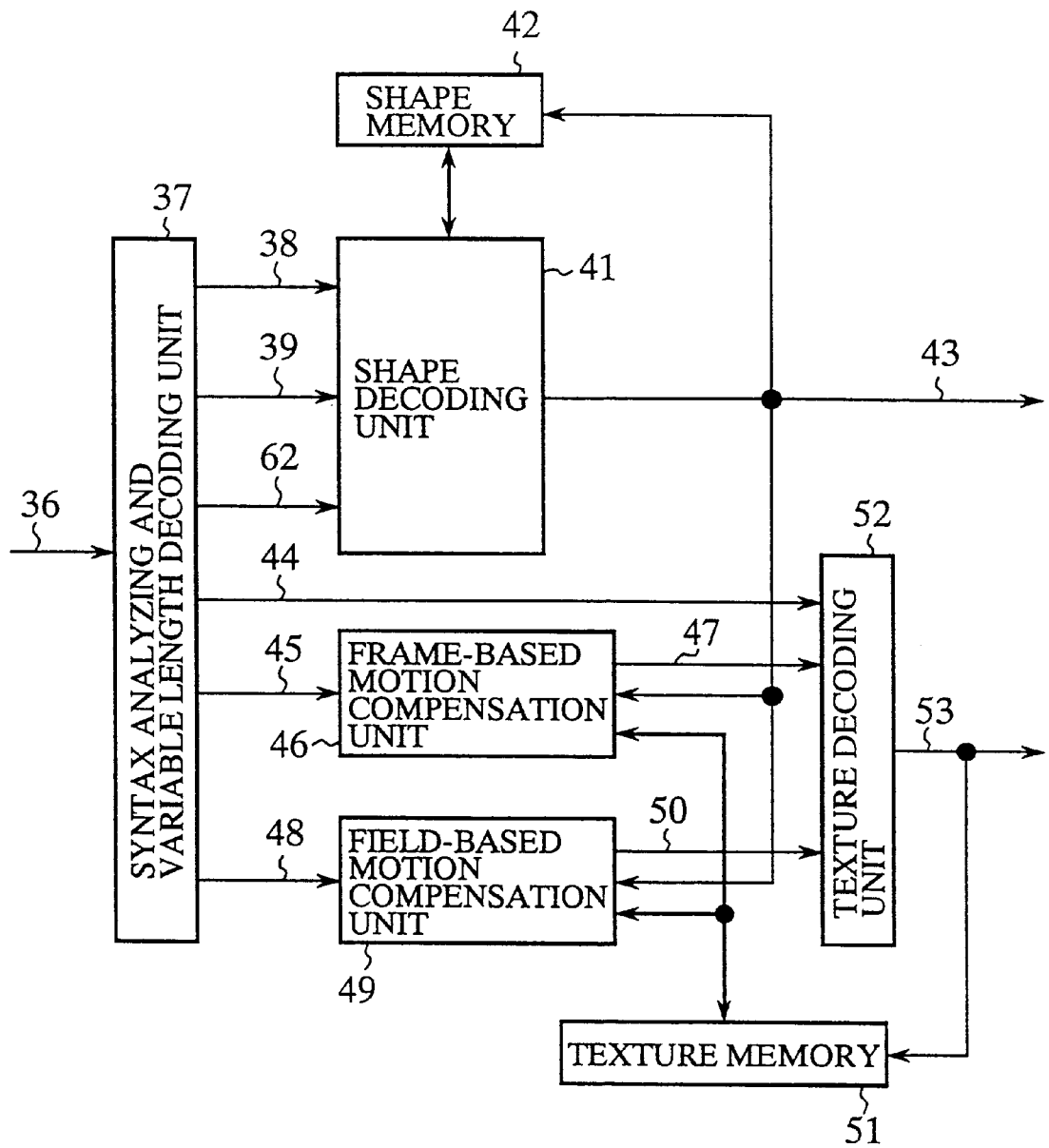
FIG. 11 is a block diagram showing the structure of a motion picture decoding system according to a fourth embodiment of the present invention.

Referring next to FIG. 11, there is illustrated a block diagram showing the structure of a motion picture decoding system according to a fourth embodiment of the present invention. In the figure, reference numeral 62 denotes texture encoding mode information indicating a texture encoding mode selected when encoding the texture data. Referring now to FIG. 12, it illustrates a block diagram showing the structure of the shape decoding unit 41. The motion picture decoding system of this embodiment differs from that of the second embodiment shown in FIGS. 6 and 7 in that the texture encoding mode information 62, instead of the shape encoding mode information, is applied to the shape decoding unit 41.

The syntax analyzing and variable length decoding unit 37 decodes the texture encoding mode information coded per macroblock and then delivers the decoded texture encoding mode information 62 as the shape encoding mode information to the shape decoding unit 41 so that the shape decoding unit 41 performs a decoding process in the shape decoding mode indicated by the shape encoding mode information, i.e., the texture encoding mode information 62. The texture encoding mode information 62 can have the same varieties of values as the shape encoding mode information. The shape decoding unit 41 performs a decoding process in the same manner as that of the second embodiment.

As previously mentioned, the decoding system according to the fourth embodiment can decode the coded shape data of an interlaced frame by carrying out motion compensation while making a correction to the difference in the position of a moving object between the two fields of the interlaced frame. Thus the present embodiment offers an advantage of being able to encode the shape data more smoothly as compared with the prior art decoding system.

Numerous variants may be made in the exemplary embodiment mentioned above. It is apparent that instead of the same arithmetic decoding method as that used in the prior art decoding system, another decoding method other than the arithmetic decoding method, which corresponds to an encoding method used when encoding the shape data, can be used by replacing the arithmetic decoding unit with another unit which conforms to the other decoding method.

In another variant, when the inter mode with inter-VOP field-based prediction for shape or intra-VOP field-based prediction for shape is selected as the shape encoding mode dependent on the texture encoding mode, a prediction data for shape can be generated independently for each of the top and bottom fields of each alpha block to be decoded so as to decode the coded shape data, instead of decoding the coded shape data of the alpha block by combining the pair of field-based prediction data for shape for the top and bottom fields of each alpha block to be decoded into a field-based prediction data for shape in the form of a frame. The variant can offer the same advantage as that offered by the above-mentioned exemplary embodiment. The decoded results for the top and bottom fields are combined into a decoded result in the form of a frame and the frame is then displayed.

Fifth Embodiment

Figure 13:
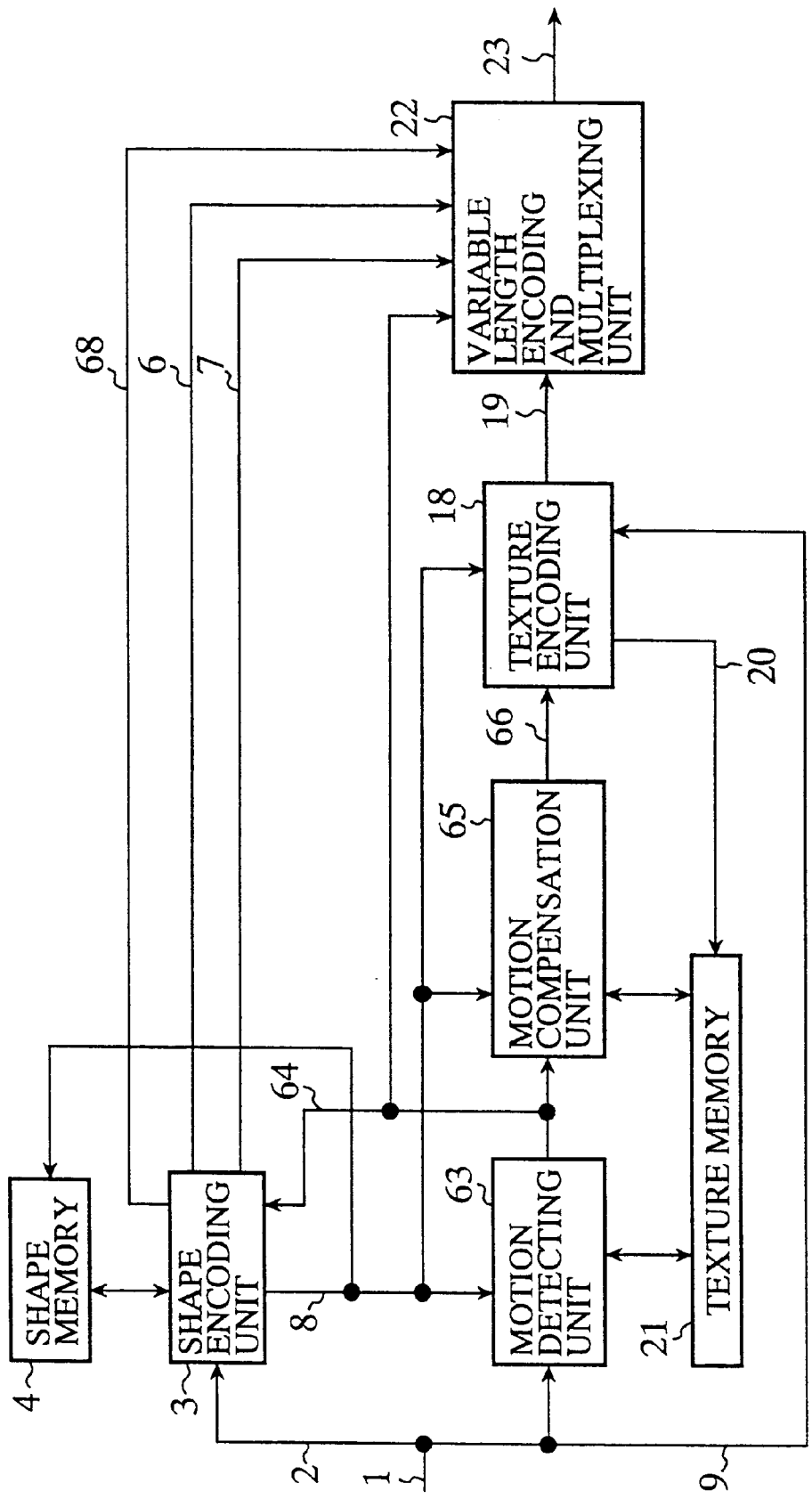
FIG. 13 is a block diagram showing the structure of a motion picture encoding system according to a fifth embodiment of the present invention.

Referring next to FIG. 13, there is illustrated a block diagram showing the structure of a motion picture encoding system according to a fifth embodiment of the present invention. In the figure, reference numeral 63 denotes a motion detecting unit which for example corresponds to the combination of the frame-based motion detecting unit 10 and the field-based motion detecting unit 14 as shown in FIG. 1, 64 denotes motion vectors which for example correspond to the combination of the frame-based motion vector 11 and the field-based motion vectors 15 as shown in FIG. 1, 65 denotes a motion compensation unit which for example corresponds to the combination of the frame-based motion compensation unit 12 and the field-based motion compensation unit 16, and 66 denotes to a prediction data for texture which for example corresponds to the combination of the frame-based prediction data for texture 13 and the field-based prediction data for texture 17 as shown in FIG. 1.

The description will be directed to an improvement in the encoding process by the motion picture encoding system of this embodiment when VOP's are interlaced images, which is the primary object of the present invention. First, a description will be made as to the texture encoding process. In the present embodiment, the texture encoding process can be done in the same manner as the first embodiment mentioned above, for example. As illustrated in FIG. 13, the motion detecting unit 63 is not divided into a frame-based motion detecting section and a field-based motion detecting section, and the motion compensation unit 65 is not divided into a frame-based motion compensation section and a field-based motion compensation section. This means that what internal processes are carried out in the motion detecting unit 63 and the motion compensation unit 65 is a matter of indifference. The shape encoding unit 3 requires only a motion vector data, which was estimated per macroblock in the texture data prediction, for the motion prediction for the shape data. The motion vector data can be a frame-based one or a field-based one.

Figure 14:
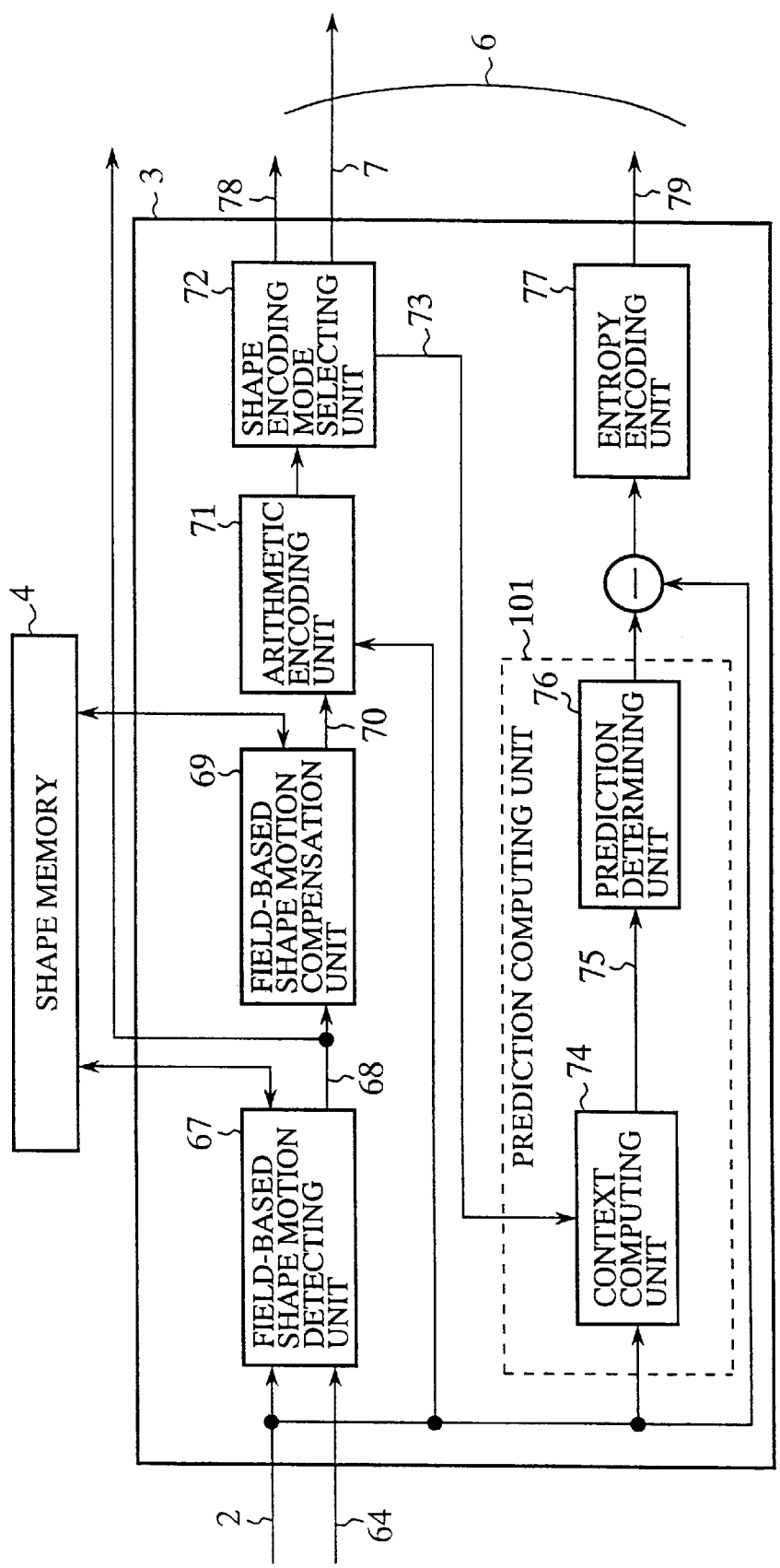
FIG. 14 is a block diagram showing the structure of a shape encoding unit of the motion picture encoding system according to the fifth embodiment shown in FIG. 13.

Next, a description will be made as to the shape data encoding process. Referring next to FIG. 14, there is illustrated a block diagram showing the structure of the shape encoding unit 3. In the figure, reference numeral 67 denotes a field-based shape motion detecting unit which can receive the shape data 2 and then detect field-based motion vectors of shape 68, 69 denotes a field-based shape motion compensation unit which can receive the field-based motion vectors of shape 68 and then generate and furnish a field-based prediction data for shape 70, 71 denotes an arithmetic encoding unit which can receive the field-based prediction data for shape 70, and then arithmetic encode the shape data 2 of a first field of each alpha block to be encoded in both intra mode and inter mode, and 72 denotes a shape encoding mode selecting unit which can determine one of the two different encoding modes that provides a coded result having a shorter code length, and then furnish a coded shape data 78 of the first field and shape encoding mode information 7 indicating the selected shape encoding mode.

Furthermore, reference numeral 73 denotes a local decoded data of the first field furnished by the shape encoding mode selecting unit 72, 74 denotes a context computing unit which can receive the shape data 2 and then compute and furnish a context number 75 used for inter-line prediction which will be described below, 76 denotes a prediction determining unit which can receive the context number 75 and then determine a prediction or predicted value, 77 denotes an entropy encoding unit which can receive the difference between the prediction determined by the prediction determining unit 76 and the shape data 2 and then furnish a coded shape data 79 of a corresponding second field, and 101 denotes a prediction computing unit constructed of the context computing unit 74 and the prediction determining unit 76.

In the fifth embodiment, arithmetic encoding with motion prediction is carried out first for one of the two fields of each alpha block to be encoded, which will be referred to as the first field the shape data of which is encoded before encoding the shape data of the other field which will be referred to as the second field. For the second field of each alpha block to be encoded, a prediction is made in the same space by using both the local decoded data of the first field and the coded data of alpha blocks in the vicinity of the current alpha block which are stored in the shape memory so as to arithmetic encode the prediction error of each pixel of the current alpha block to be encoded, which shows the difference between the prediction or predicted value determined by the prediction determining unit 76 and the actual value or shape data of each pixel.

Next, the description will be directed to the encoding process for the first field. In the motion prediction for the first field, inter-VOP field-based prediction for shape is made. The field-based shape motion detecting unit 67 detects a field-based motion vector of shape 68 for the first field of each alpha block to be encoded of an interlaced frame. At that time, the field-based shape motion detecting unit 67 refers to a motion vector data 64 furnished by the texture encoding part of the encoding system. When the field-based shape motion compensation unit 69 receives the field-based motion vector of shape 68 from the field-based shape motion detecting unit 67, it generates a field-based prediction data for shape 70. The arithmetic encoding unit 71 then arithmetic encodes the shape data 2 of the first field in the intra mode and further arithmetic encodes the shape data 2 of the first field using the field-based prediction data for shape 70 in the inter mode. The shape encoding mode selecting unit 72 selects either the coded result obtained in the intra mode or the coded result obtained in the inter mode. The shape encoding mode selecting unit 72 selects the one having a shorter code length. The selected arithmetic-coded result is then furnished as the coded shape data 78 of the first field together with the shape encoding mode information 7 indicating the selected encoding mode. The local decoded data 73 of the first field is furnished to the context computing unit 74 for encoding the second field of the alpha block currently being encoded.

As previously mentioned in First Embodiment, entropy encoding other than the arithmetic encoding can be applied to the shape encoding process for the first field.

Next, a description will be made as to the encoding process for the second field. The encoding process for the second field can be done by using the following procedures.

(1) Compute a context number used for inter-line prediction.

(2) Provide an estimate of the target pixel currently being encoded from the computed context number used for inter-line prediction.

(3) Entropy encode the prediction error showing the difference between the actual value of the pixel and its prediction or predicted value.

Figure 15:
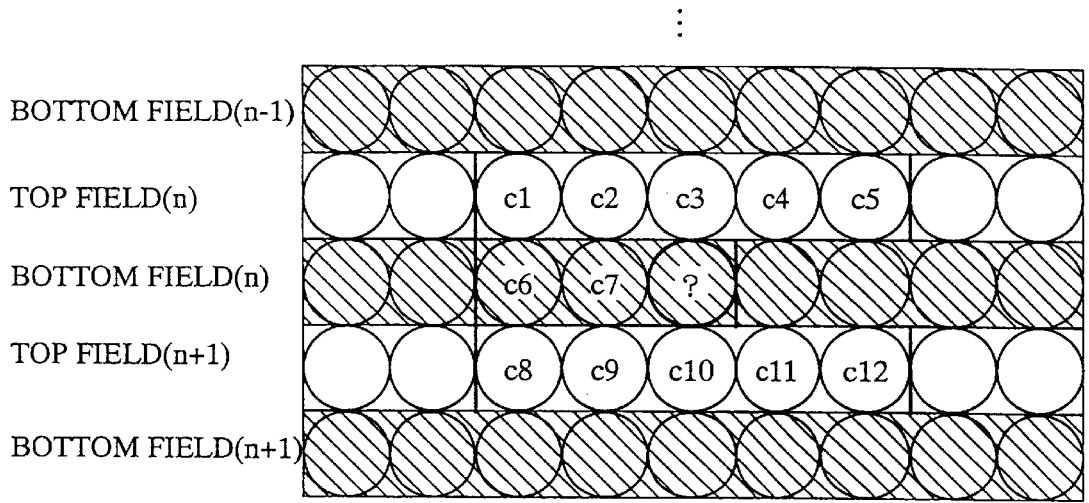
FIG. 15 is a diagram showing a context construction according to the fifth embodiment of the present invention.

The above procedures will be described in greater detail hereinafter. First, the context computing unit 74 computes a context number used for the inter-line prediction. Referring next to FIG. 15, it illustrates a diagram showing the context construction for the inter-line prediction. In the inter-line prediction, an estimate of the target pixel currently being encoded is provided from the values of other pixels arranged on other lines above and under the line on which the target pixel is located, as shown in FIG. 15. The context computing 74 computes a context number 75 for the target pixel currently being encoded in the second field, which is marked with '?', from the values of other pixels c1 through c12 of FIG. 15 in the vicinity of the target pixel according to the following equation.

$$\sum_{k=1}^{12} C_k * 2^k \quad (2)$$

The prediction determining unit 76 then forms a prediction for the target pixel currently being encoded according to the computed context number used for the inter-line Prediction. That is, the prediction determining unit 76 provides an estimate of the value of the target pixel currently being encoded from the computed context number 75. A rule to determine an estimate of the value of the target pixel according to the context number 75 must be provided in advance of making the prediction. For example, when the values of the other pixels c1 through c12 are all 1, that is, when the context number is 4095, the value of the target pixel marked with '?' is estimated to be 1. When the values of the other pixels c1 through c12 are all 0, that is, when the context number is 0, the value of the target pixel marked with '?' is estimated to be 0. Such a rule is predetermined. Predicted values are thus obtained for all the pixels in the second field of the alpha block currently being encoded.

The difference between the actual value of the target pixel currently being encoded, which is marked with '?' in FIG. 15, and its prediction or predicted value determined by the prediction determining unit 76 is then computed. The prediction error can have any of three possible values: 1, 0, and −1. Using context numbers for inter-line prediction computed for all the pixels in the second field of the alpha block, a small difference in the position of a moving object between the two fields of the interlaced frame can be corrected and hence the possibility that the prediction error of each pixel is 0 is increased. The entropy encoding unit 77 can reduce the redundancy by carrying out appropriate entropy encoding such as run-length encoding. The entropy encoding unit 77 furnishes the coded result as the coded shape data 79 of the second field.

Numerous variants may be made in the exemplary embodiment shown. It is apparent that another encoding method other than the arithmetic encoding method can be used for encoding the field to be referred to, i.e., the first field of each alpha block to be encoded of an interlaced frame. It is also clear that the context construction mentioned above as an example can be replaced by another context construction which is defined in the same manner as that used for a corresponding decoding process no matter how the other context construction is defined.

As previously mentioned, the encoding system according to the fifth embodiment can encode an interlaced shape data by forming predictions for one of the pair of two fields of an interlaced frame to be encoded using the other field. Thus the present embodiment offers an advantage of being able to improve the encoding efficiency as compared with the case of arithmetic encoding all the pixels of each alpha block to be encoded similarly.

Sixth Embodiment

Figure 16:
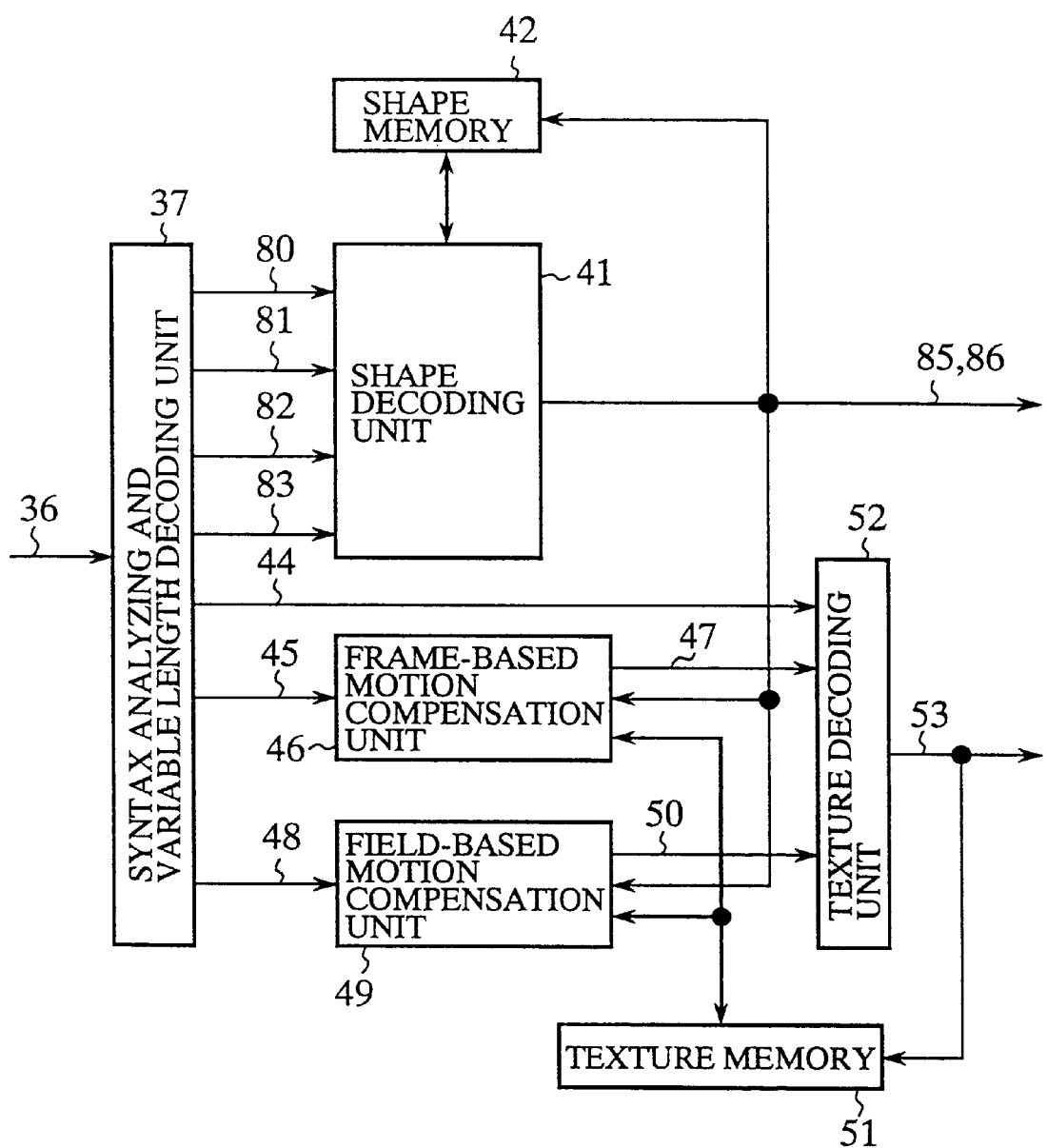
FIG. 16 is a block diagram showing the structure of a motion picture decoding system according to a sixth embodiment of the present invention.

Referring next to FIG. 16, there is illustrated a block diagram showing the structure of a motion picture decoding system according to a sixth embodiment of the present invention. The motion picture decoding system is so constructed as to decode a coded bitstream generated by the motion picture encoding system according to the fifth embodiment. The motion picture decoding system of the sixth embodiment can extract the coded prediction error data of each alpha block to be decoded included in an interlaced frame from a coded bitstream applied thereto, form an inter-line prediction for each pixel in a second field of the alpha block, and reconstruct the frame. In FIG. 16, reference numeral 80 denotes the coded shape data of a first field of each alpha block to be decoded of the interlaced frame, which is furnished by the syntax analyzing and variable length decoding unit 37, 81 denotes a field-based motion vector of shape which is also furnished by the syntax analyzing and variable length decoding unit 37, 82 denotes shape encoding mode information showing a shape encoding mode selected upon the encoding process, which is also furnished by the syntax analyzing and variable length decoding unit 37, and 83 denotes the coded shape data of the second field of the alpha block to be decoded, which is also furnished by the syntax analyzing and variable length decoding unit 37.

The motion picture decoding system according to the sixth embodiment of the present invention can be so constructed as to decode coded video object planes or VOP's. The description will be directed to an improvement in the decoding process by the motion picture decoding system when VOP's are interlaced images, which is the primary object of the present invention. The texture decoding process of this embodiment is the same as that of the second embodiment, and therefore the description about the texture decoding process will be omitted hereinafter. Accordingly, only a description about the shape decoding will be made hereinafter.

First, a description will be made as to the syntax analyzing process and the variable length decoding process of this embodiment. When the syntax analyzing and variable length decoding unit 37 receives a coded bitstream 36, it isolates the coded shape data of each of the two fields of each alpha block to be encoded included in an interlaced frame from the coded bitstream 36. The field that is extracted first from the coded bitstream 36 is referred to as the first field, and the other field is referred to as the second field, like the fifth embodiment mentioned above. The coded shape data 80 of the first field is the code word which was arithmetic encoded by the motion picture encoding system of the fifth embodiment, for example. The coded shape data 80 of the first field is then delivered to the shape decoding unit 41, together with the shape encoding mode information 82 showing whether the intracoded shape data or the interceded shape data was selected as the coded shape data and the field-based motion vector of shape 81 when the inter mode was selected. The coded data 83 of the second field is the code word which was obtained by entropy encoding the prediction error data obtained by prediction using a local decoded data of the first field. The coded shape data 83 of the second field is delivered to the shape decoding unit 41.

Figure 17:
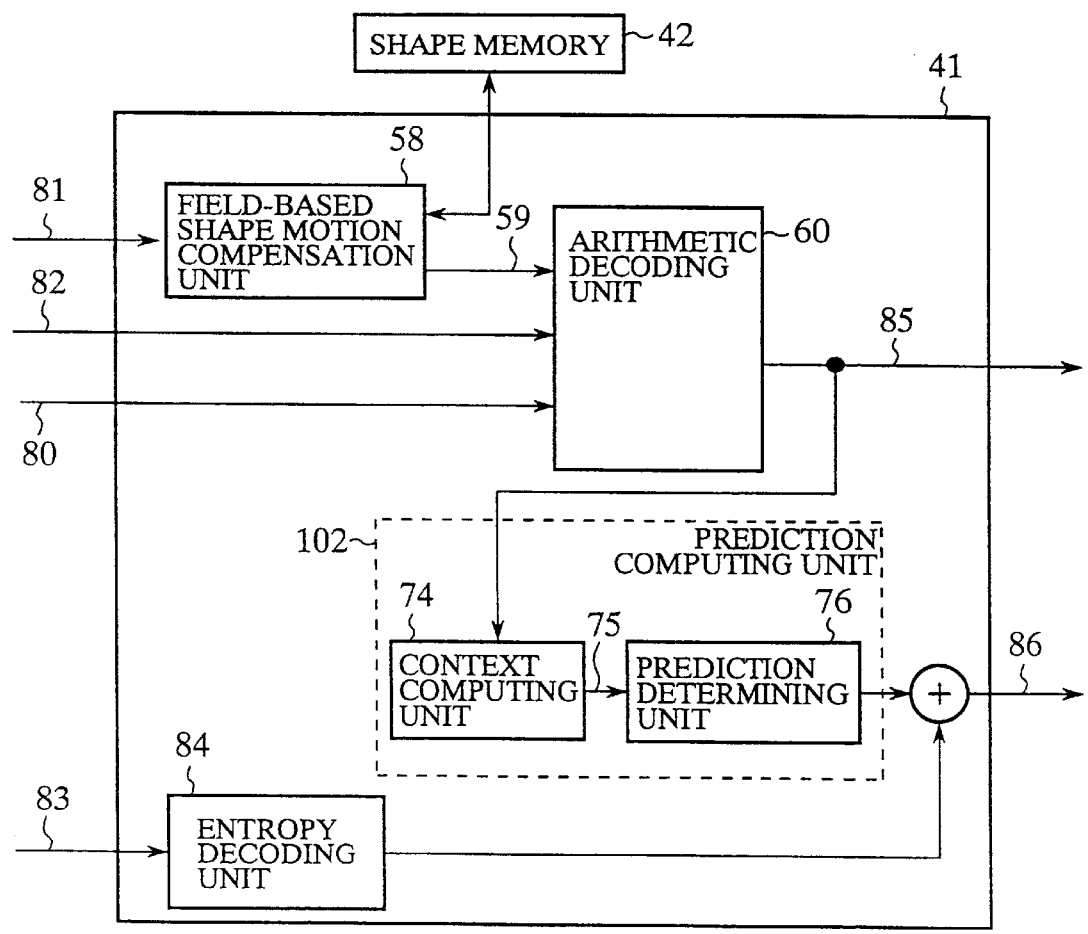
FIG. 17 is a block diagram showing the structure of a shape encoding unit of the motion picture decoding system according to the sixth embodiment shown in FIG. 16.

Next, the description will be directed to the shape decoding process. Referring next to FIG. 17, there is illustrated a block diagram showing the structure of the shape decoding unit 41. In the figure, reference numeral 84 denotes an entropy decoding unit which can decode the coded shape data 83 of the second field, 85 denotes a decoded shape data of the first field which is furnished by the arithmetic decoding unit 60, 86 denotes a decoded shape data of the second field which is obtained by adding a prediction or predicted value from the prediction determining unit 76 to the output of the entropy decoding unit 84, and 102 denotes a prediction computing unit constructed of the context computing unit 74 for computing a context number used for inter-line prediction and the prediction determining unit 76.

By using the following procedures, the coded shape data of each alpha block to be decoded of an interlaced frame will be decoded.

(1) The first field is decoded with motion compensation and arithmetic decoding.

(2) The second field is decoded by computing a context number used for inter-line prediction for each pixel in the second field, determining a prediction or predicted value using the context number (i.e., providing an estimate of the value of each pixel), and adding the decoded prediction error to the prediction.

The process (1) for decoding the coded shape data of the first field is carried out similar to the decoding process based on motion compensation and arithmetic encoding as previously mentioned in the above preferred embodiments. The decoding process of this embodiment differs from those of the above-mentioned exemplary embodiments in that the decoded shape data 85 of the first field is delivered to the prediction computing unit 102 to decode the second field or reconstruct the shape data of the second field.

In the decoding process for the second field, the context computing unit 74 computes a context number used for inter-line prediction for the target pixel currently being decoded. The context computing 74 computes a context number 75 given by the above equation (2) for the target pixel currently being decoded, which is marked with '?' in FIG. 15, according to the context construction shown in FIG. 15.

The prediction determining unit 76 then forms an inter-line prediction for the target pixel currently being decoded using the computed context number 75 in the same manner as the fifth embodiment mentioned above. The prediction determining unit 76 thus provides an estimate of the value of the target pixel currently being decoded from the computed context number 75. The entropy decoding unit 84 decodes the coded data 83 or coded prediction error data of the second field extracted by the syntax analyzing and variable length decoding unit 37. The output of the entropy decoding unit 84 is then added to the prediction or predicted value of the target pixel currently being decoded, which has been computed by the prediction determining unit 76. As a result, the decoded data 86 of the second field is generated.

The shape data 85 and 86 of the first and second fields, each of which has been reconstructed as a sequence of 8-bit binary data each having a value of 0 or 255 in decimal through the above processes, are delivered to the frame-based and field-based motion compensation units 46 and 49 for texture decoding and are also stored in the shape memory 42 for later alpha block decoding, as shown in FIG. 16.

As previously mentioned, the decoding system according to the sixth embodiment can decode an interlaced, coded shape data by carrying out motion compensation while making a correction to the difference in the position of a moving object between the two fields of the interlaced frame. Thus the present embodiment offers an advantage of being able to encode the shape data more smoothly as compared with the prior art decoding system.

Numerous variants may be made in the exemplary embodiment shown. For example, it is apparent that a process of decoding a bitstream which was encoded using another method other than the arithmetic coding method can be carried out in the decoding system by replacing the arithmetic decoding unit with another unit which conforms to the other method.

Referring next to FIG. 18, there is illustrated a block diagram showing the structure of a shape decoding unit 41 according to a variant of the sixth embodiment mentioned above. In the figure, reference numeral 103 denotes a prediction computing unit comprised of the context computing unit 74 for computing a context number used for inter-line prediction for each pixel in the second field of each alpha block to be decoded, and the prediction determining unit 76 for determining a prediction or predicted value of each pixel using the context number computed by the context computing unit 74. The shape decoding unit 41 of this variant differs from that of the sixth embodiment mentioned above in that the shape decoding unit 41 of this variant determines the value of each pixel in the second field using the computed context number without adding the prediction error to the prediction of each pixel when decoding the second field. Therefore, in this variant, the coded bitstream does not need to include the coded shape data of the second field. That is, the decoding system of this variant can reconstruct the shape data of the second field from only the coded shape data of the first field.

Accordingly, the decoding system of the variant can be applied to the situation where the transmission bit rate is limited and therefore it is unnecessary to reconstruct the shape data with great accuracy. Furthermore, the variant can offer the same advantage as the sixth embodiment.

In accordance with another variant of the sixth embodiment, there is provided a motion picture decoding system in which the structure of the motion picture decoding system according to the sixth embodiment and the structure of the above variant is combined. The motion picture decoding system of the other variant can select either the decoding process of the sixth embodiment or that of the above variant for the second field according to mode information included in a coded bitstream applied to thereto. Accordingly, this variant offers an advantage of being able to control the quality of the coded shape data dynamically according to the circumstances.

Seventh Embodiment

Figure 19:
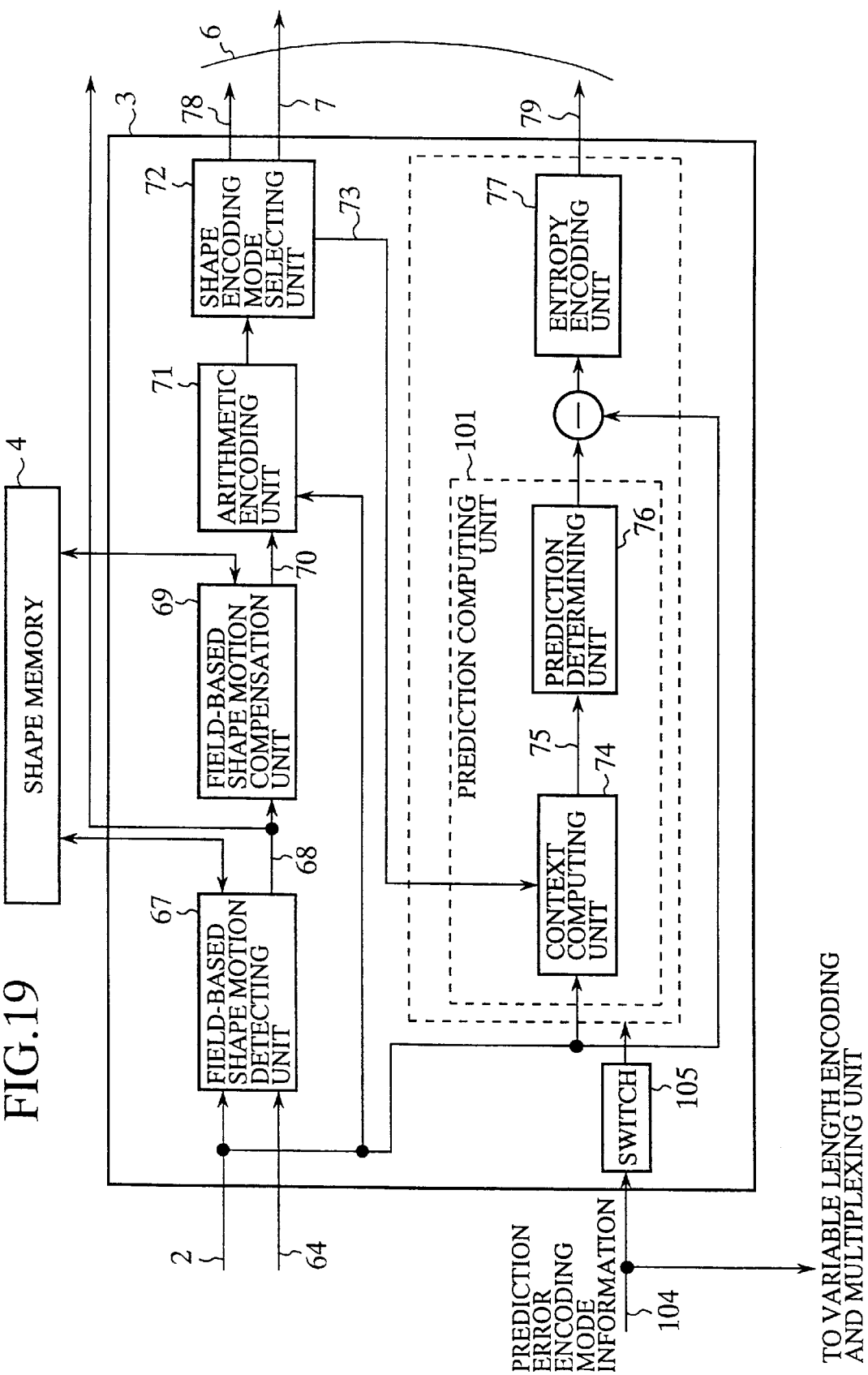
FIG. 19 is a block diagram showing the structure of a shape encoding unit of a motion picture encoding system according to a seventh embodiment of the present invention.

Referring next to FIG. 19, there is illustrated a block diagram showing the structure of a shape coding unit of a motion picture encoding system according to a seventh embodiment of the present invention. In the figure, reference numeral 104 denotes prediction error encoding instruction information for instructing the shape coding unit 3 to switch between a first mode in which prediction errors are encoded and a second mode in which prediction errors are not encoded.

While the motion picture encoding system of the seventh embodiment has the same structure of that of the aforementioned fifth embodiment, they differs from each other in that the shape encoding unit 3 of the seventh embodiment has the second mode in which no prediction is done, and hence prediction errors are not encoded and multiplexed into a coded bitstream, i.e., in which no coded shape data 79 of the second field is generated, in addition to the first mode in which the prediction errors for the second field are encoded and multiplexed into a coded bitstream. Accordingly, the motion picture decoding system of the present embodiment can vary the quality of the coded shape data dynamically. The shape encoding unit 3 comprises a switch 105 which can be turned on or off according to the prediction error coding instruction information 104 applied thereto, as shown in FIG. 19.

When the prediction error coding instruction information 104 indicates the activation of the decoding and multiplexing processes for the second field, the switch 105 activates the prediction computing unit 101, the entropy encoding unit 77, and so on. When the prediction error coding instruction information 104 indicates the deactivation of the decoding and multiplexing processes for the second field, the switch 105 deactivates the prediction computing unit 101, the entropy encoding unit 77, and so on. The switching can be carried out per VOP or alpha block. The prediction error coding instruction information 104 is multiplexed into a coded bitstream per switching.

The function of switching between the two modes of this embodiment can be also applied to the other motion picture encoding system of the aforementioned first or third embodiment.

Accordingly, the motion picture encoding system according to the seventh embodiment can carry out the encoding process for the second field by encoding prediction errors without reducing the quality of the coded shape data when a sufficiently large transmission bit rate is ensured. On the other hand, when serious limitations are imposed to the transmission bit rate, the motion picture encoding system according to the present embodiment can encode the shape data at the expense of the quality of the coded shape data by eliminating the process for encoding prediction errors.

Accordingly, the present embodiment offers an advantage of being able to control the quality of the coded shape data dynamically according to the circumstances.

Eighth Embodiment

Referring next to FIG. 20, there is illustrated a block diagram showing the structure of a shape encoding unit of a motion picture encoding system according to an eighth embodiment of the present invention. While the motion picture encoding system of this embodiment has the same structure as that of the above-mentioned fifth embodiment shown in FIG. 13, the shape encoding unit 3 of this embodiment differs from that of the fifth embodiment. In FIG. 20, reference numeral 87 denotes a delta vector detecting unit which can estimate or detect a delta vector used for estimating the shape data of a second field of each alpha block to be encoded of an interlaced frame by referring to a local decoded shape data of the first field of each alpha block to be encoded, and 88 denotes an entropy encoding unit which can encode the delta vector detected by the delta vector unit 87 and then furnish the coded shape data of the second field of each alpha block to be encoded.

In the present embodiment, arithmetic encoding with motion prediction is carried out first for one of the two fields of each alpha block to be encoded, which will be referred to as the first field the shape data of which is encoded before encoding the shape data of the other field which will be referred to as the second field. For the second field of each alpha block to be encoded, a small delta vector in the horizontal direction is estimated by referring to the local decoded data of the first field of each alpha block to be encoded and the delta vector is then encoded as the coded shape data of the second field. The encoding method can be implemented for the reason that the shape data is a binary plane including a plurality of bits each having a value of 0 or 1 and an approximation of the shape data of the second field can be obtained by shifting the shape data of the first field in the horizontal direction using the horizontal small delta vector.

The encoding process for the first field is done in the same manner as the fifth embodiment mentioned above. The encoding process is carried out by using the following procedures.

First, a delta vector is detected in the following manner. After the arithmetic encoding unit 71 arithmetic encodes the shape data of the first field of each alpha block to be encoded using the field-based prediction data for shape 70, the shape encoding mode selecting unit 72 generates and furnishes a local decoded data 73 of the first field to the delta vector detecting unit 87. The delta vector detecting unit 87 determines the amount of shifting the input shape data 2 of the second field in the horizontal direction with respect to the local decoded data 73 of the first field so that the shifted input shape data 2 of the second field most approximates to the local decoded data 73 of the first field so as to detect or estimate a delta vector having a magnitude corresponding to the shifting amount. The shifting amount is defined as the number of pixels by which the input shape data 2 is shifted. A process for searching a small area is performed so as to estimate the delta vector. For example, the search range can extend from ±1 pixel to ±3 or 4 pixels.

Next, entropy encoding is performed on the detected delta vector. The entropy encoding unit 88 performs appropriate entropy encoding such as Huffman coding on the delta vector using a predetermined variable length encoding table.

As previously explained, the motion picture encoding system of the eighth embodiment can encode an interlaced shape data by substituting a delta vector used for estimating the shape data of one field of a frame to be encoded from the shape data of another field which pairs up the former field for the shape data of the other field. Accordingly, the present embodiment offers an advantage of being able to encode the shape data with an extremely small amount of codes, as compared with the case in which all the pixels of each alpha block to be encoded are arithmetic encoded similarly.

In a variant, the above-mentioned encoding method according to the eighth embodiment can be combined with another encoding method of the other embodiment mentioned above so as to carry out an encoding process by switching between the encoding method of the eighth embodiment and the other encoding method per VOP or alpha block. The motion picture encoding system according to this variant can carry out an encoding process for the second field of each alpha block of an interlaced frame without reducing the quality of the coded shape data of the second field when a sufficiently large transmission bit rate is ensured. On the other hand, when serious limitations are imposed to the transmission bit rate, the motion picture encoding system of this variant can encode the shape data of the second field of each alpha block of the interlaced frame at the expense of the quality of the coded shape data of the second field by substituting only a delta vector for estimating the shape data of the second field from the shape data of the first field for the shape data of the second field. Accordingly, the variant offers an advantage of being able to control the quality of the coded shape data of each alpha block dynamically according to the circumstances.

Ninth Embodiment

A motion picture decoding system according to a ninth embodiment of the present invention is so constructed as to decode a coded bitstream generated by the motion picture encoding system according to the aforementioned eighth embodiment. The motion picture decoding system according to the ninth embodiment can encode interlaced video object planes or VOP's. The texture decoding process of this embodiment is the same as that of the second embodiment mentioned above, and therefore the description about the texture decoding process will be omitted hereinafter. Accordingly, only a description about the shape decoding will be made. The motion picture decoding system of this embodiment has the same structure as the sixth embodiment shown in FIG. 16, with exception that the coded shape data 83 of the second field is replaced by a coded delta vector 90 and the shape decoding unit 41 has a different structure.

First, a description will be made as to the syntax analyzing process and the variable length decoding process of this embodiment. When the syntax analyzing and variable length decoding unit 37 shown in FIG. 16 receives a coded bitstream 36, it isolates the coded shape data of each of the two fields of each alpha block to be decoded from the coded bitstream 36. The field that is extracted first from the coded bitstream 36 is referred to as the first field, and the other field is referred to as the second field. The coded shape data 80 of the first field is the code word which was arithmetic encoded by the motion picture encoding system of the eighth embodiment of the present invention, for example. The coded shape data 80 of the first field is then delivered to the shape decoding unit 41, together with the shape encoding mode information 82 showing whether the intracoded shape data or the interceded shape data was selected upon the encoding process and the motion vector of shape 81 when the inter mode was selected. The coded shape data of the second field is the code word or coded delta vector 90 which was obtained by entropy encoding a delta vector obtained by prediction using the local decoded data of the first field.

Next, the description will be directed to the shape decoding process. Referring next to FIG. 21, there is illustrated a block diagram showing the structure of the shape decoding unit 41. In the figure, reference numeral 90 denotes a coded delta vector which is furnished by the syntax analyzing and variable length decoding unit 37, 91 denotes an entropy decoding unit which can decode the coded delta vector 90 and then furnish a decoded delta vector 92, and 93 denotes a correction data generating unit which can generate a decoded shape data 94 of the second field from the decoded shape data 85 of the first field using the delta vector 92.

By using the following procedures, the coded shape data will be decoded.

(1) The first field is decoded with motion compensation and arithmetic decoding.

(2) The second field is decoded by generating the shape data of the second field using the delta vector.

The process (1) for decoding the coded shape data of the first field is carried out similar to the decoding process based on motion compensation and arithmetic encoding as previously mentioned in the above preferred embodiments. Therefore the description about the process (1) will be omitted hereinafter. The decoded shape data 85 of the first field is delivered to the correction data generating unit 93 to decode the second field or reconstruct the shape data of the second field.

In the decoding process for the second field, the entropy decoding unit 91 reconstructs a delta vector 92 from the coded delta vector furnished by the syntax analyzing and variable length decoding unit 37. The correction data generating unit 93 then generates the decoded shape data 94 of the second field from the decoded shape data 85 of the first field using the delta vector 92. A method of shifting the positions of all the pixels included in an alpha block currently being decoded in the horizontal direction by one or more pixels defined by the delta vector, as shown in FIG. 22, can be used as the method of generating the decoded shape data 94 of the second field from the decoded shape data 85 of the first field. Any pixel 100 in FIG. 22 that has entered the alpha block upon shifting the pixels has the same value as the adjacent pixel on the same line in the same alpha block. Another method can be used as the generating method.

The decoded shape data 85 and 94 which have been reconverted into a sequence of 8-bit binary data each having a value of 0 or 255 in decimal through the above processes are delivered to the frame-based and field-based motion compensation units for texture decoding and are also stored in the shape memory 42 for later alpha block decoding.

As previously mentioned, the motion picture decoding system according to the ninth embodiment can decode an interlaced, coded shape data by carrying out motion compensation in consideration of motions between the pair of two fields. Accordingly, the motion picture decoding system of the ninth embodiment can be applied to the situation where the transmission bit rate is limited and therefore it is unnecessary to reconstruct the shape data with great accuracy.

In a variant of the exemplary embodiment mentioned above, the structure of the ninth embodiment is combined with the decoding system according to one of the other preferred embodiments mentioned above. The motion picture decoding system of this variant is so constructed as to switch between the decoding method using the delta vector according to the ninth embodiment and another decoding method for the second field of a frame currently being decoded according to mode information included in the coded bitstream. Accordingly, the motion picture decoding system can decode the coded bitstream while controlling the quality of the shape data dynamically according to the amount of change in the transmission bit rate.

Tenth Embodiment

Figure 23:
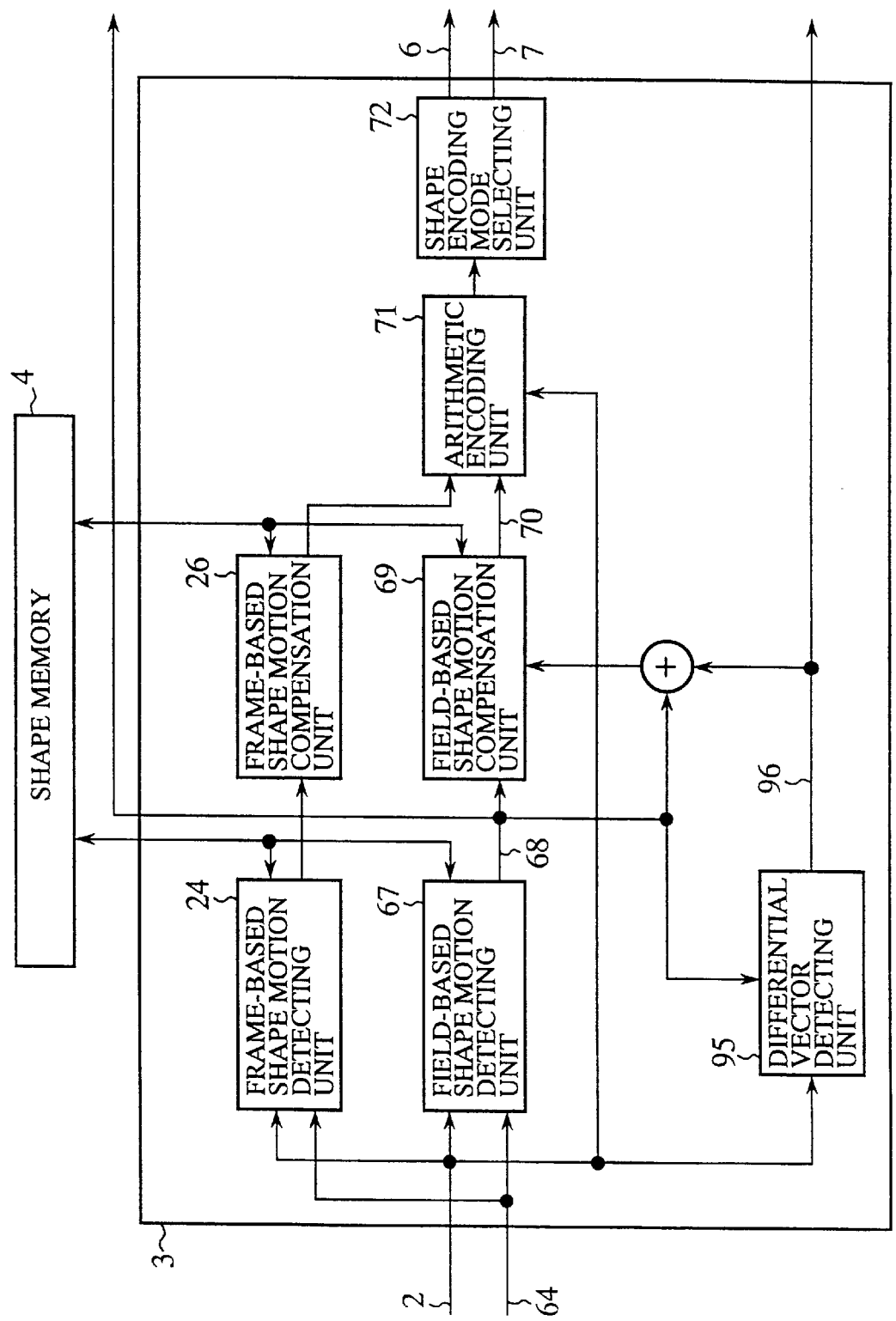
FIG. 23 is a block diagram showing the structure of a shape encoding unit of a motion picture encoding system according to a tenth embodiment of the present invention.

Referring next to FIG. 23, there is illustrated a block diagram showing the structure of a shape encoding unit of a motion picture encoding system according to a tenth embodiment of the present invention. While the motion picture encoding system of this embodiment has the same structure as that of the above-mentioned first embodiment shown in FIG. 1, the shape encoding unit 3 of this embodiment differs from that of the first embodiment. In FIG. 23, reference numeral 95 denotes a differential vector detecting unit which can receive the shape data 2 of each alpha block to be encoded and then detect a differential vector 96 from the motion vector of shape 68 of the first field of each alpha block to be encoded.

In the present embodiment, arithmetic encoding with motion prediction, such as frame-based prediction for shape, inter-VOP field-based prediction for shape, and intra-VOP field-based prediction for shape mentioned above in the exemplary embodiments shown, is carried out first for one of the two fields, which will be referred to as the first field the shape data of which is encoded before encoding the shape data of the other field which will be referred to as the second field. For the second field of each alpha block to be encoded, no motion prediction is carried out independently. A small area in the vicinity of the motion vector of shape 68 of the first field is searched to estimate a differential vector showing the difference between the motion vector of shape of the first field of each alpha block to be encoded and that of the second field of each alpha block to be encoded. This differential vector detection can be implemented for the reason that there rarely exists a difference in the magnitudes and directions of the motion vectors of shape of the two fields and hence there is a strong correlation between the motion vector of one of the two fields and that of the other field. The amount of computations required for detecting a motion vector of shape for the second field and the amount of codes included in coded motion vector data can be reduced by carrying out the above-mentioned process of searching a small area around the motion vector of the first field so as to estimate a differential vector and then encoding the differential vector.

The frame-based prediction for shape is carried out in the same manner as the aforementioned first embodiment. The encoding process for the first field is done in the same manner as the fifth embodiment. The encoding process for the second field is done in the same manner as the encoding method as mentioned above with inter-VOP field-based prediction for shape and arithmetic encoding, with the exception of detection of a motion vector for the second field. Therefore only a description of the motion vector detection will be made hereafter.

The field-based shape motion detecting unit 67 detects a field-based motion vector of shape 68 for the first field of each alpha block to be encoded using a reference shape data stored in the shape memory 4. When the delta vector detecting unit 87 receives the field-based motion vector of shape 68 of the first field, it searches a small area, included in the shape data 2 of the second field, in the vicinity of the field-based motion vector of shape 68 so as to detect or estimate a differential vector 96 showing the difference between the motion vector of shape of the first field of each alpha block to be encoded and that of the second field of each alpha block to be encoded. For example, the search range can be about ±1 pixel in both the horizontal and vertical directions. The differential vector 96 thus estimated is furnished as a motion vector data of the second field, and is then added with the motion vector of shape 68 of the first field to generate a motion vector of shape of the second field. The field-based shape motion compensation unit 69 then carries out motion compensated prediction for the second field according to the motion vector of shape 68 in the same manner as the motion compensated prediction for the first field. Finally, the field-based shape motion compensation unit 69 generates the pair of field-based prediction data for shape for the first and second fields. The arithmetic encoding unit 71 of this embodiment then carries out the intra-coding process, the inter-coding process using the frame-based prediction data for shape, and the inter-coding process using the field-based prediction data for shape, like that of the first embodiment mentioned above. The differential vector 96 can be encoded by using an appropriate entropy encoding method.

As previously explained, the motion picture encoding system of the tenth embodiment can encode an interlaced shape data by substituting a delta vector used for estimating a motion vector of one field of a frame to be encoded from a motion vector of another field which pairs up the former field for the motion vector of the former field of the frame. Accordingly, the present embodiment offers an advantage of being able to reduce the amount of computations required for estimating field-based motion vectors of shape and the amount of codes in coded motion vectors.

Eleventh Embodiment

Figure 24:
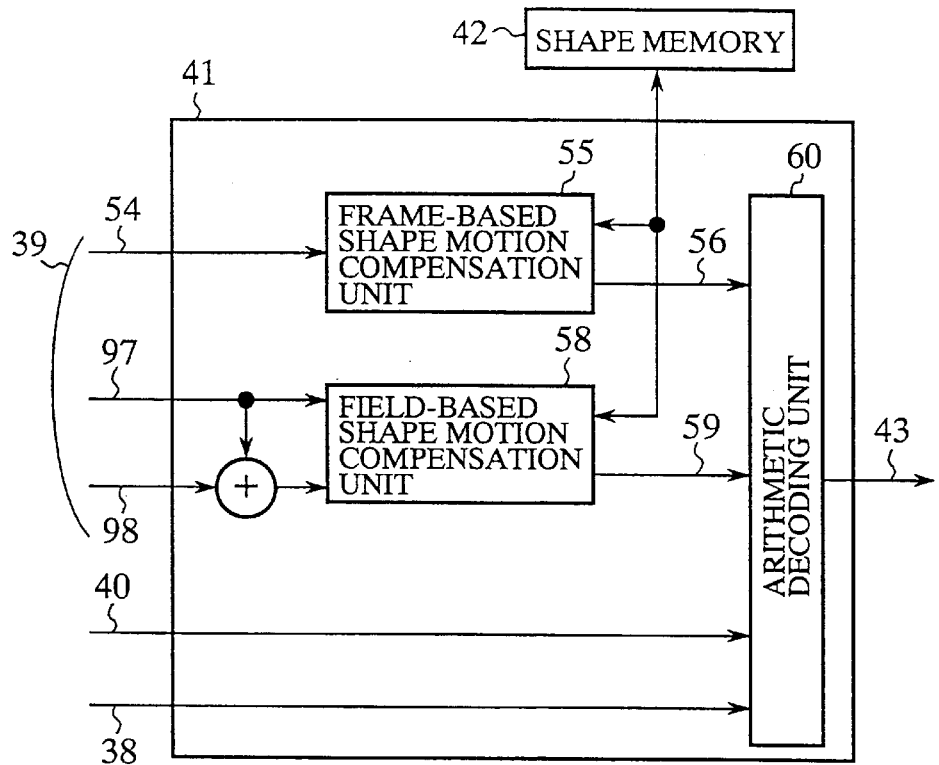
FIG. 24 is a block diagram showing the structure of a shape encoding unit of a motion picture encoding system according to an eleventh embodiment of the present invention.
Figure 25:
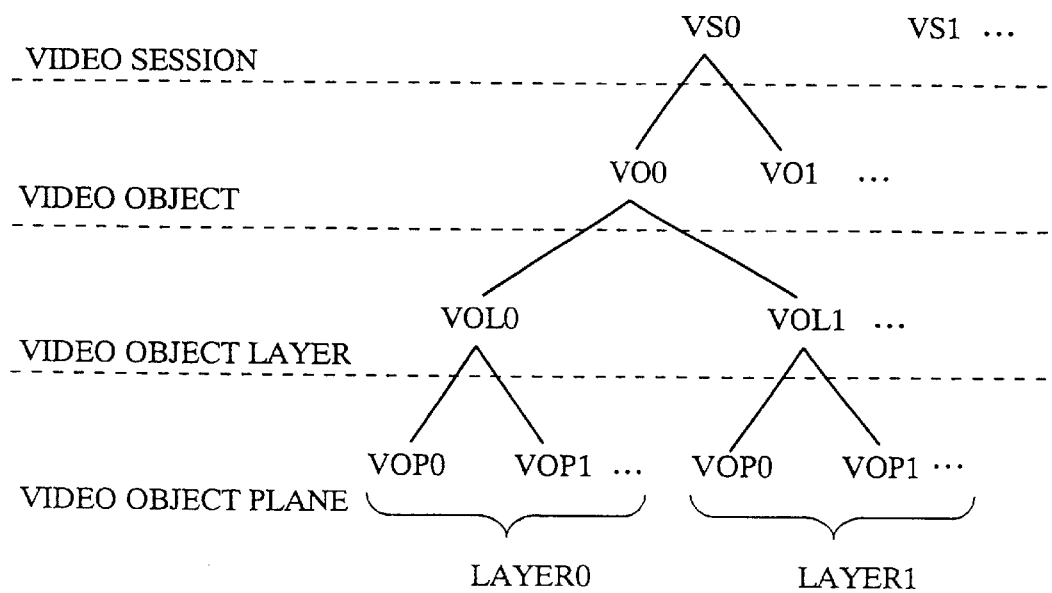
FIG. 25 is a diagram for explaining the structure of vide data in Video encoding verification model of MPEG-4.
Figure 26:
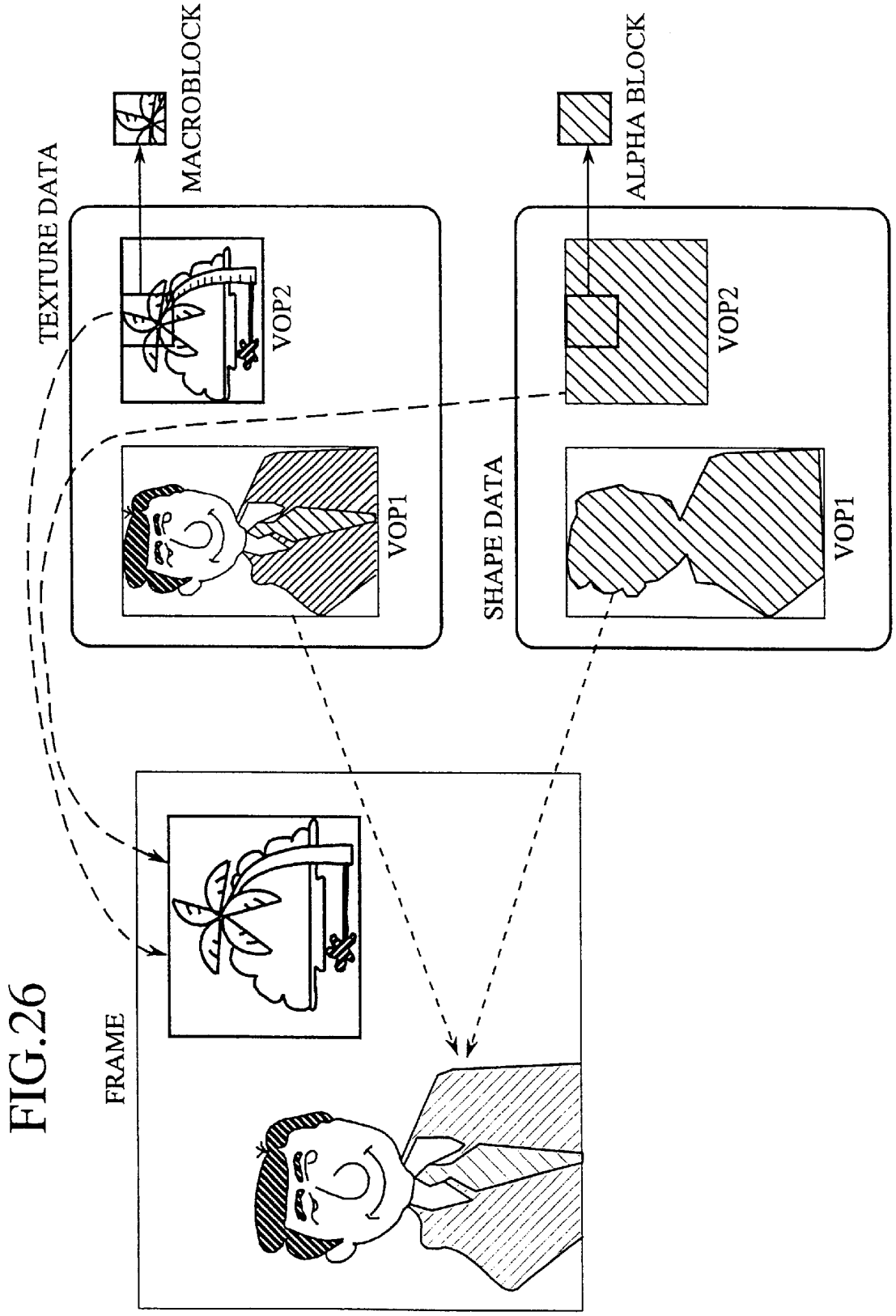
FIG. 26 is a diagram showing VOP'S.
Figure 27:
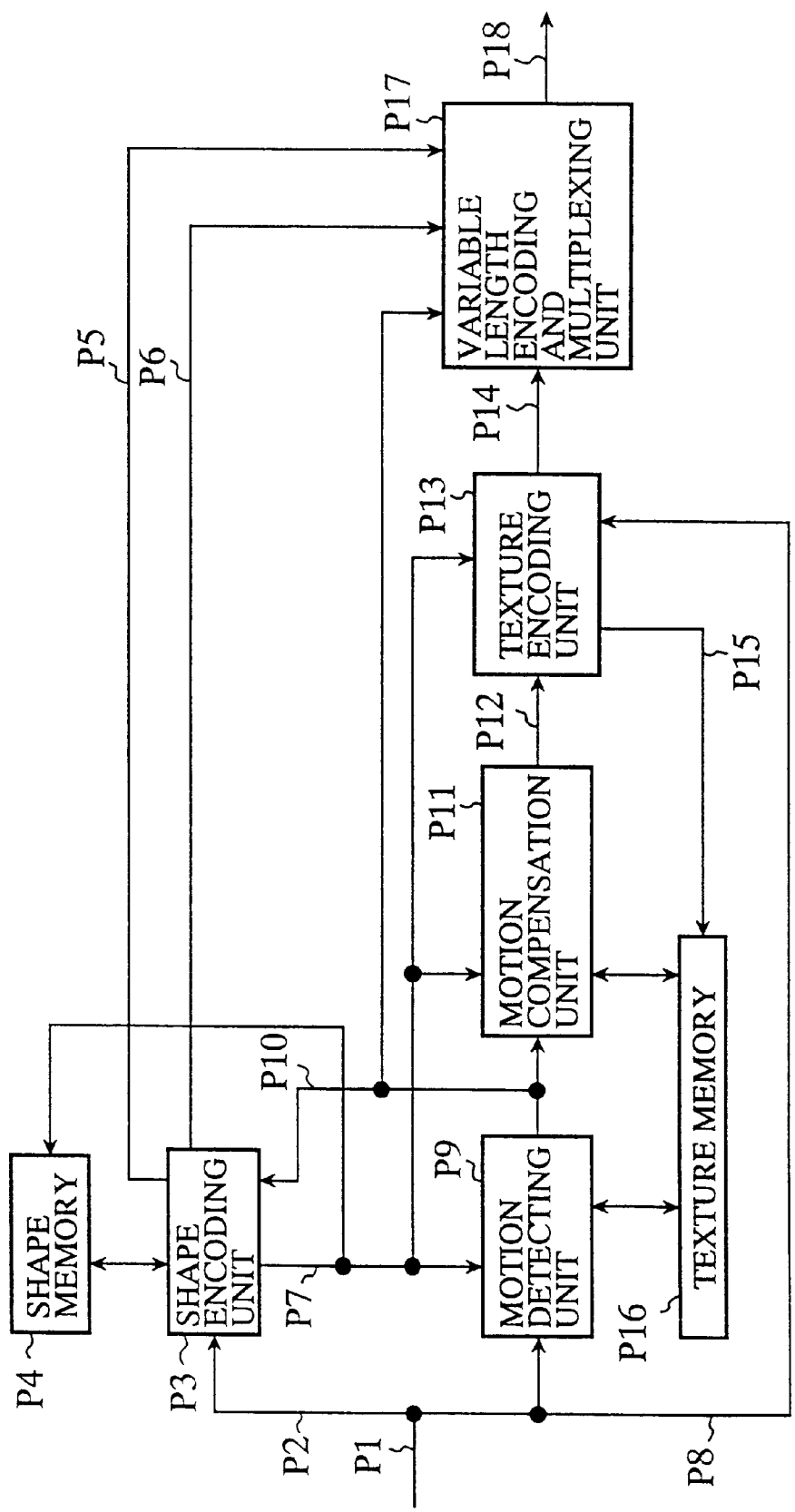
FIG. 27 is a block diagram showing the structure of a prior art shape encoding system which complies with video encoding verification model of MPEG-4.
Figure 28:
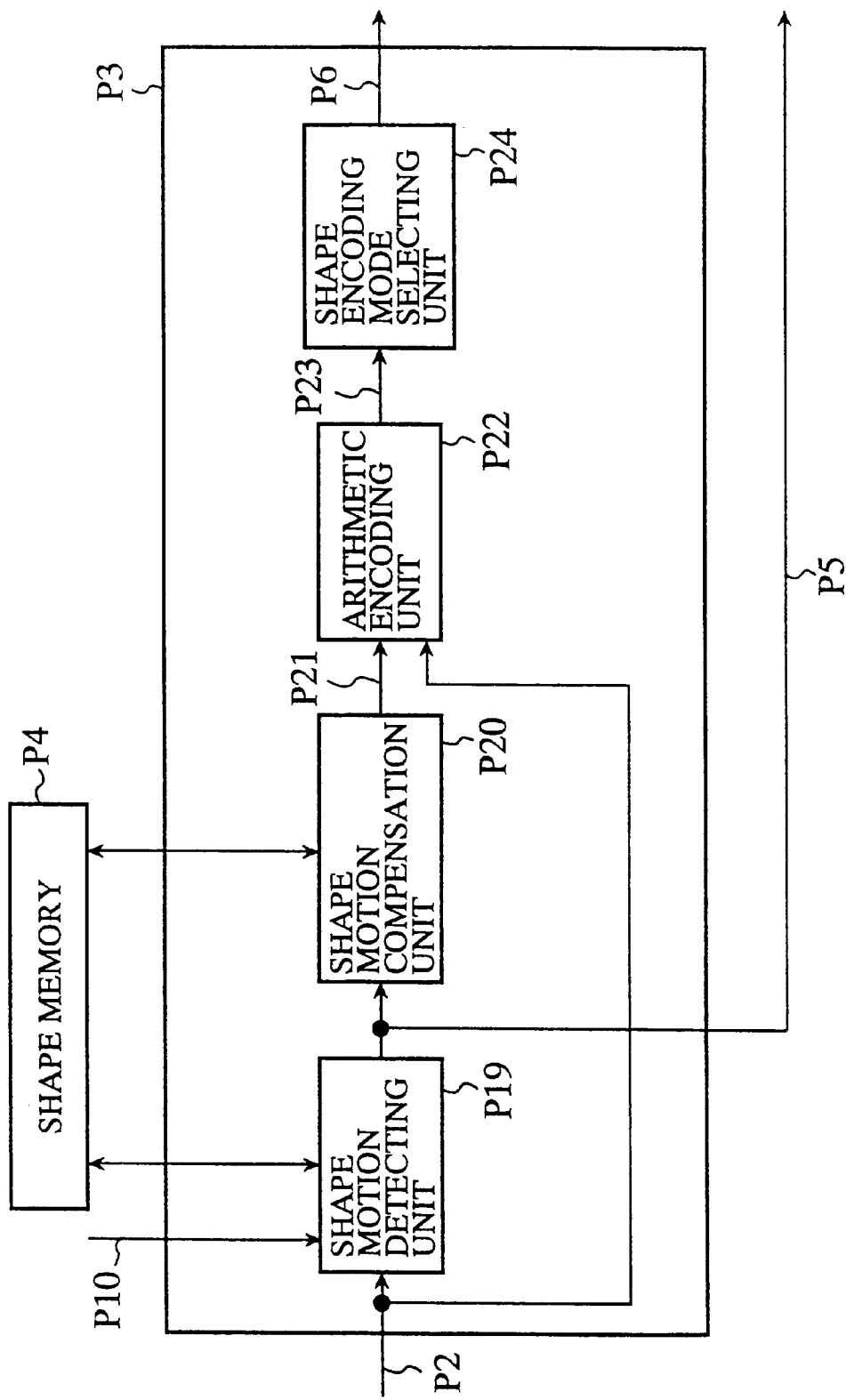
FIG. 28 is a block diagram showing the structure of a shape encoding unit of the prior art encoding system shown in FIG. 27.

Referring next to FIG. 24, there is illustrated a block diagram showing the structure of a shape decoding unit of a motion picture decoding system according to an eleventh embodiment of the present invention. The motion picture decoding system according to the eleventh embodiment of the present invention is so constructed as to decode a coded bitstream generated by the motion picture encoding system according to the aforementioned tenth embodiment. In FIG. 24, reference numeral 97 denotes a field-based motion vector of shape of a first field of each alpha block to be decoded included in an interlaced frame, and 98 denotes a delta vector showing the difference between the motion vector of shape of the first field of each alpha block to be encoded and that of a second field of each alpha block to be encoded, which is furnished by the syntax analyzing and variable length decoding unit 37.

The motion picture decoding system according to the eleventh embodiment can encode interlaced video object planes or VOP's. The shape decoding process of this embodiment is the same as that of the second embodiment mentioned above with the exception of a method of decoding a coded motion vector of one field that will be decoded at a later time as compared with that of the other field, and therefore the description about only the difference between this embodiment and the second embodiment will be made.

In the present embodiment, the inter-VOP field-based prediction is carried out by using the field-based motion vector of shape of one of the two fields, which will be referred to as the first field the shape data of which is encoded at an earlier time as compared with that of the other field, so that the field-based motion vector of shape of the other field which will be referred to as the second field is reconstructed.

To be more specific, when the syntax analyzing and variable length decoding unit 37 receives a coded bitstream 36, it extracts the differential vector 98 from the coded bitstream 36. The shape decoding unit 41 then adds the differential vector 98 to the field-based motion vector of shape 97 of the first field so as to determine the field-based motion vector of shape of the second field. The later decoding process is done using the same procedures as of the aforementioned second embodiment.

As previously mentioned, the decoding system according to the eleventh embodiment can decode an interlaced, coded shape data by carrying out motion compensation while making a correction to the difference in the position of a moving object between the two fields of the interlaced frame. Thus the present embodiment offers an advantage of being able to encode the shape data more smoothly as compared with the prior art decoding system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) shape encoding mode information indicating whether the coded shape data is a data encoded with frame-based motion compensated prediction or field-based motion compensated prediction, and (3) a frame-based motion vector of shape or field-based motion vectors of shape;

frame-based motion compensation means for making a motion compensated prediction for shape of each of the plurality of small regions to be reconstructed according to the frame-based motion vector of shape so as to generate a frame-based prediction data for shape;

field-based motion compensation means for making a motion compensated prediction for shape of each of first and second fields of each of the plurality of small regions to be reconstructed according to the field-based motion vectors of shape so as to generate a field-based prediction data for shape; and decoding means for decoding the coded shape data of each of the plurality of small regions to be reconstructed by using either the frame-based prediction data or the field-based prediction data, according to the shape encoding mode information.

2. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) texture encoding mode information indicating whether the coded texture data is a data encoded with frame-based motion compensated prediction or field-based motion compensated prediction, and (3) a frame-based motion vector of shape or field-based motion vectors of shape;

frame-based motion compensation means for making a motion compensated prediction for shape of each of the plurality of small regions to be reconstructed according to the frame-based motion vector of shape so as to generate a frame-based prediction data for shape;

field-based motion compensation means for making a motion compensated prediction for shape of each of first and second fields of each of the plurality of small regions to be reconstructed according to the field-based motion vectors of shape so as to generate a field-based prediction data for shape; and decoding means for decoding the coded shape data of each of the plurality of small regions to be reconstructed by using either the frame-based prediction data or the field-based prediction data as needed, according to the texture encoding mode information.

3. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of the first field, and (4) coded data of a prediction error for shape of a second field;

field-based motion compensation means for making a motion compensated prediction for shape of the first field of each of the plurality of small regions to be reconstructed according to the field-based motion vector of shape of the first field so as to generate a field-based prediction data for shape of the first field;

first decoding means for decoding the coded shape data of the first field of each of the plurality of small regions to be reconstructed by using the field-based prediction data for shape of the first field as needed, according to the shape encoding mode information;

prediction computing means for computing a prediction value for the shape data of the second field of each of the plurality of small regions to be reconstructed by using the decoded shape data of the first field from said first decoding means; and second decoding means for decoding the coded shape data of the second field of each of the plurality of small regions to be reconstructed by using the prediction error and the prediction value from said prediction computing means.

4. The decoding system according to claim 3, wherein said prediction computing means includes means for computing a context number for each pixel of the shape data of the second field of each of the plurality of small regions to be reconstructed by using the decoded shape data of the first field, and means for computing a prediction value of each pixel of the shape data of the second field of each of the plurality of small regions to be reconstructed from the context number.

5. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of the first field, and (4) coded data of a prediction error for shape of a second field;

field-based motion compensation means for making a motion compensated prediction for shape of the first field of each of the plurality of small regions to be reconstructed according to the field-based motion vector of shape of the first field so as to generate a field-based prediction data for shape of the first field;

decoding means for decoding the coded shape data of the first field of each of the plurality of small regions to be reconstructed by using the field-based prediction data for shape of the first field as needed, according to the shape encoding mode information; and prediction computing means for computing a prediction value of a decoded shape data of a second field of each of the plurality of small regions to be reconstructed by using the decoded shape data of the first field so as to generate a decoded shape data of the second field by using the computed prediction value.

6. The decoding system according to claim 5, wherein said prediction computing means includes means for computing a context number for each pixel of the shape data of the second field of each of the plurality of small regions to be reconstructed by using the decoded shape data of the first field, and means for computing a prediction value of each pixel of the shape data of the second field of each of the plurality of small regions to be reconstructed from the context number.

7. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) first shape encoding mode information indicating if the coded shape data of a first field is a data encoded with field-based motion compensated prediction, (3) a field-based motion vector of shape of the first field, (4) second shape encoding mode information indicating whether or not the coded shape data of a second field is to be decoded, and (4) coded data of a prediction error for shape of the second field if the second shape encoding mode information indicates that the coded shape data of the second field is to be decoded;

field-based motion compensation means for making a motion compensated prediction for shape of the first field of each of the plurality of small regions to be reconstructed according to the field-based motion vector of shape so as to generate a field-based prediction data for shape of the first field;

first decoding means for decoding the coded shape data of the first field of each of the plurality of small regions to be reconstructed by using the field-based prediction data of the first field as needed, according to the shape first encoding mode information;

prediction computing means for computing a prediction value for the shape data of the second field to be reconstructed by using the decoded shape data of the first field from said first decoding means;

second decoding means for decoding the coded shape data of the second field of each of the plurality of small regions to be reconstructed; and means for generating a decoded shape data of the second field of each of the plurality of small regions to be reconstructed from the prediction value of the second field furnished by said prediction computing means, or by adding the prediction value of the second field to the shape data of the second field decoded by said second decoding means, according to the second field encoding mode information.

8. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed; (1) the coded shape data, (2) shape encoding mode information indicating if the coded shape data of a first field is a data encoded with field-based motion compensated prediction, (3) a field-based motion vector of shape of a first field, and (4) coded data of a delta vector used for adjusting a decoded shape data of the first field;

field-based motion compensation means for making a motion compensated prediction for shape of the first field of each of the plurality of small regions to be reconstructed according to the field-based motion vector of shape of the first field so as to generate a field-based prediction data for shape of the first field;

first decoding means for decoding the coded shape data of the first field of each of the plurality of small regions to be reconstructed by using the field-based prediction data for shape of the first field from said field-based motion compensation means as needed, according to the shape encoding mode information;

second decoding means for decoding the coded data of the delta vector so as to generate a delta vector; and means for generating a decoded data of the second field of each of the plurality of small regions to be reconstructed by using the decoded shape data of the first field from said first decoding means and the delta vector from said second decoding means.

9. A motion picture decoding system which can decode a coded bitstream obtained by encoding a motion picture comprised of a sequence of interlaced images each having its texture data and shape data, comprising:

a bitstream analyzer for extracting the following data from the coded bitstream for each of a plurality of small regions included in an interlaced image to be reconstructed: (1) the coded shape data, (2) shape encoding mode information indicating whether the coded shape data is a data encoded with frame-based motion compensated prediction or field-based motion compensated prediction, (2) a frame-based motion vector of shape or a field-based motion vector of shape of a first field, and (3) a differential motion vector showing a difference between the field-based motion vector of shape of the first field and the field-based motion vector of shape of a corresponding second field;

frame-based motion compensation means for making a motion compensated prediction for shape of each of the plurality of small regions to be reconstructed according to the frame-based motion vector of shape so as to generate a frame-based prediction data for shape;

field-based motion compensation means for making a motion compensated prediction for shape of the first field of each of the plurality of small regions to be reconstructed according to the field-based motion vector of shape of the first field so as to generate a field-based prediction data for shape of the first field, and for computing a field-based motion vector of shape of the second field by adding the differential vector to the field-based motion vector of shape of the first field, and then making a motion compensated prediction for shape of the second field of each of the plurality of small regions to be reconstructed according to the field-based motion vector of shape of the second field, so as to generate a field-based prediction data for shape of the second field; and decoding means for decoding the coded shape data of each of the plurality of small regions to be reconstructed by using either the frame-based prediction data or the field-based prediction data of the first and second fields as needed, according to the shape encoding mode information.

10. A motion picture encoding system which can encode a motion picture comprised of a sequence of interlaced images each having its texture data and shape data, comprising:

frame-based motion detecting means for detecting a frame-based motion vector of shape for each of a plurality of small regions into which the shape data of a current interlaced image to be encoded having a pair of first and second fields is partitioned;

frame-based motion compensation means for making a motion compensated prediction according to the frame-based motion vector of shape so as to generate a frame-based prediction data for shape;

field-based motion detecting means for detecting field-based motion vectors of shape for both the first and second fields of each of the plurality of small regions to be encoded;

field-based motion compensation means for making a motion compensated prediction according to the field-based motion vectors of shape of the first and second fields so as to generate a field-based prediction data for shape;

encoding means for inter-coding the shape data of each of the plurality of small regions to be encoded by using the frame-based prediction data for shape, and inter-coding the shape data of each of the plurality of small regions to be encoded by using the field-based prediction data for shape, so as to furnish two types of coded shape data;

shape encoding mode selecting means for selecting one of the two types of coded shape data from said encoding means according to a predetermined selection criterion and then furnishing the selected coded shape data, and for furnishing shape encoding mode information indicating the type of the selected coded shape data, i.e., a shape encoding mode according to which the selected coded shape data has been generated; and multiplexing means for multiplexing the shape encoding mode information and the selected coded shape data into a coded bitstream, and further multiplexing either the frame-based motion vector of shape or the field-based motion vectors of shape which is selected according to the shape encoding mode information into the coded bitstream.

11. The encoding system according to claim 10, wherein said field-based shape motion detecting means detects field-based motion vectors of shape, which are referred to as inter-image field-based motion vectors of shape, for both the first and second fields of each of the plurality of small regions to be encoded of the current image from the shape data of an immediately preceding image, and said field-based shape motion detecting means further detects a field-based motion vector of shape, which is referred to as one of intra-image field-based motion vectors of shape, for the first field of each of the plurality of small regions to be encoded of the current image from the shape data of the immediately preceding image and, after that, detects another field-based motion vector of shape, which is referred to as another one of the intra-image field-based motion vectors of shape, for the second field of each of the plurality of small regions to be encoded of the current image from the coded shape data of the first field of the current image, and wherein said field-based shape motion compensation means makes motion compensated prediction for shape of the first and second fields by using the intra-image field-based motion vectors of shape so as to generate an intra-image field-based prediction data for shape, and further makes motion compensated prediction for shape of the first and second fields of by using the inter-image field-based motion vectors of shape so as to generate an inter-image field-based prediction data for shape.

12. A motion picture encoding system which can encode a motion picture comprised of a sequence of interlaced images each having its texture data and shape data, comprising:

frame-based motion detecting means for detecting a frame-based motion vector of shape for each of a plurality of small regions into which the shape data of an interlaced image to be encoded having a pair of first and second fields is partitioned;

frame-based motion compensation means for making a motion compensated prediction according to the frame-based motion vector of shape to generate a frame-based prediction data for shape;

field-based motion detecting means for detecting field-based motion vectors of shape for both the first and second fields of each of the plurality of small regions to be encoded;

field-based motion compensation means for making a motion compensated prediction according to the field-based motion vectors of shape of both the first and second fields so as to generate a field-based prediction data for shape;

encoding means for intra-coding the shape data of each of the plurality of small regions to be encoded, inter-coding the shape data of each of the plurality of small regions to be encoded by using the frame-based prediction data for shape, or inter-coding the shape data of each of the plurality of small regions to be encoded by using the field-based prediction data for shape according to information indicating a texture encoding mode according to which the corresponding texture data of each of the plurality of small regions to be encoded is encoded, so as to generate a coded shape data of each of the plurality of small regions; and multiplexing means for multiplexing the texture encoding mode information and the coded shape data into a coded bitstream, and further multiplexing either the frame-based motion vector of shape or the field-based motion vectors of shape which is selected according to the shape encoding mode information into the coded bitstream.

13. A motion picture encoding system which can encode a motion picture comprised of a sequence of interlaced images each having its texture data and shape data, comprising:

field-based motion detecting means for detecting a field-based motion vector of shape for a first field of each of a plurality of small regions into which the shape data of an interlaced image to be encoded having a pair of the first field and a corresponding second field is partitioned;

field-based motion compensation means for making a motion compensated prediction for shape of the first field of each of the plurality of small regions to be encoded according to the field-based motion vector of shape of the first field from said field-based motion detecting means so as to generate a field-based prediction data for shape of the first field;

first encoding means for intra-coding the shape data of the first field of each of the plurality of small regions to be encoded, and inter-coding the shape data of the first field of each of the plurality of small regions to be encoded by using the field-based prediction data for shape of the first field, so as to generate two types of coded shape data of the first field of each of the plurality of small regions and a local decoded data of the first field of each of the plurality of small regions to be encoded;

shape encoding mode selecting means for selecting one of the two types of coded shape data of the first field from said first encoding means according to a predetermined selection criterion and then furnishing the selected coded shape data of the first field, and for furnishing shape encoding mode information indicating the type of the selected coded shape data of the first field, i.e., a shape encoding mode according to which the selected coded shape data of the first field has been generated;

prediction computing means for computing a prediction value of each pixel of the shape data of the second field of each of the plurality of small regions to be encoded by using the local decoded data of the first field furnished by said first encoding means and the shape data of the second field of each of the plurality of small regions to be encoded;

second encoding means for encoding a difference between the prediction value computed by said prediction computing means and the actual value of each pixel of the shape data of the second field of each of the plurality of small regions to be encoded, and for furnishing the coded difference as a coded shape data of the second field; and multiplexing means for multiplexing the field-based motion vector of shape of the first field, the selected coded shape data of the first field, the shape encoding mode information, and the coded shape data of the second field obtained by said second encoding means into a coded bitstream.

14. The motion picture encoding system according to claim 13, further comprising means for enabling said prediction computing means and said second encoding means when receiving information for instructing the encoding of the difference between the prediction computed by said prediction computing means and the actual value of each pixel of the shape data of the second field, and for disabling said prediction computing means and said second encoding means otherwise, wherein said multiplexing means also multiplexes the information for instructing the encoding of the difference into the coded bitstream.

15. The motion picture encoding system according to claim 13, wherein said prediction computing means includes means for computing a context number for each pixel of the shape data of the second field of each of the plurality of small regions to be encoded by using the local decoded shape data of the first field furnished by said first encoding means and the shape data of the second field, and means for determining a prediction value of each pixel of the shape data of the second field of each of the plurality of small regions to be encoded from the computed context number.

16. A motion picture encoding system which can encode a motion picture comprised of a sequence of interlaced images each having its texture data and shape data, comprising:

field-based motion detecting means for detecting a field-based motion vector of shape for a first field of each of a plurality of small regions into which the shape data of an interlaced image to be encoded having a pair of the first field and a corresponding second field is partitioned;

field-based motion compensation means for making a motion compensated prediction for shape of the first field of each of the plurality of small regions to be encoded according to the field-based motion vector of shape of the first field from said field-based motion detecting means to generate a field-based prediction data for shape of the first field;

first encoding means for intra-coding the shape data of the first field of each of the plurality of small regions to be encoded, and inter-coding the shape data of the first field of each of the plurality of small regions to be encoded by using the field-based prediction data for shape, so as to generate two types of coded shape data and a local decoded shape data of the first field of each of the plurality of small regions to be encoded;

shape encoding mode selecting means for selecting one of the two types of coded shape data of the first field from said first encoding means according to a predetermined selection criterion and then furnishing the selected coded shape data of the first field, and for furnishing shape encoding mode information indicating the type of the selected coded shape data, i.e., a shape encoding mode according to which the selected coded shape data of the first field has been generated;

delta vector detecting means for, by using the local decoded data of the first field furnished by said first encoding means and the shape data of a second field of each of the plurality of small regions, detecting a delta vector used for adjusting the local decoded shape data of the first field to generate an approximation of the shape data of the second field of each of the plurality of small regions;

second encoding means for encoding the delta vector so as to generate a coded shape data of the second field of each of the plurality of small regions; and multiplexing means for multiplexing the field-based motion vector of shape of the first field, the selected coded shape data of the first field, the shape encoding mode information, and the coded shape data of the second field obtained by said second encoding means into a coded bitstream.

17. A motion picture encoding system which can encode a motion picture comprised of a sequence of interlaced images each having its texture data and shape data, comprising:

frame-based motion detecting means for detecting a frame-based motion vector of shape for each of a plurality of small regions into which the shape data of an interlaced image to be encoded having a pair of first and second fields is partitioned;

frame-based motion compensation means for making a motion compensated prediction according to the frame-based motion vector of shape so as to generate a frame-based prediction data for shape;

field-based motion detecting means for detecting a field-based motion vector of shape for the first field of each of the plurality of small regions to be encoded;

differential vector detecting means for detecting a differential vector showing a difference between the field-based motion vector of shape of the first field and a field-based motion vector of shape of a corresponding second field of each of the plurality of small regions to be encoded by searching a small area in the vicinity of the field-based motion vector of shape of the first field, by using the shape data of the second field;

field-based motion compensation means for making a motion compensated prediction for shape of the first field of each of the plurality of small regions to be encoded according to the field-based motion vector of shape of the first field from said field-based motion detecting means, and for making a motion compensated prediction for shape of the second field of each of the plurality of small regions to be encoded according to a field-based motion vector of shape of the second field obtained by adding the differential vector to the field-based motion vector of shape of the first field, so as to generate a field-based prediction data for shape;

encoding means for intra-coding the shape data of each of the plurality of small regions to be encoded, inter-coding the shape data of each of the plurality of small regions to be encoded by using the frame-based prediction data for shape, and inter-coding the shape data of each of the plurality of small regions to be encoded by using the field-based prediction data for shape, so as to furnish three types of coded shape data of each of the plurality of small regions;

shape encoding mode selecting means for selecting one of the three types of coded shape data from said encoding means according to a predetermined selection criterion and then furnishing the selected coded shape data, and for furnishing shape encoding mode information indicating the type of the selected coded shape data, i.e., a shape encoding mode according to which the selected coded shape data has been generated; and multiplexing means for multiplexing the frame-based motion vector of shape, the field-based motion vector of shape of the first field, the differential vector, the selected coded shape data, and the shape encoding mode information into a coded bitstream.

18. A method of decoding a coded bitstream obtained by encoding a motion picture comprised of a sequence of interlaced images each having its texture data and shape data, comprising the steps of:

extracting the following data from the coded bitstream for each of a plurality of small regions included in an interlaced image to be reconstructed; (1) the coded shape data, (2) shape encoding mode information indicating whether the coded shape data is a data intra-coded or inter-coded, and, in the latter case, further indicating whether the coded shape data is a data inter-coded with frame-based motion compensated prediction or with field-based motion compensated prediction, and (2) a frame-based motion vector of shape if the shape encoding mode information indicates that the coded shape data is a data inter-coded with field-based motion compensated prediction, or field-based motion vectors of shape if the shape encoding mode information indicates that the coded shape data is a data inter-coded with frame-based motion compensated prediction;

if the shape encoding mode information indicates that the coded shape data of each of the plurality of small regions is a data intracoded, decoding the intra-coded shape data;

if the shape encoding mode information indicates that the coded shape data of each of the plurality of small regions is a data intercoded with frame-based motion compensated prediction, making a motion compensated prediction for shape of each of the plurality of small regions to be reconstructed according to the frame-based motion vector of shape so as to generate a frame-based prediction data for shape, and then decoding the inter-coded shape data by using the frame-based prediction data for shape; and if the shape encoding mode information indicates that the shape data of each of the plurality of small regions is a data interceded with field-based motion compensated prediction, making a motion compensated prediction for shape of each of the plurality of small regions to be reconstructed according to the field-based motion vectors of shape so as to generate a field-based prediction data for shape, and then decoding the inter-coded shape data by using the field-based prediction data for shape.

* * * * *

UNITED STATES PATENT AND TRADEMARK OFFICE
CERTIFICATE OF CORRECTION

PATENT NO.   : 6,108,449
DATED        : August 22, 2000
INVENTOR(S)  : Shunichi SEKIGUCHI et al.

It is certified that error appears in the above-identified patent and that said Letters Patent is hereby corrected as shown below:

Column 42, line 41, change "(4) to --(5)--.

Column 48, line 62, change "(2)" to --(3)--.

Signed and Sealed this

Fifth Day of June, 2001

Attest:

Attesting Officer

NICHOLAS P. GODICI
*Acting Director of the United States Patent and Trademark Office*